US009346895B2

(12) United States Patent
Inoue et al.

(10) Patent No.: US 9,346,895 B2
(45) Date of Patent: May 24, 2016

(54) MONOLITHIC ORGANIC POROUS BODY, MONOLITHIC ORGANIC POROUS ION EXCHANGER, AND PROCESS FOR PRODUCING THE MONOLITHIC ORGANIC POROUS BODY AND THE MONOLITHIC ORGANIC POROUS ION EXCHANGER

(75) Inventors: Hiroshi Inoue, Tokyo (JP); Akira Nakamura, Tokyo (JP); Hitoshi Takada, Tokyo (JP); Satoru Kondo, Tokyo (JP)

(73) Assignee: ORGANO CORPORATION, Tokyo (JP)

( * ) Notice: Subject to any disclaimer, the term of this patent is extended or adjusted under 35 U.S.C. 154(b) by 951 days.

(21) Appl. No.: 13/140,650

(22) PCT Filed: Dec. 18, 2008

(86) PCT No.: PCT/JP2008/073677
§ 371 (c)(1),
(2), (4) Date: Aug. 16, 2011

(87) PCT Pub. No.: WO2010/070774
PCT Pub. Date: Jun. 24, 2010

(65) Prior Publication Data
US 2011/0290714 A1  Dec. 1, 2011

(51) Int. Cl.
*B01D 15/04* (2006.01)
*C08J 5/20* (2006.01)
(Continued)

(52) U.S. Cl.
CPC .............. *C08F 2/32* (2013.01); *B01J 20/28042* (2013.01); *B01J 20/28085* (2013.01); *B01J 39/20* (2013.01); *B01J 39/26* (2013.01); *B01J 41/14* (2013.01); *B01J 41/20* (2013.01); *B01J 47/00* (2013.01); *C08J 9/28* (2013.01); *C02F 1/42* (2013.01); *C08J 2325/08* (2013.01)

(58) Field of Classification Search
CPC .......... C02F 1/42; C08F 2/32; C08J 2325/08; C08J 9/28

USPC ....................... 210/496; 521/31, 54
See application file for complete search history.

(56) References Cited

U.S. PATENT DOCUMENTS

2004/0122117 A1* 6/2004 Yamanaka et al. .............. 521/25
2007/0163332 A1* 7/2007 Tsujii et al. ................... 73/61.52
2008/0032116 A1   2/2008 Hosoya et al.

FOREIGN PATENT DOCUMENTS

CN  101134823 A  3/2008
EP  1 321 187 A1  6/2003
(Continued)

OTHER PUBLICATIONS

Taiwanese Office Action dated Jul. 4, 2013, issued in corresponding Taiwanese Patent Application No. 097149356, w/ English translation.
(Continued)

*Primary Examiner* — Dirk Bass
(74) *Attorney, Agent, or Firm* — Westerman, Hattori, Daniels & Adrian, LLP

(57) ABSTRACT

A monolithic organic porous body includes a continuous macropore structure that includes cellular macropores that overlap to form openings having an average diameter of 20 to 200 μm, the monolithic organic porous body having a thickness of 1 mm or more and a total pore volume of 0.5 to 5 ml/g, an area of a skeleton observed within an SEM image of a section of the continuous macropore structure (in a dry state) being 25 to 50%. A monolithic ion exchanger is produced by introducing an ion-exchange group into the monolithic organic porous body. The monolithic organic porous body and the monolithic ion exchanger are chemically stable, have high mechanical strength, and ensure a low pressure loss when fluid passes through. The monolithic organic porous body and the monolithic ion exchanger may be used as an adsorbent having a large adsorption capacity or an ion exchanger having a large ion-exchange capacity.

23 Claims, 25 Drawing Sheets

(51) Int. Cl.

| | |
|---|---|
| *C08J 9/00* | (2006.01) |
| *B01D 39/16* | (2006.01) |
| *C02F 1/42* | (2006.01) |
| *C08F 2/32* | (2006.01) |
| *C08J 9/28* | (2006.01) |
| *B01J 39/20* | (2006.01) |
| *B01J 39/26* | (2006.01) |
| *B01J 41/14* | (2006.01) |
| *B01J 41/20* | (2006.01) |
| *B01J 47/00* | (2006.01) |
| *B01J 20/28* | (2006.01) |

(56) References Cited

FOREIGN PATENT DOCUMENTS

| | | |
|---|---|---|
| EP | 1 384 746 A1 | 1/2004 |
| EP | 1 386 938 A1 | 2/2004 |
| JP | 7-501140 A | 2/1995 |
| JP | 2002-306976 A | 10/2002 |
| JP | 2004-321930 A | 11/2004 |
| JP | 2004-331776 A | 11/2004 |
| JP | 2006-015333 A | 1/2006 |
| JP | 2006-289207 A | 10/2006 |
| JP | 2007-154083 A | 6/2007 |
| JP | 2009-007550 A | 1/2009 |
| JP | 2009-019187 A | 1/2009 |
| JP | 2009-019188 A | 1/2009 |

OTHER PUBLICATIONS

European Office Action dated Jun. 19, 2013, issued in corresponding European application No. 08878939.1.

International Search Report of PCT/JP2008/073677, mailing date Mar. 24, 2009.

Extended European Search Report dated Sep. 6, 2012, issued in corresponding European Patent Application No. 08878939.1 (8 pages).

\* cited by examiner

MONOLITHIC ORGANIC POROUS BODY, MONOLITHIC ORGANIC POROUS ION EXCHANGER, AND PROCESS FOR PRODUCING THE MONOLITHIC ORGANIC POROUS BODY AND THE MONOLITHIC ORGANIC POROUS ION EXCHANGER

TECHNICAL FIELD

The present invention relates to a monolithic organic porous body having a continuous macropore structure with a thick skeleton, a monolithic organic porous ion exchanger having a continuous macropore structure with a thick skeleton, and methods of producing the same. The monolithic organic porous body and the monolithic organic porous ion exchanger may suitably used as an adsorbent or an ion exchanger used for a water deionizing apparatus or the like.

BACKGROUND ART

JP-A-2002-306976 discloses a method that includes mixing an oil-soluble monomer that does not include an ion-exchange group, a surfactant, water, and an optional initiator to obtain a water-in-oil emulsion, and polymerizing the water-in-oil emulsion to obtain a monolithic organic porous body having a continuous macropore structure. A monolithic organic porous body obtained by the above method and an organic porous ion exchanger obtained by introducing an ion-exchange group into the monolithic organic porous body may be useful as an adsorbent, a chromatography packing material, and an ion exchanger used for a water deionizing apparatus or the like.

However, when increasing the ion-exchange capacity per unit volume of the organic porous ion exchanger in water-wet conditions by reducing the total pore volume, the size of the mesopores (openings) significantly decreases. The openings disappear when further reducing the total pore volume. Specifically, the ion-exchange capacity per unit volume decreases when achieving a low pressure loss required for practical applications, and the pressure loss increases when increasing the ion-exchange capacity per unit volume.

Moreover, the area of the skeleton observed within the section of the monolithic organic porous body or the organic porous ion exchanger obtained by the above method is theoretically limited to less than 25%. This is because the monolithic organic porous body having a continuous macropore structure (i.e., an intermediate body of the organic porous ion exchanger shown below is produced using a water-in-oil emulsion. It is necessary to cause the water droplets contained in the water-in-oil emulsion to come in contact with each other in order to form a continuous macropore structure. Therefore, the volume fraction of the water droplets is limited to 75% or more. Since a monolithic organic porous body obtained by stationary polymerization of the water-in-oil emulsion has a configuration in which the structure of the emulsion is immobilized, the porosity of the monolithic organic porous body is 75% or more. Accordingly, the open frontal area of the section of the organic porous body is also 75% or more (i.e., the area of the skeleton observed in the section is less than 25%). Therefore, the area of the skeleton observed in the section cannot be increased when using the above method.

For example, JP-T-7-501140 discloses a porous body having a particle aggregation-type structure as a monolithic organic porous body or a monolithic organic porous ion exchanger having a structure other than the continuous macropore structure. However, since the continuous hole of the porous body obtained by the method disclosed in JP-T-7-501140 is small (about 2 µm or less), the porous body cannot be used for an industrial deionized water production apparatus or the like that treats the target water at a high flow rate under low pressure. Moreover, a porous body having a particle aggregation-type structure has low mechanical strength, and may break when cut to a desired size and placed in a column or a cell (i.e., exhibits poor handling capability).

Therefore, development of a monolithic organic porous ion exchanger that is chemically stable, has high mechanical strength and a large ion-exchange capacity per unit volume, and ensures a low pressure loss when fluid (e.g., water or gas) passes through due to a large continuous hole, has been desired.

An organic porous body having a co-continuous structure that includes a three-dimensional continuous skeleton phase and a three-dimensional continuous hole phase defined by the skeleton phase has been known. JP-A-2007-154083 discloses an organic polymer gel affinity support having a co-continuous structure that includes a three-dimensional continuous pore having an average diameter in the order of micrometer, and a skeleton phase that is mainly formed of an organic material, the affinity support being a copolymer of at least one of a di- or higher functional vinyl monomer compound, methacrylate compound, and acrylate compound (crosslinking agent) and a monofunctional hydrophilic monomer, the volume ratio of the crosslinking agent and the monofunctional hydrophilic monomer in the affinity support being 100 to 10:0 to 90. The crosslink density of the skeleton of the affinity support is increased in order to maintain the monolithic structure. The affinity support has hydrophilicity that sufficiently suppresses nonspecific adsorption. N. Tsujioka et al., Macromolecules 2005, 38, 9901 discloses a monolithic organic porous body that has a co-continuous structure and is formed of an epoxy resin.

Since the pore of the affinity support disclosed in JP-A-2007-154083 has an average diameter in the order of micrometer, the pressure loss when fluid passes through the affinity support increases. Therefore, it is difficult to use the affinity support as an ion exchanger for a water deionizing apparatus that treats water at a high flow rate under low pressure loss. Moreover, since the affinity support is hydrophilic, a complex and expensive operation (e.g., surface hydrophobic treatment) is required to use the affinity support as an adsorbent for a hydrophobic substance. Moreover, it is difficult to introduce a functional group (e.g., ion-exchange group) into an epoxy resin.

Therefore, development of a monolithic organic porous body that is chemically stable and is hydrophobic, has high hole continuity and uniformity, and ensures a low pressure loss when fluid (e.g., water or gas) passes through the monolithic organic porous body due to a large continuous hole, has been desired. Development of an monolithic organic porous ion exchanger that has a large ion-exchange capacity per unit volume in addition to the above properties has also been desired.

An MR ion-exchange resin has a composite particle structure that includes a copolymer having a large network structure in which micropores formed between macropores and small spherical gel particle aggregates. However, the diameter of the particles that form the micropores of the MR ion-exchange resin is 1 µm or less, and a composite organic monolithic body in which particles or protrusions having a diameter of more than 1 µm adhere to the surface thereof has not been proposed.

(Patent Document 1) JP-A-2002-306976 (claim 1 and paragraph 0017)

(Patent Document 2) JP-T-7-501140
(Patent Document 3) JP-A-2004-321930 (claim 1)
(Patent Document 4) JP-A-2007-154083 (claim 1)

SUMMARY OF THE PRESENT INVENTION

An object of the present invention is to solve the above problems, and provide a monolithic organic porous body having a continuous macropore structure and a monolithic organic porous ion exchanger having a continuous macropore structure that may be used as an adsorbent that is chemically stable, has high mechanical strength, ensures a low pressure loss when fluid passes through, and has a large adsorption capacity, or an ion exchanger that is chemically stable, has high mechanical strength, ensures a low pressure loss when fluid passes through, and has a large ion-exchange capacity per unit volume, and methods of producing the same.

Another object of the present invention is to provide a monolithic organic porous body that is chemically stable and hydrophobic, has high hole continuity and hole size uniformity, and ensures a low pressure loss when fluid passes through, a monolithic organic porous ion exchanger that has a large ion-exchange capacity per unit volume in addition to the above properties, and methods of producing the same.

A further object of the present invention is to solve the above problems, and provide a monolithic organic porous body that may suitably be used as an adsorbent that has mechanical strength and high contact efficiency with fluid when the fluid passes through, ensures a low pressure loss when fluid passes through, and has a high adsorption capacity, a monolithic organic porous ion exchanger that has mechanical strength and high contact efficiency with fluid when the fluid passes through, and ensures a low pressure loss when fluid passes through, and methods of producing the same.

The inventors of the present invention conducted extensive studies in order to achieve the above objects, and found that a monolithic body that has large openings and a skeleton that is thicker than the skeleton of an intermediate body is obtained by subjecting a vinyl monomer and a crosslinking agent to stationary polymerization in a specific organic solvent in the presence of a monolithic organic porous body (intermediate body) that is obtained by the method disclosed in JP-A-2002-306976, and that the monolithic body has a relatively large pore volume and the size of the openings can be further increased due to swelling by introducing an ion-exchange group into the resulting monolithic body, and that the monolithic body and the monolithic ion exchanger obtained by introducing an ion-exchange group into the monolithic body ensure prompt and uniform adsorption or ion exchange, a large adsorption capacity or ion-exchange capacity per unit volume, and a significantly low pressure loss due to a large average diameter of the openings and exhibit high mechanical strength and an excellent handling capability due to a continuous macropore structure and an excellent gaseous pollutant adsorption capability being able to remove a small amount of gaseous pollutant (i.e., exhibit excellent performance that cannot be achieved by a related-art monolithic organic porous body or monolithic organic porous ion exchanger) even if the gas transmission rate is high. These findings have led to the completion of the present invention.

According to a first aspect of the present invention, there is provided a monolithic organic porous body including a continuous macropore structure, the continuous macropore structure including cellular macropores that overlap to form openings having an average diameter of 20 to 200 µm, the monolithic organic porous body having a thickness of 1 mm or more and a total pore volume of 0.5 to 5 ml/g, an area of a skeleton observed within an SEM image of a section of the continuous macropore structure (in a dry state) being 25 to 50%.

According to the first aspect of the present invention, there is provided a monolithic organic porous body including a continuous macropore structure, the continuous macropore structure including cellular macropores that overlap to form openings having an average diameter of 20 to 200 µm, the monolithic organic porous body having a thickness of 1 mm or more and a total pore volume of 0.5 to 5 ml/g, the monolithic organic porous body being produced by performing a step I that includes stirring a mixture of an oil-soluble monomer that does not include an ion-exchange group, a surfactant, and water to prepare a water-in-oil emulsion, and polymerizing the water-in-oil emulsion to obtain a monolithic organic porous intermediate body that has a continuous macropore structure and has a total pore volume of 5 to 16 ml/g, a step II that includes mixing a vinyl monomer, a crosslinking agent that includes at least two vinyl groups in one molecule, an organic solvent that dissolves the vinyl monomer and the crosslinking agent, but does not dissolve a polymer produced by polymerizing the vinyl monomer, and an initiator, and a step III that includes polymerizing the mixture obtained by the step II in a stationary state in the presence of the monolithic organic porous intermediate body obtained by the step I to obtain an organic porous body having a skeleton thicker than that of the organic porous intermediate body.

According to the first aspect of the present invention, there is provided a monolithic organic porous ion exchanger including a continuous macropore structure, the continuous macropore structure including cellular macropores that overlap to form openings having an average diameter of 30 to 300 µm, the monolithic organic porous ion exchanger having a thickness of 1 mm or more, a total pore volume of 0.5 to 5 ml/g, and an ion-exchange capacity per unit volume of 0.4 mg equivalent/ml or more in water-wet conditions, ion-exchange groups being uniformly distributed in the monolithic organic porous ion exchanger, and an area of a skeleton observed within an SEM image of a section of the continuous macropore structure (in a dry state) being 25 to 50%.

According to the first aspect of the present invention, there is provided a method of producing a monolithic organic porous body including a step I that includes stirring a mixture of an oil-soluble monomer that does not include an ion-exchange group, a surfactant, and water to prepare a water-in-oil emulsion, and polymerizing the water-in-oil emulsion to obtain a monolithic organic porous intermediate body that has a continuous macropore structure and has a total pore volume of 5 to 16 ml/g, a step II that includes mixing a vinyl monomer, a crosslinking agent that includes at least two vinyl groups in one molecule, an organic solvent that dissolves the vinyl monomer and the crosslinking agent, but does not dissolve a polymer produced by polymerizing the vinyl monomer, and an initiator, and a step III that includes polymerizing the mixture obtained by the step II in a stationary state in the presence of the monolithic organic porous intermediate body obtained by the step I to obtain an organic porous body having a skeleton thicker than that of the organic porous intermediate body.

According to the first aspect of the present invention, there is also provided a method of producing a monolithic organic porous ion exchanger including the steps I to III, and a step IV that includes introducing an ion-exchange group into the organic porous body obtained by the step III.

The inventors also found that a hydrophobic monolithic body having a continuous structure that includes a three-dimensional continuous aromatic vinyl polymer skeleton and a three-dimensional continuous hole defined by the skeleton is obtained by subjecting an aromatic vinyl monomer and a crosslinking agent to stationary polymerization in a specific organic solvent in the presence of a monolithic organic porous body (intermediate body) that is obtained by the method disclosed in JP-A-2002-306976 and that the monolithic body has a relatively large pore volume, having a continuous structure, high hole continuity and uniformity, and that it ensures a low pressure loss when fluid passes through, and that a monolithic organic porous ion exchanger having a large ion-exchange capacity per unit volume is obtained by introducing an ion-exchange group into the monolithic body having a thick skeleton, and that the monolithic organic porous ion exchanger ensures prompt and uniform ion exchange, a short ion-exchange band, a large adsorption capacity or ion-exchange capacity per unit volume, and a significantly low pressure loss due to a large continuous hole and exhibits high mechanical strength and an excellent handling capability, an excellent gaseous pollutant adsorption capability being able to remove a small amount of gaseous pollutant (i.e., exhibit excellent performance that cannot be achieved by a related-art monolithic organic porous ion exchanger) even if the gas transmission rate is high. These findings have led to the completion of the present invention.

According to a second aspect of the present invention, there is provided a monolithic organic porous body including a co-continuous structure that includes a three-dimensional continuous skeleton having a thickness of 0.8 to 40 µm, and a three-dimensional continuous hole defined by the skeleton having a diameter of 8 to 80 µm, the skeleton being formed of an aromatic vinyl polymer that has a crosslinked structural unit content of 0.3 to 5.0 mol %, the monolithic organic porous body having a total pore volume of 0.5 to 5 ml/g.

According to the second aspect of the present invention, there is provided a monolithic organic porous body including a co-continuous structure that includes a three-dimensional continuous skeleton having a thickness of 0.8 to 40 µm, and a three-dimensional continuous hole defined by the skeleton having a diameter of 8 to 80 µm, the skeleton being formed of an aromatic vinyl polymer that has a crosslinking unit content of 0.3 to 5.0 mol %, the monolithic organic porous body having a total pore volume of 0.5 to 5 ml/g, the monolithic organic porous body being produced by performing a step I that includes stirring a mixture of an oil-soluble monomer that does not include an ion-exchange group, a surfactant, and water to prepare a water-in-oil emulsion, and polymerizing the water-in-oil emulsion to obtain a monolithic organic porous intermediate body that has a continuous macropore structure and has a total pore volume of more than 16 ml/g and 30 ml/g or less, a step II that includes mixing an aromatic vinyl monomer, a crosslinking agent that includes at least two vinyl groups in one molecule, an organic solvent that dissolves the aromatic vinyl monomer and the crosslinking agent, but does not dissolve a polymer produced by polymerizing the aromatic vinyl monomer, and an initiator, and a step III that includes polymerizing the mixture obtained by the step II in a stationary state in the presence of the monolithic organic porous intermediate body obtained by the step I.

According to the second aspect of the present invention, there is provided a monolithic organic porous ion exchanger including a co-continuous structure that includes a three-dimensional continuous skeleton having a thickness of 1 to 60 µm, and a three-dimensional continuous hole defined by the skeleton having a diameter of 10 to 100 µm, the skeleton being formed of an aromatic vinyl polymer that has a crosslinking unit content of 0.3 to 5.0 mol %, the monolithic organic porous body having a total pore volume of 0.5 to 5 ml/g, and an ion-exchange capacity per unit volume of 0.3 mg equivalent/ml or more when wetted with water, ion-exchange groups being uniformly distributed in the monolithic organic porous ion exchanger.

According to the second aspect of the present invention, there is provided a method of producing a monolithic organic porous body including a step I that includes stirring a mixture of an oil-soluble monomer that does not include an ion-exchange group, a surfactant, and water to prepare a water-in-oil emulsion, and polymerizing the water-in-oil emulsion to obtain a monolithic organic porous intermediate body that has a continuous macropore structure and has a total pore volume of more than 16 ml/g and 30 ml/g or less, a step II that includes mixing an aromatic vinyl monomer, 0.3 to 5 mol % of a crosslinking agent that includes at least two vinyl groups in one molecule, an organic solvent that dissolves the aromatic vinyl monomer and the crosslinking agent, but does not dissolve a polymer produced by polymerizing the aromatic vinyl monomer, and an initiator, and a step III that includes polymerizing the mixture obtained by the step II in a stationary state in the presence of the monolithic organic porous intermediate body obtained by the step I.

According to the second aspect of the present invention, there is also provided a method of producing a monolithic organic porous ion exchanger including a step I that includes stirring a mixture of an oil-soluble monomer that does not include an ion-exchange group, a surfactant, and water to prepare a water-in-oil emulsion, and polymerizing the water-in-oil emulsion to obtain a monolithic organic porous intermediate body that has a continuous macropore structure and has a total pore volume of more than 16 ml/g and 30 ml/g or less, a step II that includes mixing an aromatic vinyl monomer, 0.3 to 5 mol % of a crosslinking agent that includes at least two vinyl groups in one molecule, an organic solvent that dissolves the aromatic vinyl monomer and the crosslinking agent, but does not dissolve a polymer produced by polymerizing the aromatic vinyl monomer, and an initiator, a step III that includes polymerizing the mixture obtained by the step II in a stationary state in the presence of the monolithic organic porous intermediate body obtained by the step I to obtain a body having a co-continuous structure, and a step IV that includes introducing an ion-exchange group into the body obtained by the step III.

The inventors also found that a monolithic body having a composite structure in which a number of particles or protrusions having a diameter of 2 to 20 µm are formed on the surface of the skeleton of the organic porous body is obtained by subjecting a vinyl monomer and a crosslinking agent to stationary polymerization in a specific organic solvent in the presence of a monolithic organic porous body (intermediate body) that is obtained by the method disclosed in JP-A-2002-306976, and that the monolithic body has a relatively large pore volume, and that the monolithic body and a monolithic ion exchanger obtained by introducing an ion-exchange group into the monolithic body ensure prompt and uniform adsorption or ion exchange, and a low pressure loss and exhibit high mechanical strength, an excellent handling capability due to a continuous hole (pore) structure, an excellent gaseous pollutant adsorption capability being able to remove a small amount of gaseous pollutant (i.e., exhibit excellent performance that cannot be achieved by a related-art monolithic organic porous body or monolithic organic porous ion exchanger), even if the gas transmission rate is high. These findings have led to the completion of the present invention.

According to a third aspect of the present invention, there is provided a monolithic organic porous body including a composite structure that includes an organic porous body that includes a continuous skeleton phase and a continuous hole phase, and a number of particles having a diameter of 2 to 20 µm and adhering to the surface of the skeleton of the organic porous body, or a number of protrusions having a maximum diameter of 2 to 20 µm and formed on the surface of the skeleton of the organic porous body, the monolithic organic porous body having a thickness of 1 mm or more, an average hole diameter of 8 to 100 µm, and a total pore volume of 0.5 to 5 ml/g.

According to the third aspect of the present invention, there is provided a monolithic organic porous ion exchanger including a composite structure that includes an organic porous body that includes a continuous skeleton phase and a continuous hole phase, and a number of particles having a diameter of 4 to 40 µm that adhere to the surface of the skeleton of the organic porous body, or a number of protrusions having a maximum diameter of 4 to 40 µm that are formed on the surface of the skeleton of the organic porous body, the monolithic organic porous ion exchanger having a thickness of 1 mm or more, an average hole diameter of 10 to 150 µm, a total pore volume of 0.5 to 5 ml/g, and an ion-exchange capacity per unit volume of 0.2 mg equivalent/ml or more in water-wet conditions, ion-exchange groups being uniformly distributed in the composite structure.

According to the third aspect of the present invention, there is provided a method of producing a monolithic organic porous body including a step I that includes stirring a mixture of an oil-soluble monomer that does not include an ion-exchange group, a first crosslinking agent that includes at least two vinyl groups in one molecule, a surfactant, and water to prepare a water-in-oil emulsion, and polymerizing the water-in-oil emulsion to obtain a monolithic intermediate body that has a continuous macropore structure and has a total pore volume of 5 to 30 ml/g, a step II that includes mixing a vinyl monomer, a second crosslinking agent that includes at least two vinyl groups in one molecule, an organic solvent that dissolves the vinyl monomer and the second crosslinking agent, but does not dissolve a polymer produced by polymerizing the vinyl monomer, and an initiator, and a step III that includes polymerizing the mixture obtained by the step II in a stationary state in the presence of the monolithic organic porous intermediate body obtained by the step I, the step II or III being performed while satisfying at least one of the following conditions (1) to (5), (1) the mixture is polymerized in the step III at a temperature that is lower than a 10-hour half-life temperature of the initiator by at least 5° C.;
(2) the amount (mol %) of the second crosslinking agent used in the step II is equal to or larger than twice the amount (mol %) of the first crosslinking agent used in the step I;
(3) the vinyl monomer used in the step II differs in structure from the oil-soluble monomer used in the step I;
(4) the organic solvent used in the step II is a polyether having a molecular weight of 200 or more;
(5) the concentration of the vinyl monomer in the mixture obtained by the step II is 30 wt % or less.

According to the third aspect of the present invention, there is also provided a method of producing a monolithic organic porous ion exchanger including a step IV that includes introducing an ion-exchange group into a monolithic organic porous body produced by the above method.

Effects of the Present Invention

Since the monolithic body according to the first aspect of the present invention has a continuous macropore structure in which the openings formed by the macropores have a large diameter, and the skeleton (wall section) of the continuous macropore structure is thick, the monolithic body exhibits an excellent adsorption capacity. Therefore, the monolithic body can be used in substitution for a synthetic adsorbent, and can also be applied to new applications (e.g., adsorptive removal of trace components) due to excellent adsorption characteristics. The monolithic ion exchanger according to the first aspect of the present invention has high mechanical strength and a large ion-exchange capacity per unit volume in water-wet conditions, and allows the target water to be passed through for a long time at a high flow rate under low pressure. Therefore, the monolithic ion exchanger may suitably be used for a two-bed three-tower water purifier or an electric water deionizing apparatus.

Since the monolithic organic porous body according to the second aspect of the present invention has a co-continuous structure in which the three-dimensional continuous hole has high continuity, high uniformity, and a large diameter, the target water can be passed through the monolithic organic porous body for a long time at a high flow rate under low pressure. Moreover, the monolithic organic porous body exhibits an excellent adsorption capacity since the three-dimensional continuous skeleton is thick. Therefore, the monolithic organic porous body can be used in substitution for a synthetic adsorbent, and can also be applied to new applications (e.g., adsorptive removal of trace components) due to excellent adsorption characteristics.

The monolithic organic porous ion exchanger according to the second aspect of the present invention has high mechanical strength and a large ion-exchange capacity per unit volume in water-wet conditions, and allows the target water to be passed through for a long time at a high flow rate under low pressure due to a large three-dimensional continuous hole. Therefore, the monolithic organic porous ion exchanger may suitably be used for a two-bed three-tower water purifier or an electric water deionizing apparatus. Since the three-dimensional continuous hole has high continuity and uniformity, uniform ion-adsorption behavior is obtained, the length of the ion-exchange band is small, and a sufficient number of theoretical plates is achieved. Moreover, since the monolithic organic porous ion exchanger can advantageously adsorb trace ions in ultrapure water, the monolithic organic porous ion exchanger may suitably be used as a chromatography packing material or an ion exchanger used for an ultrapure water system.

When using the method according to the second aspect of the present invention, the monolithic organic porous ion exchanger or the monolithic organic porous ion exchanger can be easily produced with high reproducibility.

Since the composite monolithic porous body according to the third aspect of the present invention has a composite structure in which the surface of the skeleton phase of the organic porous body is covered with a number of particles having a specific size, or a number of protrusions are formed on the surface of the skeleton phase, the composite monolithic porous body ensures a high contact efficiency with fluid when the fluid permeates the monolithic body, prompt and uniform adsorption, and a low pressure loss, and exhibits high mechanical strength and an excellent handling capability due to a continuous hole (pore) structure. Therefore, the monolithic organic porous body can be used in substitution for a synthetic adsorbent, and can also be applied to new applications (e.g., adsorptive removal of trace components) due to excellent adsorption characteristics.

Since the composite monolithic porous ion exchanger according to the third aspect of the present invention has the same structure as that of the composite monolithic porous body, the composite monolithic porous ion exchanger ensures prompt and uniform ion exchange, exhibits high mechanical strength, and allows the target water to be passed through the composite monolithic porous ion exchanger for a long time at a high flow rate under low pressure. Therefore, the composite monolithic porous ion exchanger may suitably be used for a two-bed three-tower water purifier, an ultrapure water system, or an electric water deionizing apparatus, or may suitably be used as a chemical filter adsorbent.

BRIEF DESCRIPTION OF THE DRAWINGS

FIG. 1 shows an SEM image of the monolithic body obtained in Example 1.

FIG. 2 shows an EPMA image of the sulfur atom distribution on the surface of the monolithic cation exchanger obtained in Example 1.

FIG. 3 shows an EPMA image of the sulfur atom distribution of the monolithic cation exchanger obtained in Example 1 in the cross-sectional (thickness) direction.

FIG. 4 is a view showing the correlation between the differential pressure coefficient and the ion-exchange capacity per unit volume (examples and comparative examples).

FIG. 5 shows an SEM image of the monolithic body obtained in Comparative Example 1.

FIG. 6 shows an SEM image of the monolithic body obtained in Comparative Example 4.

FIG. 7 shows a transcription of the skeleton observed in the SEM image shown in FIG. 1. In FIG. 7, reference numeral 11 indicates the photographed area, reference numeral 12 indicates the skeleton, and reference numeral 13 indicates the macropore.

FIG. 8 shows an SEM image of the monolithic body obtained in Example 2.

FIG. 9 shows an SEM image of the monolithic body obtained in Example 3.

FIG. 10 shows an SEM image of the monolithic body obtained in Example 4.

FIG. 11 shows an SEM image of the monolithic body obtained in Example 5.

FIG. 12 shows an SEM image of the monolithic body obtained in Example 6.

FIG. 13 shows an SEM image of the monolithic body obtained in Example 7.

FIG. 14 shows an SEM image of the monolithic body obtained in Example 8.

FIG. 15 shows an SEM image of the monolithic body obtained in Example 9.

FIG. 16 shows an SEM image of the monolithic body obtained in Example 10.

FIG. 17 shows an SEM image of the monolithic body obtained in Example 11.

In FIG. 18, reference numeral 1 indicates the skeleton phase, reference numeral 2 indicates the hole phase, and reference numeral 10 indicates the monolithic body.

DESCRIPTION OF EXEMPLARY EMBODIMENTS

First Aspect of the Present Invention

Figure 1:
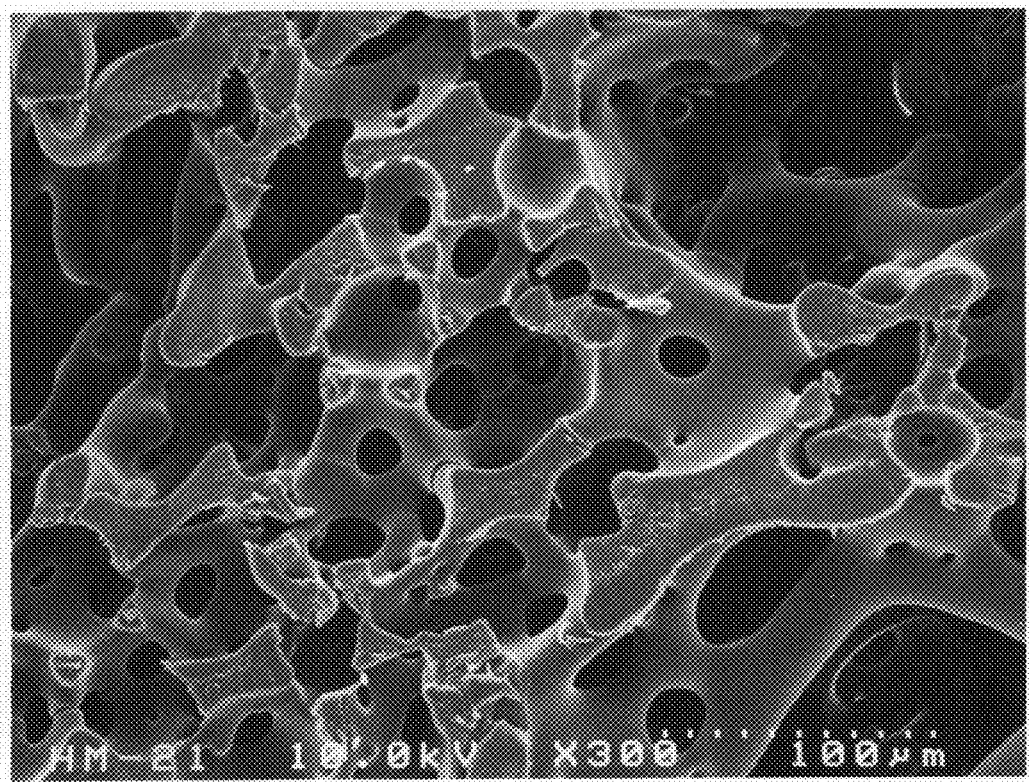
FIGS. 1 to 17 relate to the first aspect of the present invention, FIGS. 18 to 26 relate to the second aspect of the present invention, and FIGS. 27 to 42 relate to the third aspect of the present invention.

A product, a production method, and a chemical filter according to the first aspect of the present invention are described below.

Note that the term "monolithic organic porous body" may be referred to as "monolithic body", the term "monolithic organic porous ion exchanger" may be referred to as "monolithic ion exchanger", and the term "monolithic organic porous intermediate body" may be referred to as "monolithic intermediate body".

Monolithic Body

A monolithic body according to one embodiment of the present invention basically has a continuous macropore structure in which cellular macropores overlap to form openings (mesopores). The average diameter of the openings is 20 to 200 µm, preferably 20 to 150 µm, and particularly preferably 20 to 100 µm. Cells formed by the macropores and the openings serve as flow passages. It is preferable that the continuous macropore structure be a uniform structure in which the macropores have a uniform size and the openings have a uniform diameter. Note that some non-uniform macropores that are larger than the uniform macropores may be included in the uniform structure. If the average diameter of the openings is less than 20 µm, the pressure loss may increase when fluid permeates (passes through) the monolithic body. If the average diameter of the openings is too large, fluid may not sufficiently come in contact with the monolithic body, so that the adsorption characteristics may deteriorate. The average diameter of the mesopores refers to the maximum value of a pore distribution curve determined by mercury porosimetry. JP-A-2002-306976 states that the openings of the monolithic body have an average diameter of 1 to 1000 µm. When producing a monolithic body having a small total pore volume of 5 ml/g or less, however, it is necessary to reduce the amount of water droplets in the water-in-oil emulsion (i.e., the average diameter of the openings is reduced). Therefore, it is substantially impossible to produce a monolithic body in which the openings have an average diameter of 20 µm or more.

The monolithic body according to one embodiment of the present invention has a novel structure having a large opening diameter and a thick skeleton. The presence or absence of such a thick skeleton may be confirmed using an SEM image (secondary electron image obtained using a scanning electron microscope) of the section of the continuous macropore structure (in a dry state). The area of the skeleton observed within an SEM image of the section of the monolithic body is normally 25 to 50%, and preferably 25 to 45%. If the area of the skeleton observed within the SEM image is less than 25% (i.e., the skeleton is thin), the adsorption capacity per unit volume may decrease. If the area of the skeleton observed within the SEM image exceeds 50% (i.e., the skeleton is too thick), uniform adsorption characteristics may not be obtained. Note that the maximum area of the skeleton observed within the SEM image of the section of the monolithic body disclosed in JP-A-2002-306976 cannot exceed 25%, since the mixing ratio of the oil phase to water is limited (i.e., the size of the skeleton is limited) in order to obtain openings.

Figure 7:
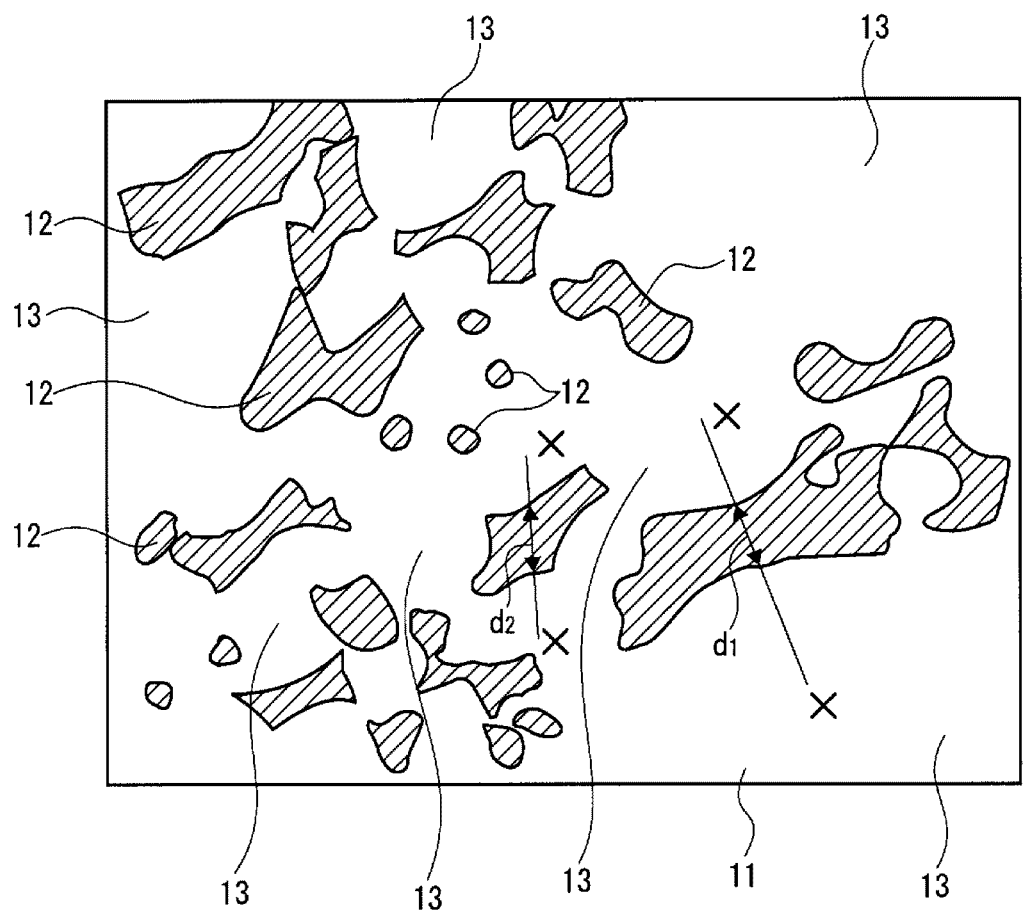
Figure 8:
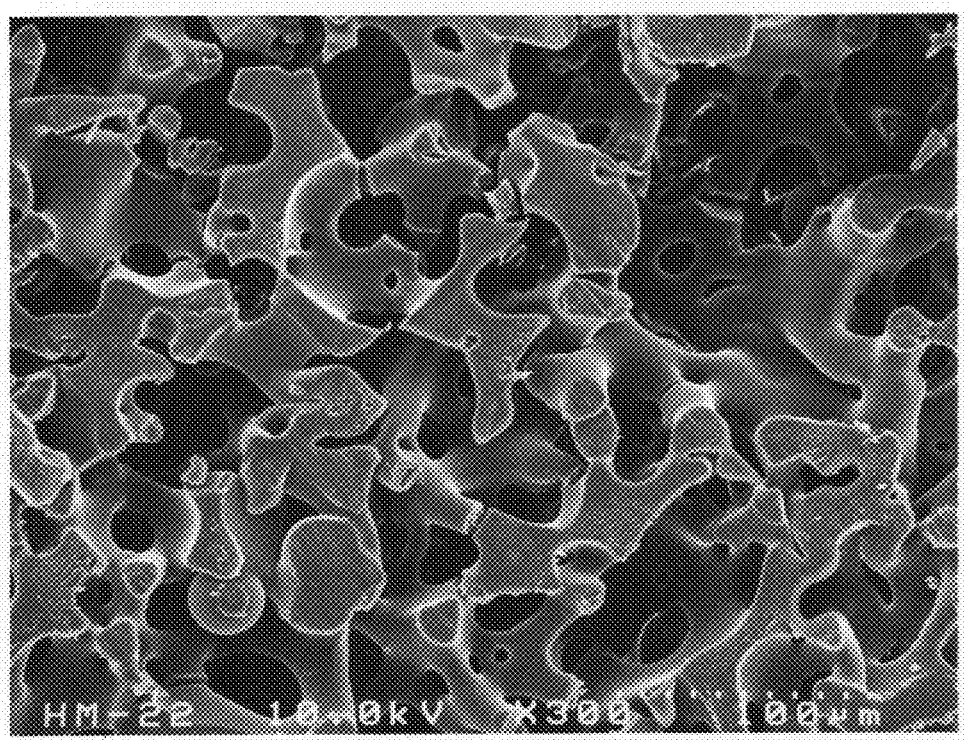
Figure 9:
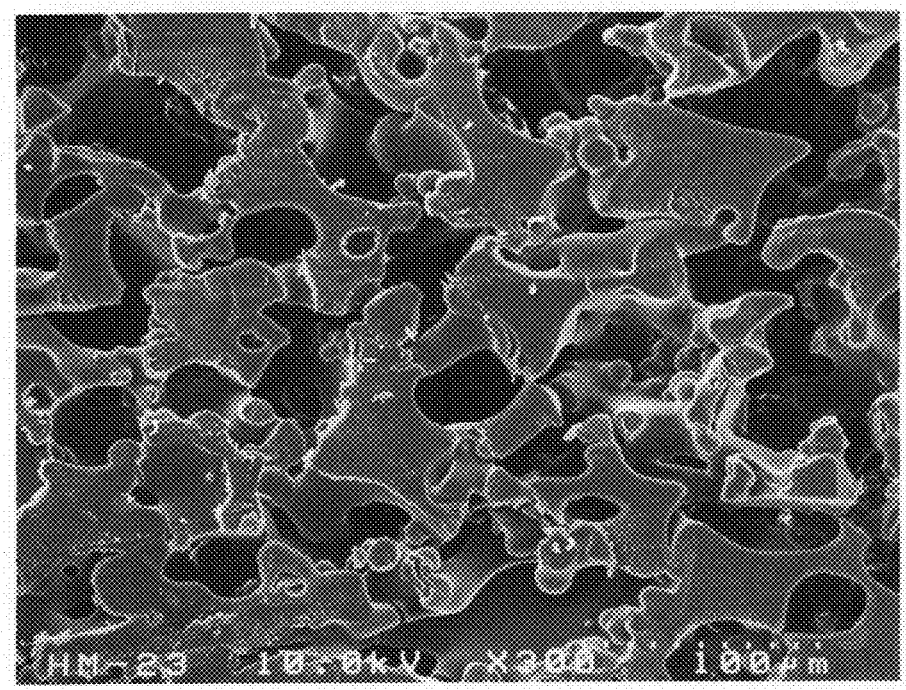
Figure 10:
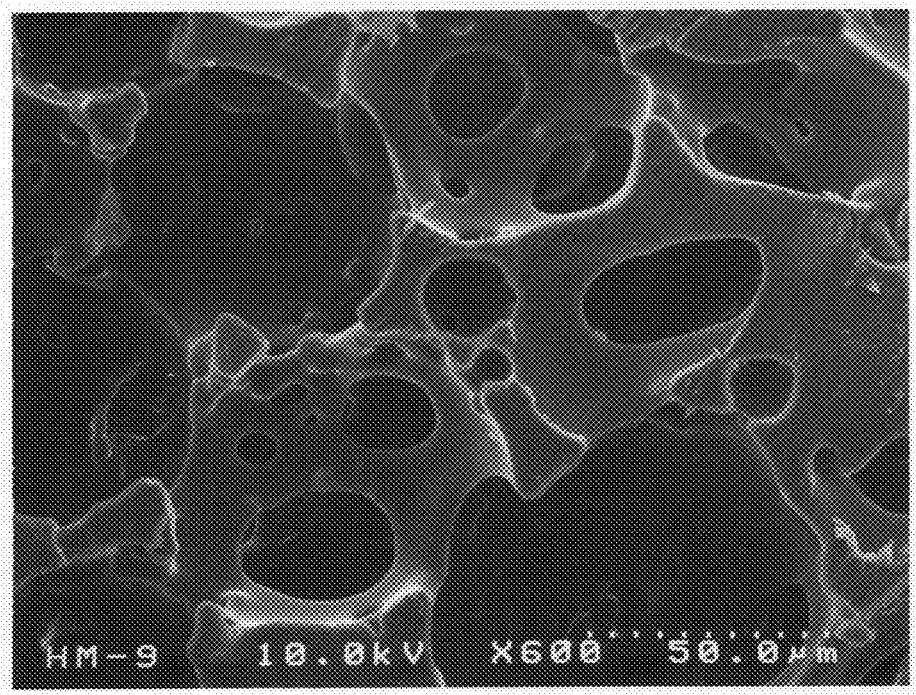
Figure 11:
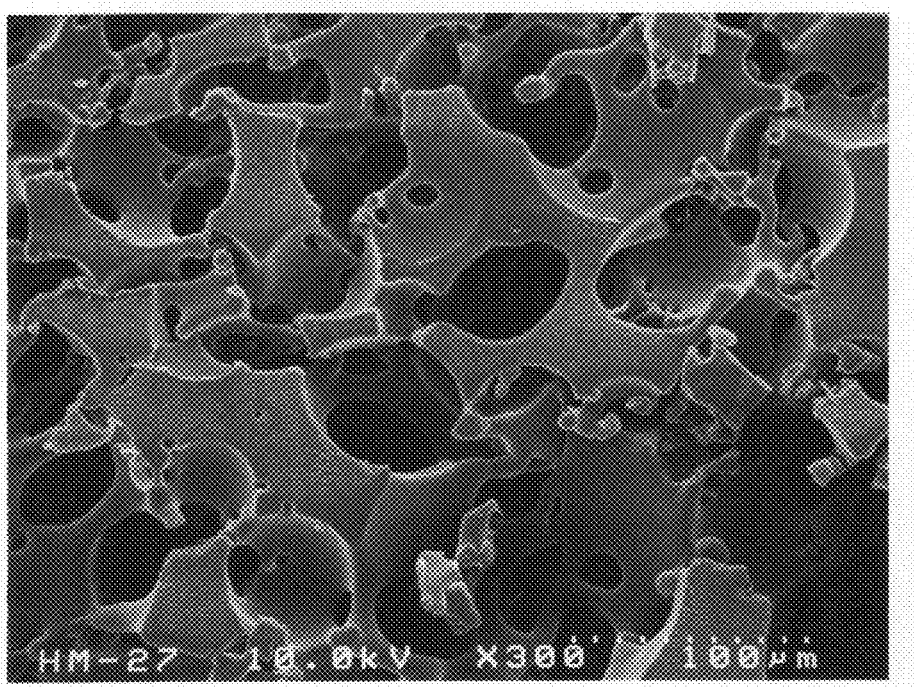
Figure 12:
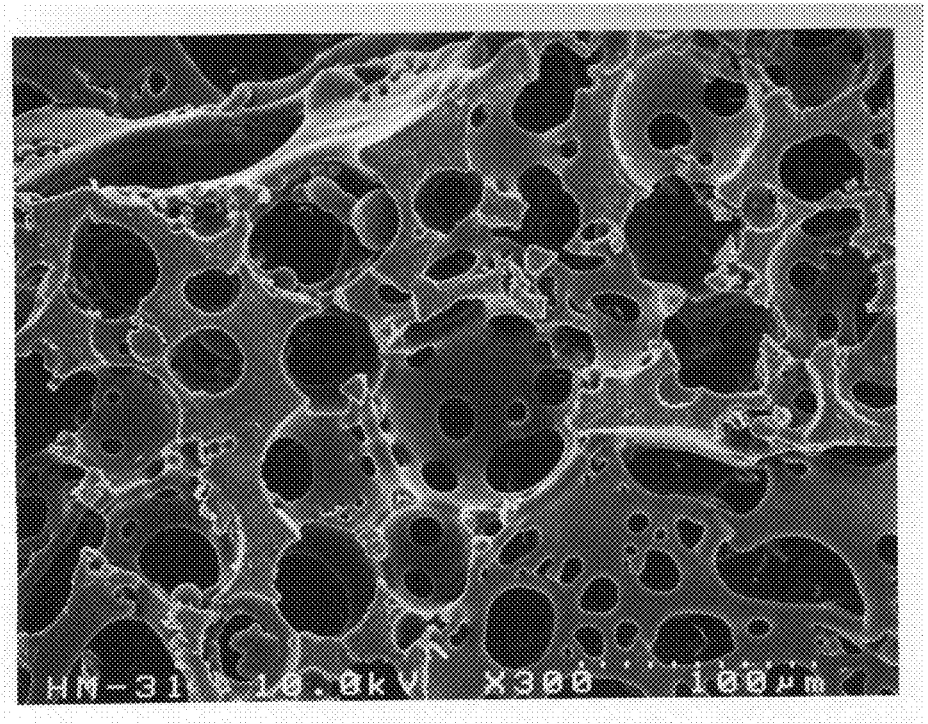
Figure 13:
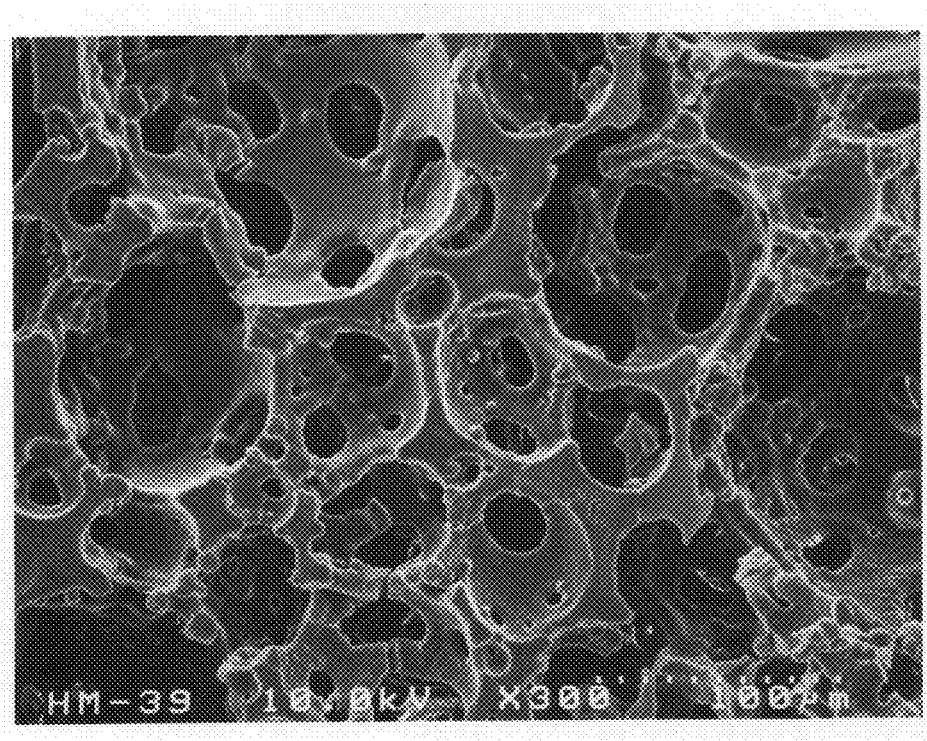
Figure 14:
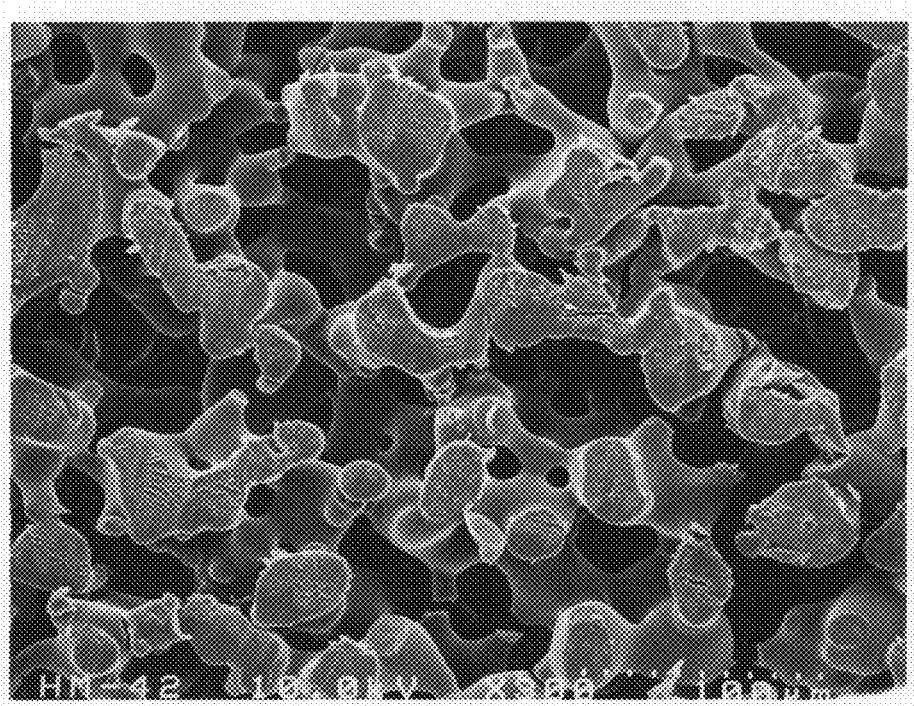
Figure 15:
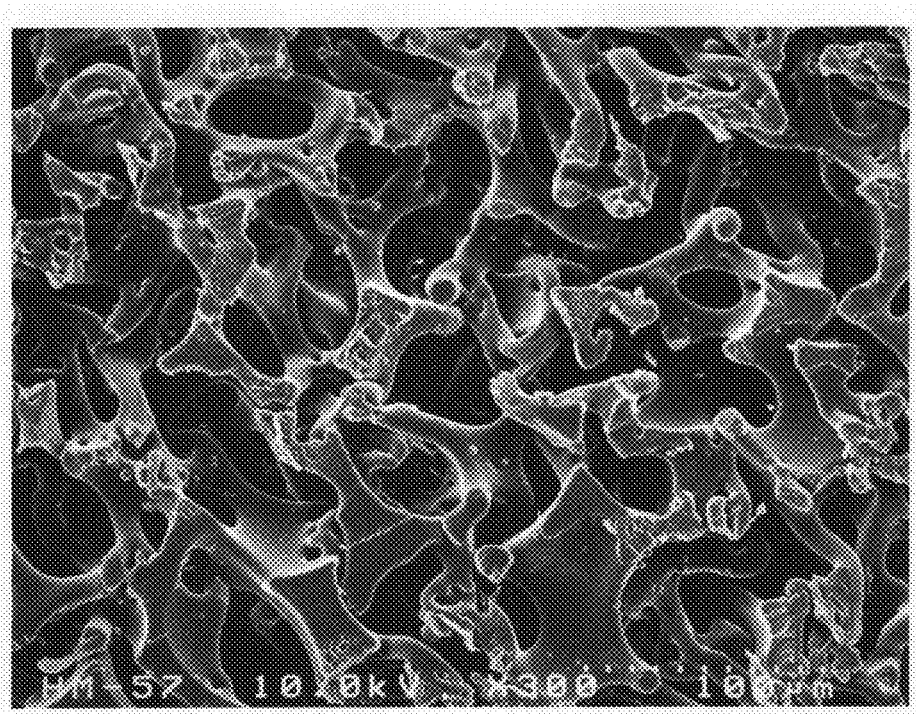
Figure 16:
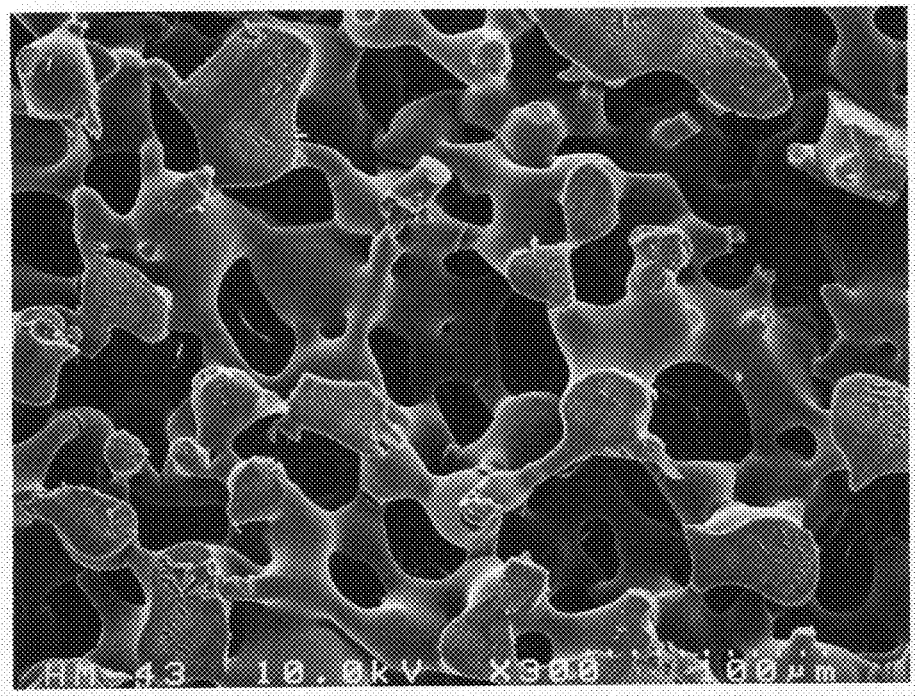
Figure 17:
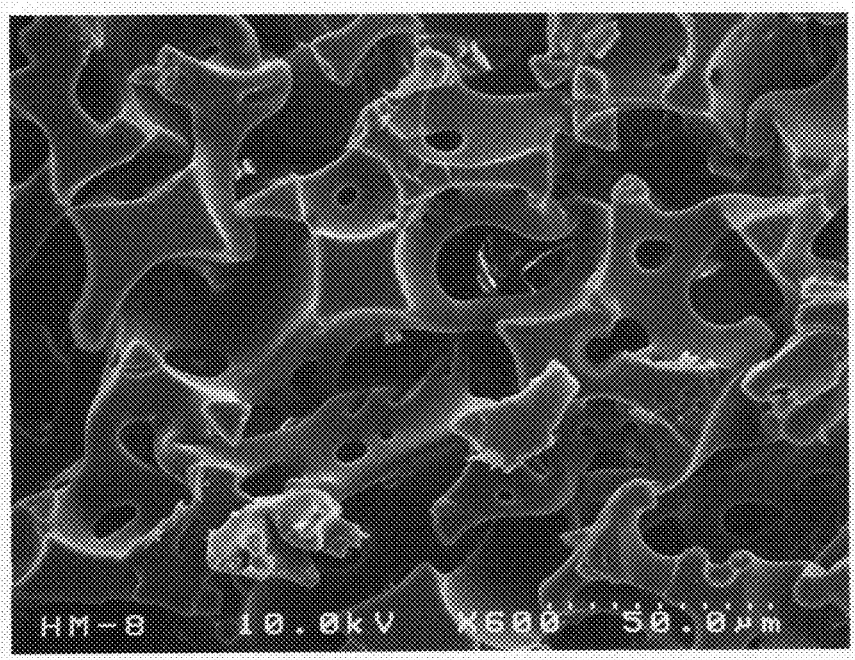

The SEM image is obtained under conditions whereby the skeleton is clearly observed within the section. For example, the magnification is 100 to 600, and the image area is about 150×100 mm. It is preferable to use three or more SEM images (more preferably five or more SEM images) that are obtained by photographing an arbitrary area of an arbitrary section of the monolithic body in different sections and photographing areas. The monolithic body in a dry state is cut and photographed using an electron microscope. A skeleton observed within an SEM image of the section of the monolithic body is described below with reference to FIGS. 1 and 7. FIG. 7 schematically shows the skeleton observed within the SEM image shown in FIG. 1. In FIGS. 1 and 7, an area that has an irregular shape and is observed in section is the skeleton (reference numeral 12 in FIG. 7) observed within the section, a circular area observed in FIG. 1 is the opening (mesopore), and an area that has a relatively large curvature or a relatively large curve is the macropore (reference numeral 13 in FIG. 7). The area of the skeleton accounts for 28% of the section (i.e., a rectangular photographed area 11) shown in FIG. 7. The skeleton can thus be clearly identified.

The area of the skeleton observed within the SEM image of the section of the monolithic body may be measured by an arbitrary method. For example, the skeleton may be identified by computer processing or the like, and the area of the skeleton may be calculated automatically (e.g., using a computer) or manually. When manually calculating the area of the skeleton, an area that has an irregular shape may be substituted with a quadrangle, a triangle, a circle, a trapezoid, or the like, and the total area of these figures may be calculated.

The wall section that forms the skeleton of the continuous macropore structure of the monolithic body according to one embodiment of the present invention has a thickness of about 20 to 200 µm. Note that the thickness of the wall section refers to the thickness ($d_1$ or $d_2$ in FIG. 7) of a wall that defines two adjacent macropores along a line (i.e., a line X-X in FIG. 7) that connects the centers of the macropores. For example, a pillar section that is enclosed by three or more adjacent macropores is excluded from the term "wall section". If the thickness of the wall section is less than 20 µm, the adsorption capacity per unit volume may decrease. If the thickness of the wall section exceeds 200 µm, uniform adsorption characteristics may not be obtained. It is preferable to determine the thickness of the wall section of the organic porous body by obtaining at least three SEM images, and measuring the thickness of the wall section in five or more areas of the resulting image. Note that the maximum thickness of the wall section of the monolithic body disclosed in JP-A-2002-306976 is 10 µm when the total pore volume is 5 ml/g or less due to limitations to the W/O emulsion.

The monolithic body according to one embodiment of the present invention has a total pore volume of 0.5 to 5 ml/g, and preferably 0.8 to 4 ml/g. If the total pore volume of the monolithic body is too small, the pressure loss may increase when fluid permeates (passes through) the monolithic body. Moreover, the amount of fluid that permeates the monolithic body per unit cross-sectional area may decrease (i.e., the fluid treatment capacity may decrease). If the total pore volume of the monolithic body is too large, the adsorption capacity per unit volume may decrease. Since the monolithic body according to one embodiment of the present invention has an average opening diameter and a total pore volume within the above range, and has a thick skeleton, the monolithic body ensures a large contact area with fluid and smooth distribution of fluid when used as an adsorbent.

The pressure loss that occurs when passing water through a column filled with the porous body (height: 1 m) at a linear velocity (LV) of 1 m/h (hereinafter referred to as "differential pressure coefficient") is in the range of 0.005 to 0.1 MPa/m·LV, and preferably 0.005 to 0.05 MPa/m·LV.

The skeleton of the continuous macropore structure of the monolithic body according to one embodiment of the present invention is formed of an organic polymer material having a crosslinked structure. The crosslink density of the polymer material is not particularly limited. It is preferable that the polymer material includes a crosslinked structural unit in an amount of 0.3 to 50 mol %, and more preferably 0.3 to 5 mol %, based on the total constituent units of the polymer material. If the crosslinked structural unit content is less than 0.3 mol %, the mechanical strength of the monolithic body may be insufficient. If the crosslinked structural unit content exceeds 50 mol %, the porous body may become brittle (i.e., flexibility may be lost). Especially in the case of producing an ion exchanger, excess amount of crosslinked structural unit should preferably be avoided as it may decrease the amount of ion-exchange group to be introduced. The type of the polymer material is not particularly limited. Examples of the polymer material include crosslinked polymers such as aromatic vinyl polymers such as polystyrene, poly($\alpha$-methylstyrene), polyvinyltoluene, polyvinylbenzyl chloride, polyvinyl biphenyl, and polyvinylnaphthalene; polyolefins such as polyethylene and polypropylene; poly(halogenated polyolefins) such as polyvinyl chloride and polytetrafluoroethylene; nitrile polymers such as polyacrylonitrile; and (meth)acrylic polymers such as polymethyl methacrylate, polyglycidyl methacrylate, and polyethyl acrylate. These polymers may be a polymer obtained by polymerizing one type of vinyl monomer in the presence of a crosslinking agent, a polymer obtained by polymerizing a plurality of types of vinyl monomers in the presence of a crosslinking agent, or a blend of two or more polymers. Among these, a crosslinked aromatic vinyl polymer (particularly a styrene-divinylbenzene copolymer or a vinylbenzyl chloride-divinylbenzene copolymer) is preferable from the viewpoint of ease of formation of a continuous macropore structure, ease of introduction of an ion-exchange group, high mechanical strength, and excellent stability to acid and alkali.

The monolithic body according to one embodiment of the present invention has a thickness of 1 mm or more (i.e., is distinguished from a film-shaped (membrane-shaped) porous body). If the thickness of the monolithic body is less than 1 mm, the adsorption capacity of the porous body may significantly decrease. The monolithic body preferably has a thickness of 3 to 1000 mm. The monolithic body according to one embodiment of the present invention has high mechanical strength due to a thick skeleton.

When using the monolithic body according to one embodiment of the present invention as an adsorbent, a cylindrical column or a rectangular column is charged with the monolithic body (adsorbent) that has been cut into a shape corresponding to the shape of the column, and target water that contains a hydrophobic substance (e.g., benzene, toluene, phenol, or paraffin) is passed through the column. The hydrophobic substance is thus efficiently adsorbed on the adsorbent.

Monolithic Ion Exchanger

A monolithic ion exchanger according to one embodiment of the present invention is described below. The differences between the monolithic ion exchanger and the monolithic body are mainly described below. The monolithic ion exchanger according to one embodiment of the present invention has a continuous macropore structure in which cellular macropores overlap to form openings (mesopores) having an average diameter of 30 to 300 µm, preferably 30 to 200 µm, and particularly preferably 35 to 150 µm. The average diameter of the openings of the monolithic ion exchanger is larger than that of the monolithic body since the entire monolithic body swells when introducing an ion-exchange group into the monolithic body. If the average diameter of the openings is less than 30 µm, the pressure loss may increase when fluid permeate (passes through) the monolithic ion exchanger. If the average diameter of the openings is too large, fluid may not sufficiently come in contact with the monolithic ion exchanger, so that the ion-exchange characteristics may deteriorate. The average diameter of the openings of the monolithic ion exchanger is calculated by multiplying the average diameter of the openings of the porous body before introducing an ion-exchange group by the swelling rate of the porous body due to introduction of an ion-exchange group.

The area of the skeleton observed within an SEM image of the section of the continuous macropore structure of the monolithic ion exchanger is normally 25 to 50%, and preferably 25 to 45%. If the area of the skeleton observed within the SEM image is less than 25% (i.e., the skeleton is thin), the ion-exchange capacity per unit volume may decrease. If the area of the skeleton observed within the SEM image exceeds 50% (i.e., the skeleton is too thick), uniform ion-exchange characteristics may not be obtained. The skeleton is identified, and the area of the skeleton is measured in the same manner as described above.

The wall section that forms the skeleton of the continuous macropore structure of the monolithic ion exchanger has a thickness of about 30 to 300 µm. If the thickness of the wall section is less than 30 µm, the ion-exchange capacity per unit volume may decrease. If the thickness of the wall section exceeds 300 µm, uniform ion-exchange characteristics may not be obtained. The wall section of the monolithic ion exchanger is defined, and the thickness of the wall section is measured in the same manner as described above.

The total pore volume of the monolithic ion exchanger may be the same as that of the monolithic body. Specifically, even if the diameter of the openings has increased due to swelling upon introduction of an ion-exchange group into the monolithic body, the total pore volume changes to only a small extent since the thickness of the skeleton increases. If the total pore volume of the monolithic ion exchanger is less than 0.5 ml/g, the pressure loss may increase when fluid permeates (passes through) the monolithic ion exchanger. Moreover, the amount of fluid that permeates the monolithic ion exchanger per unit cross-sectional area may decrease (i.e., the fluid treatment capacity may decrease). If the total pore volume of the monolithic ion exchanger exceeds 5 ml/g, the ion-exchange capacity per unit volume may decrease.

The pressure loss that occurs when passing water through the monolithic ion exchanger may be the same as that of the monolithic body.

The monolithic ion exchanger according to one embodiment of the present invention has an ion-exchange capacity per unit volume of 0.4 mg equivalent/ml or more, and preferably 0.4 to 1.8 mg equivalent/ml, in water-wet conditions. The monolithic organic porous ion exchanger disclosed in JP-A-2002-306976 that has a continuous macropore structure differing from that of the monolithic ion exchanger according to one embodiment of the present invention has an increased total pore volume when the diameter of the openings is decreased in order to achieve a low pressure loss required for practical applications, so that the ion-exchange capacity per unit volume decreases. If the total pore volume is increased in order to increase the ion-exchange capacity per unit volume, the pressure loss increases due to a decrease in diameter of the openings. Since the monolithic ion exchanger according to one embodiment of the present invention can be increased in the diameter of the openings and as, well as in the thickness of the skeleton (wall section) of the continuous macropore structure, the ion-exchange capacity per unit volume can be significantly increased while suppressing an increase in pressure loss. If the ion-exchange capacity per unit volume is less than 0.4 mg equivalent/ml, the amount of ion-containing water that can be treated (i.e., deionized water production capacity) until a breakthrough occurs may decrease. The ion-exchange capacity per unit weight of the monolithic ion exchanger according to one embodiment of the present invention is not particularly limited, but is normally 3 to 5 mg equivalent/g since ion-exchange groups are uniformly introduced into the surface and the skeleton of the porous body. Note that the ion-exchange capacity of a porous body in which ion-exchange groups are introduced into only the surface thereof is determined depending on the type of the porous body and the type of the ion-exchange group, but is normally 500 µg equivalent/g or less.

Examples of the ion-exchange group introduced into the monolithic body according to one embodiment of the present invention include cation-exchange groups such as a sulfonic acid group, a carboxylic acid group, an iminodiacetic acid group, a phosphoric acid group, and a phosphate group; anion-exchange groups such as a quaternary ammonium group, a tertiary amino group, a secondary amino group, a primary amino group, a polyethylene imine group, a tertiary sulfonium group, and a phosphonium group; and amphoteric ion-exchange groups such as an aminophosphoric acid group and a sulfobetaine.

The ion-exchange groups introduced into the monolithic ion exchanger are uniformly distributed on the surface and the inside of the skeleton of the porous body. The expression "ion-exchange groups are uniformly distributed" used herein means that the ion-exchange groups are uniformly distributed on the surface and the inside of the skeleton of the porous body in the order of µm. The distribution of the ion-exchange groups may be relatively easily determined by EPMA or the like. When the ion-exchange groups are uniformly distributed on the surface and the inside of the skeleton of the porous body (monolithic body), the surface and the skeleton of the porous body have uniform physical and chemical properties, so that durability against swelling and shrinkage is improved.

The monolithic body according to one embodiment of the present invention may be obtained by performing steps I to III. In the step I, a mixture of an oil-soluble monomer that does not include an ion-exchange group, a surfactant, and water is stirred to prepare a water-in-oil emulsion, and the water-in-oil emulsion is polymerized to obtain a monolithic intermediate body that has a continuous macropore structure and has a total pore volume of 5 to 16 ml/g. The step I may be performed in accordance with the method disclosed in JP-A-2002-306976.

Method of Producing Monolithic Intermediate Body

Examples of the oil-soluble monomer that does not include an ion-exchange group include a lipophilic monomer that does not include an ion-exchange group (e.g., carboxylic acid group, sulfonic acid group, or quaternary ammonium group), and has low solubility in water. Examples of a preferable oil-soluble monomer that does not include an ion-exchange group include styrene, α-methylstyrene, vinyltoluene, vinylbenzyl chloride, divinylbenzene, ethylene, propylene, isobutene, butadiene, ethylene glycol dimethacrylate, and the like. These monomers may be used either individually or in combination. Note that it is preferable to use a crosslinkable monomer (e.g., divinylbenzene or ethylene glycol dimethacrylate) in an amount of 0.3 to 50 mol %, and preferably 0.3 to 5 mol %, based on the total amount of the oil-soluble monomer in order to obtain mechanical strength necessary when introducing a large amount (number) of ion-exchange groups.

The surfactant is not particularly limited insofar as a water-in-oil (W/O) emulsion is obtained by mixing the oil-soluble monomer that does not include an ion-exchange group and water. Examples of the surfactant include nonionic surfactants such as sorbitan monooleate, sorbitan monolaurate, sorbitan monopalmitate, sorbitan monostearate, sorbitan trioleate, polyoxyethylene nonyl phenyl ether, polyoxyethylene stearyl ether, and polyoxyethylene sorbitan monooleate; anionic surfactants such as potassium oleate, sodium dodecylbenzenesulfonate, and sodium dioctyl sulfosuccinate; cationic surfactants such as distearyl dimethylammonium chloride; and amphoteric surfactants such as lauryldimethyl betaine. These surfactants may be used either individually or in combination. The term "water-in-oil emulsion" used herein refers to an emulsion in which water droplets are dispersed in a continuous oil phase. The amount of the surfactant used differs depending on the type of the oil-soluble monomer and the size of the desired emulsion particles (macropores), but is normally selected within the range of about 2 to 70% based on the total amount of the oil-soluble monomer and the surfactant.

In the step I, an initiator may optionally be used when producing the water-in-oil emulsion. A compound that generates radicals due to application of heat or light may suitably be used as the initiator. The initiator may be water-soluble or oil-soluble. Examples of the initiator include azobisisobutyronitrile, azobiscyclohexanenitrile, azobiscyclohexanecarbonitrile, benzoyl peroxide, potassium persulfate, ammonium persulfate, hydrogen peroxide-ferrous chloride, sodium persulfate-sodium hydrogen sulfite, tetramethylthiuram disulfide, and the like.

When mixing the oil-soluble monomer that does not include an ion-exchange group, the surfactant, water, and the initiator to prepare a water-in-oil emulsion, the components may be mixed all together, or a mixture of the oil-soluble components (i.e., oil-soluble monomer, surfactant, and oil-soluble initiator) and a mixture of the water-soluble components (i.e., water and water-soluble initiator) may be mixed, for example. The emulsion may be produced using an arbitrary apparatus. A mixer, a homogenizer, a high-pressure homogenizer, or the like may be appropriately used so that an emulsion having the desired particle size is obtained. The mixing conditions (e.g., stirring speed and stirring time) may be arbitrarily selected so that an emulsion having the desired particle size is obtained.

The monolithic intermediate body obtained by the step I has a continuous macropore structure. When the monolithic intermediate body is present in the polymerization system, a porous structure that has a thick skeleton is formed based on the structure of the monolithic intermediate body as a mold. The monolithic intermediate body is formed of an organic polymer material that has a crosslinked structure. The crosslink density of the polymer material is not particularly limited. It is preferable that the polymer material include a crosslinked structural unit in an amount of 0.3 to 50 mol %, and more preferably 0.3 to 5 mol %, based on the total constituent units of the polymer material. If the crosslinked structural unit content is less than 0.3 mol %, the mechanical strength of the monolithic intermediate body may be insufficient. In particular, when the total pore volume is 10 to 16 ml/g, it is preferable that the crosslinked structural unit content be 2 mol % or more in order to maintain the continuous macropore structure. If the crosslinked structural unit content exceeds 50 mol %, the porous body may become brittle (i.e., flexibility may be lost).

The polymer material used to produce the monolithic intermediate body may be the same as the polymer material used to produce the monolithic body. In this case, the skeleton of the monolithic intermediate body may be formed of the same polymer as that of the monolithic body, so that a monolithic body having a uniform skeletal structure can be obtained.

The monolithic intermediate body has a total pore volume of 5 to 16 ml/g, and preferably 6 to 16 ml/g. If the total pore volume of the monolithic intermediate body is too small, a monolithic body obtained by polymerizing the vinyl monomer may have a small total pore volume, so that the pressure loss may increase when fluid permeates (passes through) the monolithic body. If the total pore volume of the monolithic intermediate body is too large, a monolithic body obtained by polymerizing the vinyl monomer may deviate from the criteria of a continuous macropore structure. The total pore volume of the monolithic intermediate body may be adjusted within the above range by adjusting the ratio of the monomer to water to about 1:5 to about 1:20.

The openings (mesopores) of the monolithic intermediate body formed by the overlapping macropores have an average diameter of 20 to 200 µm. If the average diameter of the openings is less than 20 µm, openings of a monolithic body obtained by polymerizing the vinyl monomer may have a small diameter, so that the pressure loss may increase when fluid permeates (passes through) the monolithic body. If the average diameter of the openings exceeds 200 µm, fluid may not sufficiently come in contact with the monolithic body or the monolithic ion exchanger, so that the adsorption characteristics or the ion-exchange characteristics may deteriorate. The monolithic intermediate body preferably has a uniform structure in which the macropores and the openings have a uniform diameter (size). Note that some non-uniform macropores that are larger than the uniform macropores may be included in the uniform structure.

Method of Producing Monolithic Body

In the step II, a vinyl monomer, a crosslinking agent that includes at least two vinyl groups in one molecule, an organic solvent that dissolves the vinyl monomer and the crosslinking agent, but does not dissolve a polymer produced by polymerizing the vinyl monomer, and an initiator are mixed. Note that the step II may be performed before or after the step I.

The vinyl monomer used in the step II is not particularly limited insofar as the vinyl monomer is a lipophilic vinyl monomer that includes a polymerizable vinyl group in the molecule, and has high solubility in an organic solvent. It is preferable to select the same vinyl monomer as that used to produce the monolithic intermediate body, or a similar polymer material. Specific examples of the vinyl monomer include aromatic vinyl monomers such as styrene, α-methylstyrene, vinyltoluene, vinylbenzyl chloride, vinylbiphenyl, and vinylnaphthalene; α-olefins such as ethylene, propylene, 1-butene, and isobutene; diene monomers such as butadiene, isoprene, and chloroprene; halogenated olefins such as vinyl chloride, vinyl bromide, vinylidene chloride, and tetrafluoroethylene; nitrile monomers such as acrylonitrile and methacrylonitrile; vinyl esters such as vinyl acetate and vinyl propionate; and (meth)acrylic monomers such as methyl acrylate, ethyl acrylate, butyl acrylate, 2-ethylhexyl acrylate, methyl methacrylate, ethyl methacrylate, propyl methacrylate, butyl methacrylate, 2-ethylhexyl methacrylate, cyclohexyl methacrylate, benzyl methacrylate, and glycidyl methacrylate. These monomers may be used either individually or in combination. Among these, aromatic vinyl monomers such as styrene and vinylbenzyl chloride are preferable.

The vinyl monomer is used in an amount 3 to 40 times (by weight), and preferably 4 to 30 times the amount of the monolithic intermediate body used as a mold in the polymerization process. If the amount of the vinyl monomer is less than 3 times the amount of the monolithic intermediate body (porous body), the thickness of the skeleton (wall section) of the resulting monolithic body may be insufficient. As a result, the adsorption capacity per unit volume or the ion-exchange capacity per unit volume after introducing an ion-exchange group may decrease. If the amount of the vinyl monomer exceeds 40 times the amount of the monolithic intermediate body (porous body), the pressure loss may increase when fluid permeates (passes through) the monolithic body due to a decrease in the diameter of the openings.

The crosslinking agent used in the step II preferably includes at least two polymerizable vinyl groups in the molecule, and has high solubility in an organic solvent. Specific examples of the crosslinking agent include divinylbenzene, divinylnaphthalene, divinylbiphenyl, ethylene glycol dimethacrylate, trimethylolpropane triacrylate, butanediol diacrylate, and the like. These crosslinking agents may be used either individually or in combination. It is preferable to use an aromatic polyvinyl compound (e.g., divinylbenzene, divinylnaphthalene, or divinylbiphenyl) as the crosslinking agent due to high mechanical strength and excellent stability to hydrolysis. The crosslinking agent is used in an amount of 0.3 to 50 mol %, and preferably 0.3 to 5 mol %, based on the total amount of the vinyl monomer and the crosslinking agent. If the amount of the crosslinking agent is less than 0.3 mol %, the mechanical strength of the monolithic body may be insufficient. If the amount of the crosslinking agent exceeds 50 mol %, the monolithic body may become brittle (i.e., flexibility may be lost), or the amount (number) of ion-exchange groups introduced may decrease. The amount of crosslinking agent is preferably selected so that a crosslink density almost the same as the crosslink density of the monolithic intermediate body used as a mold in the polymerization is obtained. If the amount of the crosslinking agent used in the step II significantly differs from that used in the step I (the intermediate production), non-uniform crosslink density distribution could occur that may lead to cracking of the monolithic body during the introduction of ion exchange groups.

The organic solvent used in the step II dissolves the vinyl monomer and the crosslinking agent, but does not dissolve a polymer produced by polymerizing the vinyl monomer (i.e., a poor solvent for a polymer produced by polymerizing the vinyl monomer). A different organic solvent is used depending on the type of the vinyl monomer. Examples of the organic solvent used when the vinyl monomer is styrene include alcohols such as methanol, ethanol, propanol, butanol, hexanol, cyclohexanol, octanol, 2-ethylhexanol, decanol, dodecanol, ethylene glycol, propylene glycol, tetramethylene glycol, and glycerol; chain (poly)ethers such as diethyl ether, ethylene glycol dimethyl ether, cellosolve, methyl cellosolve, butyl cellosolve, polyethylene glycol, polypropylene glycol, and polytetramethylene glycol; chain saturated hydrocarbons such as hexane, heptane, octane, isooctane, decane, and dodecane; and esters such as ethyl acetate, isopropyl acetate, cellosolve acetate, and ethyl propionate. A good solvent for polystyrene (e.g., dioxane, THF, or toluene) may also be used as the organic solvent insofar as the good solvent is used in a small amount together with the poor solvent. The organic solvent is preferably used so that the concentration of the vinyl monomer is 30 to 80 wt %. If the concentration of the vinyl monomer is less than 30 wt %, the polymerization rate may decrease, or a monolithic body obtained by polymerization may not have a structure that falls within the scope of the present invention. If the concentration of the vinyl monomer exceeds 80 wt %, runaway polymerization may occur.

A compound that generates radicals due to application of heat or light may suitably be used as the initiator. It is preferable that the initiator be oil-soluble. Specific examples of the initiator include 2,2'-azobis(isobutylonitrile), 2,2'-azobis(2,4-dimethylvaleronitrile), 2,2'-azobis(2-methylbutyronitrile), 2,2'-azobis(4-methoxy-2,4-dimethylvaleronitrile), dimethyl 2,2'-azobisisobutyrate, 4,4'-azobis(4-cyanovaleric acid), 1,1'-azobis(cyclohexane-1-carbonitrile), benzoyl peroxide, lauroyl peroxide, potassium persulfate, ammonium persulfate, tetramethylthiuram disulfide, and the like. The initiator is used in an appropriate amount depending on the type of monomer, the polymerization temperature, and the like. The initiator may be used in an amount of about 0.01 to 5% based on the total amount of the vinyl monomer and the crosslinking agent.

In the step III, the mixture obtained by the step II is polymerized in the presence of the monolithic intermediate body obtained by the step I to obtain a monolithic body having a skeleton thicker than that of the monolithic intermediate body. The monolithic intermediate body used in the step III is important for producing a monolithic body having the novel structure according to the present invention. For example, JP-T-7-501140 discloses that a particle aggregation-type monolithic organic porous body is obtained by polymerizing a vinyl monomer in a specific organic solvent using a crosslinking agent in the absence of a monolithic intermediate body. On the other hand, when the monolithic intermediate body having a continuous macropore structure is present in the polymerization system, a monolithic body obtained by polymerization has a structure (i.e., a thick skeleton) that significantly differs from the particle aggregation-type structure in which the particles no longer can be seen. It is conjectured that a crosslinked polymer produced by polymerization precipitates in the shapes of particles when the monolithic intermediate body is absent so that a particle aggregation-type structure is obtained, while the vinyl monomer and the crosslinking agent (liquid phase) are adsorbed on or distributed in the skeleton of the porous body when the porous body (intermediate body) is present in the polymerization system, and polymerization proceeds inside the porous body so that a monolithic body having a thick skeleton is obtained. Note that the diameter of the openings decreases due to polymerization. However, since the monolithic intermediate body has a large total pore volume, the openings have a moderate diameter even if the thickness of the skeleton has increased.

A reaction vessel having an arbitrary internal volume may be used insofar as the monolithic intermediate body can be put in the reaction vessel. A reaction vessel in which the monolithic intermediate body is loosely placed when viewed from above, or a reaction vessel in which the monolithic intermediate body can be tightly placed when viewed from above, may be used. It is efficient to use a reaction vessel in which the monolithic intermediate body can be tightly placed, but is not pressed by the inner wall thereof after polymerization, since the monolithic body is not deformed, and the reaction raw material can be efficiently used. Even if a space is formed between the reaction vessel and the monolithic body after polymerization, since the vinyl monomer and the crosslinking agent are adsorbed on or distributed in the monolithic intermediate body, particles do not aggregate inside the reaction vessel.

In the step III, the monolithic intermediate body is impregnated with (immersed in) the mixture (solution) inside the reaction vessel. The mixing ratio of the mixture obtained by the step II and the monolithic intermediate body is preferably determined so that the vinyl monomer is used in an amount 3 to 40 times (by weight), and preferably 4 to 30 times the amount of the monolithic intermediate body. This makes it possible to obtain a monolithic body that has a thick skeleton and a moderate opening diameter. The vinyl monomer and the crosslinking agent in the mixture are adsorbed on or distributed in the skeleton of the monolithic intermediate body, and polymerization proceeds inside the skeleton of the monolithic intermediate body.

The polymerization conditions may be appropriately selected depending on the types of monomer and initiator. For example, when using 2,2'-azobis(isobutyronitrile), 2,2'-azobis(2,4-dimethylvaleronitrile), benzoyl peroxide, lauroyl peroxide, potassium persulfate, or the like as the polymerization initiator, the emulsion may be polymerized in a sealed vessel at 30 to 100° C. for 1 to 48 hours in an inert atmosphere. The vinyl monomer and the crosslinking agent adsorbed on or distributed in the skeleton of the monolithic intermediate body undergo polymerization due to heating so that a thick skeleton is obtained. After completion of polymerization, the resulting product is removed, and extracted with a solvent such as acetone to remove unreacted vinyl monomer and the organic solvent to obtain a monolithic body having a thick skeleton.

Method of Producing Monolithic Ion Exchanger

A method of producing the monolithic ion exchanger according to one embodiment of the present invention is described below. The monolithic ion exchanger may be produced by an arbitrary method. It is preferable to produce a monolithic body by the above method, and introduce an ion-exchange group into the monolithic body in order to strictly control the porous structure of the resulting monolithic ion exchanger.

An ion-exchange group may be introduced into the monolithic body by an arbitrary method. For example, a macromolecular (polymer) reaction, graft polymerization, or the like may be used. For example, when the monolithic body is a styrene-divinylbenzene copolymer or the like, a sulfonic acid group may be introduced by sulfonating the monolithic body using chlorosulfuric acid, concentrated sulfuric acid, or fuming sulfuric acid; uniformly introducing a radical initiator group or a chain transfer group into the skeleton of the monolithic body, and graft-polymerizing sodium styrenesulfonate or acrylamide-2-methylpropanesulfonic acid; or similarly graft-polymerizing glycidyl methacrylate, and introducing a sulfonic acid group by functional group transformation. A quaternary ammonium group may be introduced by introducing a chloromethyl group using chloromethyl methyl ether or the like, and reacting the monolithic body with a tertiary amine; producing a monolithic body by copolymerizing chloromethylstyrene and divinylbenzene, and reacting the monolithic body with a tertiary amine; uniformly introducing a radical initiator group or a chain transfer group into the skeleton of the monolithic body, and graft-polymerizing N,N,N-trimethylammoniumethyl acrylate or N,N,N-trimethylammoniumpropyl acrylamide with the monolithic body; or similarly graft-polymerizing glycidyl methacrylate, and introducing a quaternary ammonium group by functional group transformation, for example. Betaine may be introduced by introducing a tertiary amine into the monolithic body by the above method, and reacting the monolithic body with monoiodoacetic acid, for example. A sulfonic acid group is preferably introduced into a styrene-divinylbenzene copolymer using chlorosulfuric acid. A quaternary ammonium group is preferably introduced by introducing a chloromethyl group into a styrene-divinylbenzene copolymer using chloromethyl methyl ether or the like, and reacting the styrene-divinylbenzene copolymer with a tertiary amine, or producing a monolithic body by copolymerizing chloromethylstyrene and divinylbenzene, and reacting the monolithic body with a tertiary amine. The ion-exchange group can be uniformly and quantitatively introduced by these methods. Examples of the ion-exchange group include cation-exchange groups such as a carboxylic acid group, an iminodiacetic acid group, a sulfonic acid group, a phosphoric acid group, and a phosphate group; anion-exchange groups such as a quaternary ammonium group, a tertiary amino group, a secondary amino group, a primary amino group, a polyethylene imine group, a tertiary sulfonium group, and a phosphonium group; and amphoteric ion-exchange groups such as an aminophosphoric acid group, betaine, and sulfobetaine.

The monolithic ion exchanger according to one embodiment of the present invention swells to have a volume 1.4 to 1.9 times the volume of the monolithic body as a result of the introduction of the ion-exchange group. Specifically, the degree of swelling of the monolithic ion exchanger according to one embodiment of the present invention is significantly greater than that of the monolithic body disclosed in JP-A-2002-306976 into which an ion-exchange group is introduced. Therefore, the diameter of the openings of the monolithic ion exchanger increases by the above factor even if the diameter of the openings of the monolithic body is small. Moreover, the total pore volume does not change even if the diameter of the openings has increased due to swelling. Therefore, the monolithic ion exchanger according to one embodiment of the present invention exhibits high mechanical strength due to the thick skeleton although the openings have a large diameter. Moreover, the ion-exchange capacity per unit volume can be increased due to the thick skeleton when the monolithic ion exchanger is in water-wet conditions, and the target water can be passed through the monolithic ion exchanger for a long time at a high flow rate under low pressure. Therefore, the monolithic ion exchanger may suitably be used for a two-bed three-tower water purifier or an electric water deionizing apparatus.

Second Aspect of the Present Invention

A product, a production method, and a chemical filter according to the second aspect of the present invention are described below.

Monolithic Body

Figure 18:
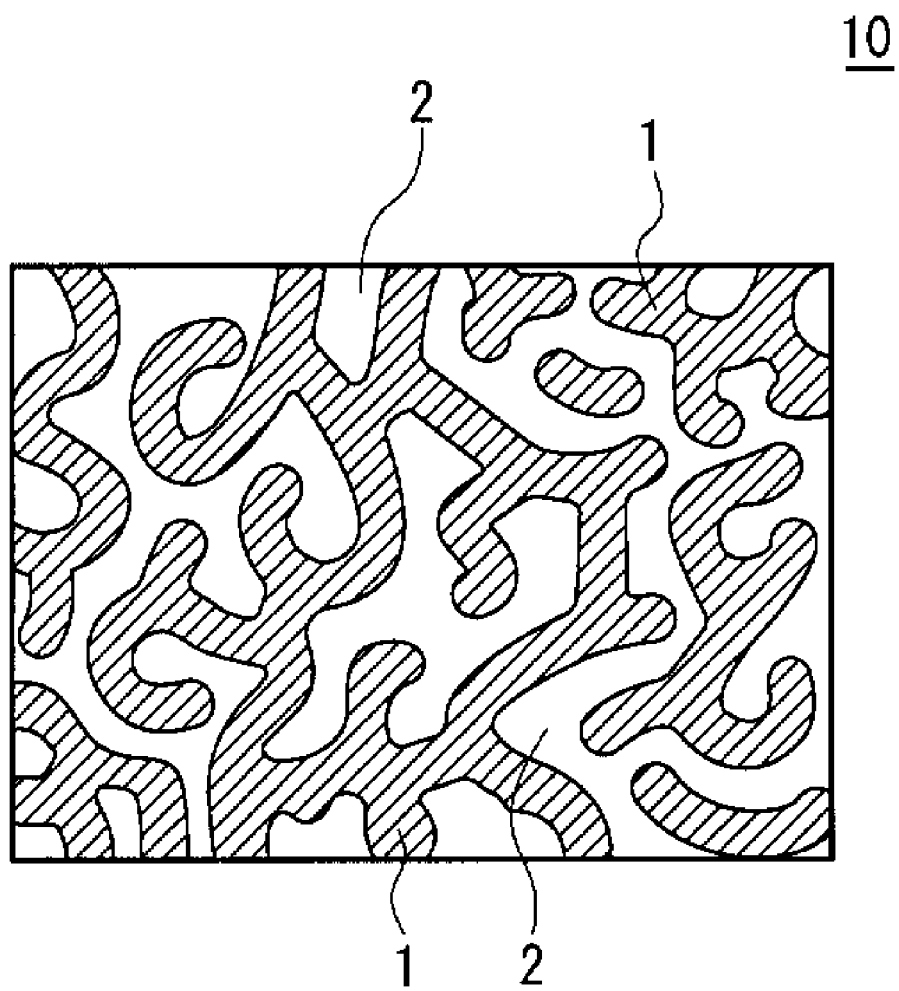
FIG. 18 is a view schematically showing the co-continuous structure of the monolithic body according to the second aspect of the present invention.

A monolithic body according to one embodiment of the present invention basically has a co-continuous structure that includes a three-dimensional continuous skeleton having a thickness of 0.8 to 40 μm, and a three-dimensional continuous hole having a diameter of 8 to 80 μm and defined by the skeleton. As shown in FIG. 18 (schematic view), a co-continuous structure 10 includes a three-dimensional continuous skeleton phase 1, and a three-dimensional continuous hole phase 2. Since the hole 2 has high continuity and uniformity as compared with an open-cell monolithic body and a particle aggregation-type monolithic body, a uniform ion-adsorption behavior can be achieved. Moreover, the monolithic body has high mechanical strength due to a thick skeleton.

If the diameter of the three-dimensional continuous hole is less than 8 μm, the pressure loss may increase when fluid permeates (passes through) the monolithic body. If the diameter of the three-dimensional continuous hole exceeds 80 μm, fluid may not sufficiently come in contact with the monolithic body, so that the adsorption characteristics may deteriorate. The diameter of the three-dimensional continuous hole refers to the maximum value of a pore distribution curve determined by mercury porosimetry.

The thickness of the skeleton of the co-continuous structure of the monolithic body is 0.8 to 40 μm, and preferably 1 to 30 μm. If the thickness of the skeleton is less than 0.8 μm, the adsorption capacity per unit volume or the mechanical strength may decrease. If the thickness of the skeleton exceeds 40 μm, uniform adsorption characteristics may not be obtained. The thickness of the skeleton of the monolithic body may be determined by obtaining at least three SEM images, and measuring the thickness of the skeleton in the images.

The monolithic body according to one embodiment of the present invention has a total pore volume of 0.5 to 5 ml/g. If the total pore volume of the monolithic body is less than 0.5 ml/g, the pressure loss may increase when fluid permeates (passes through) the monolithic body. Moreover, the amount of fluid that permeates the monolithic body per unit cross-sectional area may decrease (i.e., the fluid treatment capacity may decrease). If the total pore volume of the monolithic body exceeds 5 ml/g, the adsorption capacity per unit volume may decrease. Since the monolithic body according to one embodiment of the present invention has a skeleton thickness, a hole diameter, and a total pore volume within the above range, the monolithic body ensures a large contact area with fluid and smooth distribution of fluid when used as an adsorbent.

The pressure loss that occurs when passing water through a column filled with the porous body (height: 1 m) at a linear velocity (LV) of 1 m/h (hereinafter referred to as "differential pressure coefficient") is in the rage of 0.005 to 0.5 MPa/m·LV, and preferably 0.01 to 0.1 MPa/m·LV.

The skeleton of the co-continuous structure of the monolithic body according to one embodiment of the present invention is formed of a hydrophobic aromatic vinyl polymer that has a crosslinked structural unit content of 0.3 to 5 mol %, and preferably 0.5 to 3.0 mol %. If the crosslinked structural unit content is less than 0.3 mol %, the mechanical strength may be insufficient. If the crosslinked structural unit content exceeds 5 mol %, the co-continuous structure may not be obtained. The aromatic vinyl polymer is not particularly limited. Examples of the aromatic vinyl polymer include polystyrene, poly(α-methylstyrene), polyvinyltoluene, polyvinylbenzyl chloride, polyvinyl biphenyl, polyvinylnaphthalene, and the like. These polymers may be a polymer obtained by polymerizing one type of vinyl monomer in the presence of a crosslinking agent, a polymer obtained by polymerizing a plurality of types of vinyl monomers in the presence of a crosslinking agent, or a blend of two or more polymers. Among these, a styrene-divinylbenzene copolymer and a vinylbenzyl chloride-divinylbenzene copolymer are preferable from the viewpoint of ease of formation of a co-continuous structure, ease of introduction of an ion-exchange group, high mechanical strength, and excellent stability to acid and alkali.

The thickness of the monolithic body according to the second aspect of the present invention may be the same as that of the monolithic body according to the first aspect of the present invention. The monolithic body according to the second aspect of the present invention may be used as an adsorbent in the same manner as the monolithic body according to the first aspect of the present invention.

Monolithic Ion Exchanger

A monolithic ion exchanger according to one embodiment of the present invention is described below. The differences between the monolithic ion exchanger and the monolithic body are mainly described below. A monolithic ion exchanger according to one embodiment of the present invention has a co-continuous structure that includes a three-dimensional continuous skeleton having a thickness of 1 to 60 μm, and preferably 3 to 58 μm, and a three-dimensional continuous hole having a diameter of 10 to 100 μm, preferably 15 to 90 μm, and particularly preferably 20 to 80 μm defined by the skeleton. The thickness of the skeleton and the diameter of the hole of the monolithic ion exchanger are larger than those of the monolithic body since the entire monolithic body swells when introducing an ion-exchange group into the monolithic body. Since the continuous hole has high continuity and uniformity as compared with an open-cell monolithic organic porous ion exchanger and a particle aggregation-type monolithic organic porous ion exchanger, a uniform ion-adsorption behavior can be achieved. If the diameter of the three-dimensional continuous hole is less than 10 μm, the pressure loss may increase when fluid permeates (passes through) the monolithic ion exchanger. If the diameter of the three-dimensional continuous hole exceeds 100 μm, fluid may not sufficiently come in contact with the organic porous ion exchanger, so that uniform ion-exchange characteristics may not be obtained, or a trace ion capturing capability may decrease.

If the thickness of the skeleton is less than 1 μm, the ion-exchange capacity per unit volume or the mechanical strength may decrease. If the thickness of the skeleton is too large, uniform ion-exchange characteristics may not be obtained, or the length of the ion-exchange band may increase. The diameter of the hole of the continuum structure is determined by multiplying the diameter of the hole of the monolithic body before introducing an ion-exchange group by the swelling rate of the monolithic body due to introduction of an ion-exchange group, or analyzing the SEM image by a known method, for example. The thickness of the skeleton is determined by obtaining at least three SEM images of the monolithic body before introducing an ion-exchange group, measuring the thickness of the skeleton in the resulting image, and multiplying the thickness of the skeleton by the swelling rate of the monolithic body due to introduction of an ion-exchange group, or analyzing the SEM image by a known method, for example. The skeleton has a rod-like shape and a circular cross-sectional shape. Note that the skeleton may have an irregular cross-sectional shape (e.g., elliptical cross-sectional shape). In this case, the thickness of the skeleton refers to the average value of the minor axis and the major axis.

If the thickness of the three-dimensional continuous rod-like skeleton is less than 10 μm, the ion-exchange capacity per unit volume may decrease. If the thickness of the skeleton exceeds 100 μm, uniform ion-exchange characteristics may not be obtained. The skeleton (wall section) of the monolithic ion exchanger is defined, and the thickness of the skeleton (wall section) is measured in the same manner as described above.

The total pore volume of the monolithic ion exchanger may be the same as that of the monolithic body. Specifically, even if the diameter of the hole has increased due to swelling upon introduction of an ion-exchange group into the monolithic body, the total pore volume changes only a small extent since the thickness of the skeleton increases. If the total pore volume of the monolithic ion exchanger is less than 0.5 ml/g, the pressure loss may increase when fluid permeates (passes through) the monolithic ion exchanger. Moreover, the amount of fluid that permeates the monolithic ion exchanger per unit cross-sectional area may decrease (i.e., the fluid treatment capacity may decrease). If the total pore volume of the monolithic ion exchanger exceeds 5 ml/g, the ion-exchange capacity per unit volume may decrease. Since the monolithic ion exchanger has a hole diameter and a total pore volume within the above range, the monolithic ion exchanger ensures uniform contact with fluid, a large contact area with fluid, and low pressure loss (i.e., exhibits excellent performance).

The pressure loss that occurs when passing water through the monolithic ion exchanger may be the same as that of the monolithic body.

The monolithic ion exchanger according to one embodiment of the present invention has an ion-exchange capacity per unit volume of 0.3 mg equivalent/ml or more, and preferably 0.4 to 1.8 mg equivalent/ml, in water-wet conditions. The monolithic organic porous ion exchanger disclosed in JP-A-2002-306976 that has a continuous macropore structure differing from that of the monolithic ion exchanger according to one embodiment of the present invention has an increased total pore volume when the diameter of the openings is increased in order to achieve a low pressure loss required for practical applications, so that the ion-exchange capacity per unit volume decreases. If the total pore volume is increased in order to increase the ion-exchange capacity per unit volume, the pressure loss increases due to a decrease in diameter of the openings. Since the monolithic ion exchanger according to one embodiment of the present invention has high hole continuity and uniformity, the pressure loss increase to only a small extent even if the total pore volume decreases. Therefore, the ion-exchange capacity per unit volume can be significantly increased while maintaining low pressure loss. If the ion-exchange capacity per unit volume is less than 0.3 mg equivalent/ml, the amount of ion-containing water that can be treated (i.e., deionized water production capacity) until a breakthrough occurs may decrease. The ion-exchange capacity per unit weight of the monolithic ion exchanger according to one embodiment of the present invention in a dry state is not particularly limited, but is normally 3 to 5 mg equivalent/g since ion-exchange groups are uniformly introduced on the surface and into the inside of the skeleton of the porous body. Note that the ion-exchange capacity of a porous body in which ion-exchange groups are introduced only on the surface of the skeleton is determined depending on the type of the porous body and the type of the ion-exchange group, but is normally 500 μg equivalent/g or less.

The ion-exchange group introduced into the monolithic body according to the second aspect of the present invention may be the same as that of the monolithic body according to the first aspect of the present invention.

The ion-exchange groups introduced into the monolithic ion exchanger are uniformly distributed on the surface and the inside of the skeleton of the porous body. The definition of the expression "uniformly distributed" is the same as described above.

The monolithic body according to one embodiment of the present invention may be obtained by performing steps I to III. In the step I, a mixture of an oil-soluble monomer that does not include an ion-exchange group, a surfactant, and water is stirred to prepare a water-in-oil emulsion, and the water-in-oil emulsion is polymerized to obtain a monolithic intermediate body that has a continuous macropore structure and has a total pore volume of more than 16 ml/g and 30 ml/g or less. The step I may be performed in accordance with the method disclosed in JP-A-2002-306976.

Method of Producing Monolithic Intermediate Body

Examples of the oil-soluble monomer that does not include an ion-exchange group include a lipophilic monomer that does not include an ion-exchange group (e.g., carboxylic acid group, sulfonic acid group, or quaternary ammonium group), and has low solubility in water. Specific examples of the monomer include aromatic vinyl monomers such as styrene, α-methylstyrene, vinyltoluene, vinylbenzyl chloride, vinylbiphenyl, and vinylnaphthalene; α-olefins such as ethylene, propylene, 1-butene, and isobutene; diene monomers such as butadiene, isoprene, and chloroprene; halogenated olefins such as vinyl chloride, vinyl bromide, vinylidene chloride, and tetrafluoroethylene; nitrile monomers such as acrylonitrile and methacrylonitrile; vinyl esters such as vinyl acetate and vinyl propionate; and (meth)acrylic monomers such as methyl acrylate, ethyl acrylate, butyl acrylate, 2-ethylhexyl acrylate, methyl methacrylate, ethyl methacrylate, propyl methacrylate, butyl methacrylate, 2-ethylhexyl methacrylate, cyclohexyl methacrylate, benzyl methacrylate, and glycidyl methacrylate. Examples of a preferable monomer include aromatic vinyl monomers such as styrene, α-methylstyrene, vinyltoluene, vinylbenzyl chloride, and divinylbenzene. These monomers may be used either individually or in combination. Note that it is preferable that a crosslinkable monomer (e.g., divinylbenzene or ethylene glycol dimethacrylate) is used as a component of the oil-soluble monomers in an amount of 0.3 to 5 mol %, and preferably 0.3 to 3 mol %, based on the total amount of the oil-soluble monomer in order to obtain necessary mechanical strength when introducing a large amount (number) of ion-exchange groups in a later step.

The surfactant is the same as the surfactant used in the step I according to the first aspect of the present invention.

In the step I, an initiator may optionally be used when producing the water-in-oil emulsion. A compound that generates radicals due to application of heat or light may suitably be used as the initiator. The initiator may be water-soluble or oil-soluble.

Examples of the initiator include 2,2'-azobis(isobutyronitrile), 2,2'-azobis(2,4-dimethylvaleronitrile), 2,2'-azobis(2-methylbutyronitrile), 2,2'-azobis(4-methoxy-2,4-dimethylvaleronitrile), dimethyl 2,2'-azobisisobutyrate, 4,4'-azobis(4-cyanovaleric acid), 1,1'-azobis(cyclohexane-1-carbonitrile), benzoyl peroxide, lauroyl peroxide, potassium persulfate, ammonium persulfate, tetramethylthiuram disulfide, hydrogen peroxide-ferrous chloride, sodium persulfate-sodium hydrogen sulfite, and the like.

When preparing the water-in-oil emulsion, the oil-soluble monomer that does not include an ion-exchange group, the surfactant, water, and the initiator are mixed in the same manner as in the step I according to the first aspect of the present invention.

The monolithic intermediate body obtained by the step I is formed of an organic polymer material that has a crosslinked structure (preferably an aromatic vinyl polymer). The crosslink density of the polymer material is not particularly limited. It is preferable that the polymer material include a crosslinked structural unit in an amount of 0.3 to 5 mol %, and more preferably 0.3 to 3 mol %, based on the total constituent units of the polymer material. If the crosslinked structural unit content is less than 0.3 mol %, the mechanical strength of the monolithic intermediate body may be insufficient. If the crosslinked structural unit content exceeds 5 mol %, the monolithic body may not have a co-continuous structure. In particular, when the total pore volume is 16 to 20 ml/g, it is preferable that the crosslinked structural unit content be less than 3 mol % in order to obtain a co-continuous structure.

The polymer material used to produce the monolithic intermediate body is the same as the polymer material used to produce the monolithic intermediate body according to the first aspect of the present invention.

The monolithic intermediate body has a total pore volume of more than 16 ml/g and 30 ml/g or less, and preferably 16 to 25 ml/g. Specifically, the monolithic intermediate body basically has a continuous macropore structure, but has a structure in which the skeleton of the monolithic structure is similar to a one-dimensional rod-like skeleton since the openings (mesopores) formed by the macropores are significantly large. When the monolithic intermediate body is present in the polymerization system, a porous body having a co-continuous structure is formed based on the structure of the monolithic intermediate body as a mold. If the total pore volume of the monolithic intermediate body is too small, a monolithic body obtained by polymerizing the vinyl monomer may have a continuous macropore structure instead of a co-continuous structure. If the total pore volume of the monolithic intermediate body is too large, a monolithic body obtained by polymerizing the vinyl monomer may have low mechanical strength, or the ion-exchange capacity per unit volume may decrease. The total pore volume of the monolithic intermediate body may be adjusted within the above range by adjusting the ratio of the monomer to water to about 1:20 to about 1:40.

The openings (mesopores) of the monolithic intermediate body formed by the overlapping macropores have an average diameter of 5 to 100 µm. If the average diameter of the openings is less than 5 µm, openings of a monolithic body obtained by polymerizing the vinyl monomer may have a small diameter, so that the pressure loss may increase when fluid permeates (passes through) the monolithic body. If the average diameter of the openings exceeds 100 µm, fluid may not sufficiently come in contact with the monolithic body or the monolithic ion exchanger, so that the adsorption characteristics or the ion-exchange characteristics may deteriorate. The monolithic intermediate body preferably has a uniform structure in which the macropores and the openings have a uniform diameter (size). Note that some non-uniform macropores that are larger than the uniform macropores may be included in the uniform structure.

Method of Producing Monolithic Body

In the step II, an aromatic vinyl monomer, a crosslinking agent that includes at least two vinyl groups in one molecule (0.3 to 5 mol %), an organic solvent that dissolves the aromatic vinyl monomer and the crosslinking agent, but does not dissolve a polymer produced by polymerizing the aromatic vinyl monomer, and an initiator are mixed. Note that the step H may be performed before or after the step I.

The aromatic vinyl monomer used in the step II is not particularly limited insofar as the aromatic vinyl monomer is a lipophilic vinyl monomer that includes a polymerizable vinyl group in the molecule, and has high solubility in an organic solvent. It is preferable to select the same vinyl monomer as that used to produce the monolithic intermediate body, or a similar polymer material. Specific examples of the vinyl monomer include styrene, α-methylstyrene, vinyltoluene, vinylbenzyl chloride, vinylbiphenyl, vinylnaphthalene, and the like. These monomers may be used either individually or in combination. Among these, styrene and vinylbenzyl chloride are preferable as the aromatic vinyl monomer.

The aromatic vinyl monomer is used in an amount 5 to 50 times (by weight), and preferably 5 to 40 times the amount of the monolithic intermediate body used as a mold of polymerization. If the amount of the aromatic vinyl monomer is less than 5 times the amount of the monolithic intermediate body (porous body), the thickness of the rod-like skeleton may be insufficient. As a result, the adsorption capacity per unit volume or the ion-exchange capacity per unit volume after introducing an ion-exchange group may decrease. If the amount of the aromatic vinyl monomer exceeds 50 times the amount of the monolithic intermediate body (porous body), the pressure loss may increase when fluid permeates (passes through) the monolithic body due to a decrease in the diameter of the continuous hole.

The crosslinking agent used in the step II preferably includes at least two polymerizable vinyl group in the molecule, and has high solubility in an organic solvent. Specific examples of the crosslinking agent include divinylbenzene, divinylnaphthalene, divinylbiphenyl, ethylene glycol dimethacrylate, trimethylolpropane triacrylate, butanediol diacrylate, and the like. These crosslinking agents may be used either individually or in combination. It is preferable to use an aromatic polyvinyl compound (e.g., divinylbenzene, divinylnaphthalene, or divinylbiphenyl) as the crosslinking agent due to high mechanical strength and excellent stability to hydrolysis. The crosslinking agent is used in an amount of 0.3 to 5 mol %, and preferably 0.3 to 3 mol %, based on the total amount of the vinyl monomer and the crosslinking agent (total oil-soluble monomers). If the amount of the crosslinking agent is less than 0.3 mol %, the monolithic body may have insufficient mechanical strength. If the amount of the crosslinking agent is too large, the monolithic body may become brittle (i.e., flexibility may be lost), or the amount (number) of ion-exchange groups introduced may decrease. The crosslinking agent is preferably used so that a crosslink density almost the same as the crosslink density of the monolithic intermediate body used as a mold of polymerization is obtained. If the amount of the crosslinking agent used in the step II significantly differs from that used in the step I (the intermediate production), non-uniform crosslink density distribution could occur that may lead to cracking of the monolithic body during the introduction of ion exchange groups.

The organic solvent used in the step II dissolves the aromatic vinyl monomer and the crosslinking agent, but does not dissolve a polymer produced by polymerizing the aromatic vinyl monomer (i.e., a poor solvent for a polymer produced by polymerizing the aromatic vinyl monomer). A different organic solvent is used depending on the type of the aromatic vinyl monomer. Examples of the organic solvent used when the vinyl monomer is styrene include alcohols such as methanol, ethanol, propanol, butanol, hexanol, cyclohexanol, octanol, 2-ethylhexanol, decanol, dodecanol, propylene glycol, and tetramethylene glycol; chain (poly)ethers such as diethyl ether, butyl cellosolve, polyethylene glycol, polypropylene glycol, and polytetramethylene glycol; chain saturated hydrocarbons such as hexane, heptane, octane, isooctane, decane, and dodecane; and esters such as ethyl acetate, isopropyl acetate, cellosolve acetate, and ethyl propionate. A good solvent for polystyrene (e.g., dioxane, THF, or toluene) may also be used as the organic solvent insofar as the good solvent is used in a small amount together with the poor solvent. The organic solvent is preferably used so that the concentration of the aromatic vinyl monomer is 30 to 80 wt %. If the concentration of the aromatic vinyl monomer is less than 30 wt %, the polymerization rate may decrease, or a monolithic body obtained by polymerization may not have a structure that falls within the scope of the present invention. If the concentration of the aromatic vinyl monomer exceeds 80 wt %, runaway polymerization may occur.

The initiator is the same as the initiator used in the step II according to the first aspect of the present invention.

In the step III, the mixture obtained by the step II is polymerized in the presence of the monolithic intermediate body obtained by the step I (i.e., the continuous macropore structure of the monolithic intermediate body is changed into a co-continuous structure) to obtain a monolithic body having a thick skeleton. The monolithic intermediate body used in the step III is important for producing a monolithic body having the novel structure according to the present invention. For example, JP-T-7-501140 discloses that a particle aggregation-type monolithic organic porous body is obtained by polymerizing a vinyl monomer in a specific organic solvent using a crosslinking agent in the absence of a monolithic intermediate body. On the other hand, when the monolithic intermediate body having a specific continuous macropore structure is present in the polymerization system, a monolithic body obtained by polymerization has a structure that significantly differs from the particle aggregation-type structure (i.e., a monolithic body having a co-continuous structure is obtained). It is conjectured that a crosslinked polymer produced by polymerization precipitates in the shapes of particles when the monolithic intermediate body is absent so that a particle aggregation-type structure is obtained, while the vinyl monomer and the crosslinking agent (liquid phase) are adsorbed on or distributed in the skeleton of the porous body when the porous body (intermediate body) having a large total pore volume is present in the polymerization system, and polymerization proceeds inside the porous body so that the skeleton of the monolithic body changes from the two-dimensional wall into a one-dimensional rod-like skeleton, and a monolithic organic porous body having a co-continuous structure is obtained.

The internal volume of the reaction vessel is the same as described above in connection with the first aspect of the present invention.

In the step III, the monolithic intermediate body is impregnated with (immersed in) the mixture (solution) inside the reaction vessel. The mixing ratio of the mixture obtained by the step II and the monolithic intermediate body is preferably determined so that the aromatic vinyl monomer is used in an amount 5 to 50 times (by weight), and preferably 5 to 40 times the amount of the monolithic intermediate body. This makes it possible to obtain a monolithic body having a co-continuous structure that includes a three-dimensional continuous hole having a moderate size, and a three-dimensional continuous thick skeleton. The aromatic vinyl monomer and the crosslinking agent in the mixture are adsorbed on or distributed in the skeleton of the monolithic intermediate body, and polymerization proceeds inside the skeleton of the monolithic intermediate body.

The polymerization conditions are the same as described above in connection with the first aspect of the present invention.

Method of Producing Monolithic Ion Exchanger

A method of producing a monolithic ion exchanger according to the second aspect of the present invention is the same as the method of producing the monolithic ion exchanger according to the first aspect of the present invention.

The monolithic ion exchanger according to one embodiment of the present invention swells to have a volume 1.4 to 1.9 times the volume of the monolithic body having a co-continuous structure as a result of the introduction of the ion-exchange group. Moreover, the total pore volume does not change even if the diameter of the hole has increased due to swelling. Therefore, the monolithic ion exchanger according to one embodiment of the present invention exhibits high mechanical strength due to the thick skeleton although the three-dimensional continuous hole has a large diameter. Moreover, the ion-exchange capacity per unit volume can be increased due to the thick skeleton when the monolithic ion exchanger is in water-wet conditions, and the target water can be passed through the monolithic ion exchanger for a long time at a high flow rate under low pressure. Therefore, the monolithic ion exchanger may suitably be used for a two-bed three-tower water purifier or an electric water deionizing apparatus.

Third Aspect of the Present Invention

A product, a production method, and a chemical filter according to the third aspect of the present invention are described below.

Note that the term "monolithic organic porous body" may be referred to as "composite monolithic body", the term "monolithic organic porous ion exchanger" may be referred to as "composite monolithic ion exchanger", and the term "monolithic organic porous intermediate body" may be referred to as "monolithic intermediate body".

Composite Monolithic Body

A composite monolithic body according to one embodiment of the present invention is a composite structure that includes an organic porous body that includes a continuous skeleton phase and a continuous hole phase, and a number of particles that adhere to the surface of the skeleton of the organic porous body, or a number of protrusions formed on the surface of the skeleton of the organic porous body. Note that the term "particle" and "protrusion" used in connection with the third aspect of the present invention may be referred to as "particle or the like".

The continuous skeleton phase and the continuous hole phase of the organic porous body may be observed from an SEM image. Examples of the basic structure of the organic porous body include a continuous macropore structure and a co-continuous structure. The skeleton phase of the organic porous body is a continuous pillar-shaped body, a continuous concave wall body, or a composite thereof, and clearly differs in shape from particles and protrusions.

Examples of a preferable structure of the organic porous body include a continuous macropore structure in which cellular macropores overlap to form openings having an average diameter of 20 to 200 μm (hereinafter may be referred to as "first organic porous body"), and a co-continuous structure that includes a three-dimensional continuous skeleton having a thickness of 0.8 to 40 μm, and a three-dimensional continuous hole having a diameter of 8 to 80 μm defined by the skeleton (hereinafter may be referred to as "second organic porous body").

The average diameter of the openings of the first organic porous body is preferably 20 to 150 μm, and particularly preferably 20 to 100 μm. Cells formed by the macropores having a diameter of 40 to 400 μm and the openings serve as flow passages. It is preferable that the continuous macropore structure be a uniform structure in which the macropores have a uniform size and the openings have a uniform diameter. Note that some non-uniform macropores that are larger than the uniform macropores may be included in the uniform structure. If the average diameter of the openings is less than 20 μm, the pressure loss may increase when fluid permeates (passes through) the composite monolithic body. If the average diameter of the openings is too large, fluid may not sufficiently come in contact with the composite monolithic body, so that the adsorption characteristics may deteriorate. The average diameter of the openings refers to a value determined by SEM observation or the maximum value of a pore distribution curve determined by mercury porosimetry.

If the diameter of the three-dimensional continuous hole of the second organic porous body is less than 8 μm, the pressure loss may increase when fluid permeates (passes through) the monolithic body. If the diameter of the three-dimensional continuous hole exceeds 80 μm, fluid may not sufficiently come in contact with the monolithic body, so that uniform adsorption behavior may not be obtained, or the adsorption efficiency may decrease when the adsorption target material has a low concentration. The diameter of the three-dimensional continuous hole refers to a value determined by SEM observation or the maximum value of a pore distribution curve determined by mercury porosimetry. The thickness of the skeleton of the co-continuous structure is 0.8 to 40 μm, and preferably 1 to 30 μm. If the thickness of the skeleton is less than 0.8 μm, the adsorption capacity per unit volume or the mechanical strength may decrease. If the thickness of the skeleton exceeds 40 μm, uniform adsorption characteristics may not be obtained.

The thickness of the skeleton and the diameter of the openings of the organic porous body may be determined by obtaining at least three SEM images of the organic porous body, and measuring the thickness of the skeleton and the diameter of the openings in the resulting image.

A number of particles that adhere to the surface of the skeleton of the organic porous body and have a diameter of 2 to 20 μm, or a number of protrusions formed on the surface of the skeleton of the organic porous body and have a maximum diameter of 2 to 20 μm are observed in an SEM image. The particles or the like are integrally formed on the surface of the skeleton phase. A particle that is partially buried in the surface of the skeleton phase is referred to as a protrusion. It is preferable that 40% or more, and more preferably 50% or more of the surface of the skeleton phase be covered with the particles or the like.

The diameter of the particles or the maximum diameter of the protrusions is preferably 3 to 15 μm, and particularly preferably 3 to 10 μm, and 70% or more, and preferably 80% or more of the particles or the like have a diameter of 3 to 5 μm. The particles may aggregate. In this case, the diameter of the particles refers to the diameter of individual particles. The particle may adhere to the protrusion to form a composite protrusion. In this case, the diameter of the particles and the maximum diameter of the protrusions refer to the diameter of individual particles and individual protrusions.

If the diameter of the particles or the like that cover the surface of the skeleton phase is outside the above range, the contact efficiency of fluid with the surface and the inside of the skeleton of the composite monolithic body may not be sufficiently improved. If less than 40% of the surface of the skeleton is covered with the particles, the contact efficiency of fluid with the surface and the inside of the skeleton of the composite monolithic body may not be sufficiently improved, so that uniform adsorption behavior may not be obtained. The diameter and the coverage of the particles or the like may be determined by analyzing an SEM image of the monolithic body.

The composite monolithic body according to one embodiment of the present invention has a total pore volume of 0.5 to 5 ml/g, and preferably 0.8 to 4 ml/g. If the total pore volume of the composite monolithic body is too small, the pressure loss may increase when fluid permeates (passes through) the monolithic body. Moreover, the amount of fluid that permeates the composite monolithic body per unit cross-sectional area may decrease (i.e., the fluid treatment capacity may decrease). If the total pore volume of the composite monolithic body is too large, the adsorption capacity per unit volume may decrease. Since the composite monolithic body according to one embodiment of the present invention has a composite structure in which the particles or the like adhere to the wall and the surface of the skeleton phase of the monolithic structure, the composite monolithic body ensures a high contact efficiency with fluid and smooth distribution of fluid when used as an adsorbent.

The average pore size of the composite monolithic body is 8 to 100 μm, and preferably 10 to 80 μm. When the organic porous body of the composite monolithic body is the first organic porous body, the pore size of the composite monolithic body is preferably 10 to 80 gill. When the organic porous body of the composite monolithic body is the second organic porous body, the pore size of the composite monolithic body is preferably 10 to 60 μm. If the pore size of the composite monolithic body and the diameter of the particles or the like are within the above range, the contact efficiency of fluid with the surface and the inside of the skeleton of the composite monolithic body is improved. The pore size of the composite monolithic body refers to the maximum value of a pore distribution curve determined by mercury porosimetry. The composite monolithic body according to one embodiment of the present invention has a thickness of 1 mm or more (i.e., is distinguished from a film-shaped (membrane-shaped) porous body). If the thickness of the composite monolithic body is less than 1 mm, the adsorption capacity of the porous body may significantly decrease. The composite monolithic body preferably has a thickness of 3 to 1000 mm. The composite monolithic body according to one embodiment of the present invention has high mechanical strength since the basic structure of the skeleton is the continuous pore structure.

When using the composite monolithic body according to one embodiment of the present invention as an adsorbent, a cylindrical column or a rectangular column is charged with the composite monolithic body (adsorbent) that has been cut into a shape corresponding to the shape of the column, and target water that contains a hydrophobic substance (e.g., benzene, toluene, phenol, or paraffin) is passed through the column. The hydrophobic substance is thus efficiently adsorbed on the adsorbent.

The pressure loss that occurs when passing water through a column filled with the composite monolithic body (height: 1 m) at a linear velocity (LV) of 1 m/h (hereinafter referred to as "differential pressure coefficient") is 0.005 to 0.1 MPa/m·LV, and preferably 0.005 to 0.05 MPa/m·LV.

The skeleton of the continuous macropore structure of the composite monolithic body according to one embodiment of the present invention is formed of an organic polymer material having a crosslinked structure. The crosslink density of the polymer material is not particularly limited. It is preferable that the polymer material include a crosslinked structural unit in an amount of 0.3 to 10 mol %, and more preferably 0.3 to 5 mol %, based on the total constituent units of the polymer material. If the crosslinked structural unit content is less than 0.3 mol %, the mechanical strength of the monolithic body may be insufficient. If the crosslinked structural unit content exceeds 10 mol %, the porous body may become brittle (i.e., flexibility may be lost). In particular, the amount of ion-exchange group introduced may decrease when the monolithic body is used as an ion exchanger. The polymer material is the same as the polymer material used to produce the monolithic body according to the first aspect of the present invention.

In the composite monolithic body according to one embodiment of the present invention, the skeleton phase of the organic porous body and the particles or the like formed on the surface of the skeleton phase may be formed of the same material or different materials. When the skeleton phase of the organic porous body and the particles or the like formed on the surface of the skeleton phase are formed of different materials, the skeleton phase and the particles or the like may be formed of different vinyl monomers, or may be formed of materials that contain the same vinyl monomer and crosslinking agent, but differ in mixing ratio, for example.

Composite Monolithic Ion Exchanger

A composite monolithic ion exchanger according to one embodiment of the present invention is described below. The differences between the composite monolithic ion exchanger and the composite monolithic body are mainly described below. The composite monolithic ion exchanger according to one embodiment of the present invention is a composite structure that includes an organic porous body that includes a continuous skeleton phase and a continuous hole phase with a number of particles that adhere to the surface of the skeleton of the organic porous body having a diameter of 4 to 40 µm, or a number of protrusions formed on the surface of the skeleton of the organic porous body having a maximum diameter of 4 to 40 µm, and the composite monolithic ion exchanger has a thickness of 1 mm or more, an average hole (pore) diameter of 10 to 150 µm, a total pore volume of 0.5 to 5 ml/g, and an ion-exchange capacity per unit volume of 0.2 mg equivalent/ml or more when in water-wet conditions, ion-exchange groups being uniformly distributed in the composite structure.

When the organic porous body is the first organic porous body, the organic porous body has a continuous macropore structure in which cellular macropores overlap to form openings (mesopores) having an average diameter of 30 to 300 µm, preferably 30 to 200 µm, and particularly preferably 35 to 150 µm. The average diameter of the openings of the composite monolithic ion exchanger is larger than that of the composite monolithic body since the entire composite monolithic body swells when introducing an ion-exchange group into the composite monolithic body. If the average diameter of the openings is less than 30 µm, the pressure loss may increase when fluid permeate (passes through) the composite monolithic ion exchanger. If the average diameter of the openings is too large, fluid may not sufficiently come in contact with the composite monolithic ion exchanger, so that the ion-exchange characteristics may deteriorate. The average diameter of the openings refers to a value calculated by multiplying the average diameter of the openings determined by SEM observation by the swelling rate when the composite monolithic body is in water-wet condition, or a value calculated by multiplying the average diameter of the openings of the composite monolithic body before introducing an ion-exchange group by the swelling rate of the porous body due to introduction of an ion-exchange group.

When the organic porous body is the second organic porous body, the organic porous body has a co-continuous structure that includes a three-dimensional continuous skeleton having a thickness of 1 to 50 µm, and a three-dimensional continuous hole defined by the skeleton having a diameter of 10 to 100 pin. If the diameter of the three-dimensional continuous hole is less than 10 µm, the pressure loss may increase when fluid permeates (passes through) the composite monolithic ion exchanger. If the diameter of the three-dimensional continuous hole exceeds 100 µm, fluid may not sufficiently come in contact with the composite monolithic ion exchanger, so that uniform ion-exchange may not be obtained (i.e., the length of the ion-exchange band may increase), or the trace ion capture efficiency may decrease. The diameter of the three-dimensional continuous hole refers to a value calculated by multiplying the diameter of the three-dimensional continuous hole determined by SEM observation by the swelling rate when the composite monolithic body is in water-wet conditions, or a value calculated by multiplying the diameter of the three-dimensional continuous hole of the composite monolithic body before introducing an ion-exchange group by the swelling rate of the composite monolithic body due to introduction of an ion-exchange group.

If the thickness of the three-dimensional continuous skeleton is less than 1 µm, the ion-exchange capacity per unit volume or the mechanical strength may decrease. If the thickness of the three-dimensional continuous skeleton exceeds 50 µm, uniform ion-exchange characteristics may not be obtained. The thickness of the skeleton of the composite monolithic ion exchanger refers to a value calculated by multiplying the thickness of the skeleton determined by SEM observation by the swelling rate when the composite monolithic body is in water-wet conditions, or a value calculated by multiplying the thickness of the skeleton of the composite monolithic body before introducing an ion-exchange group by the swelling rate of the composite monolithic body due to introduction of an ion-exchange group.

The average pore size of the composite monolithic ion exchanger is 10 to 150 µm, and preferably 10 to 120 µm. When the organic porous body of the composite monolithic ion exchanger is the first organic porous body, the pore size of the composite monolithic ion exchanger is preferably 10 to 120 μm. When the organic porous body of the composite monolithic ion exchanger is the second organic porous body, the pore size of the composite monolithic ion exchanger is preferably 10 to 90 μm.

In the composite monolithic ion exchanger according to one embodiment of the present invention, the diameter of the particles or the maximum diameter of the protrusions is 4 to 40 μm, preferably 4 to 30 μm, and particularly preferably 4 to 20 μm, and 70% or more, and preferably 80% or more of the particles or the like have a diameter of 4 to 10 μm. It is preferable that 40% or more, and more preferably 50% or more of the surface of the skeleton phase be covered with the particles or the like. If the diameter of the particles that cover the surface of the skeleton phase is outside the above range, the contact efficiency of fluid with the surface and the inside of the skeleton of the composite monolithic ion exchanger may not be sufficiently improved. The diameter or the maximum diameter of the particles or the like that adhere to the surface of the skeleton of the composite monolithic ion exchanger refers to a value calculated by multiplying the diameter or the maximum diameter of the particles or the like determined by SEM observation by the swelling rate when the composite monolithic body is in water-wet conditions, or a value calculated by multiplying the diameter or the maximum diameter of the particles or the like of the composite monolithic body before introducing an ion-exchange group by the swelling rate of the composite monolithic body due to introduction of an ion-exchange group.

If less than 40% of the surface of the skeleton phase is covered with the particles or the like, the contact efficiency of fluid with the surface and the inside of the skeleton of the composite monolithic ion exchanger may not be sufficiently improved, so that uniform ion-exchange behavior may not be obtained. The coverage of the particles or the like may be determined by analyzing an SEM image of the monolithic body.

The total pore volume of the composite monolithic ion exchanger may be the same as that of the composite monolithic body. Specifically, even if the diameter of the hole (opening) has increased due to swelling upon introduction of an ion-exchange group into the composite monolithic body, the total pore volume changes to only a small extent since the thickness of the skeleton increases. If the total pore volume of the composite monolithic ion exchanger is less than 0.5 ml/g, the pressure loss may increase when fluid permeates (passes through) the composite monolithic ion exchanger. Moreover, the amount of fluid that permeates the composite monolithic ion exchanger per unit cross-sectional area may decrease (i.e., the fluid treatment capacity may decrease). If the total pore volume of the composite monolithic ion exchanger exceeds 5 ml/g, the ion-exchange capacity per unit volume may decrease.

The pressure loss that occurs when passing water through the composite monolithic ion exchanger may be the same as that of the composite monolithic body.

The composite monolithic ion exchanger according to one embodiment of the present invention has an ion-exchange capacity per unit volume of 0.2 mg equivalent/ml or more, and preferably 0.3 to 1.8 mg equivalent/ml, in water-wet conditions. If the ion-exchange capacity per unit volume is less than 0.2 mg equivalent/ml, the amount of ion-containing water that can be treated (i.e., deionized water production capacity) until a breakthrough occurs may decrease. The ion-exchange capacity per unit weight of the composite monolithic ion exchanger according to one embodiment of the present invention in a dry state is not particularly limited, but is normally 3 to 5 mg equivalent/g since ion-exchange groups are uniformly introduced into the surface and the inside of the skeleton of the composite monolithic body. Note that the ion-exchange capacity of an organic porous body in which ion-exchange groups are introduced into only the surface of the skeleton thereof is determined depending on the type of the organic porous body and the type of the ion-exchange group, but is normally 500 μg equivalent/g or less.

The ion-exchange group introduced into the composite monolithic body according to the third aspect of the present invention may be the same as that of the monolithic body according to the first aspect of the present invention.

The ion-exchange groups introduced into the composite monolithic ion exchanger are uniformly distributed on the surface and the inside of the skeleton of the porous body. The definition of the expression "uniformly distributed" is the same as described above.

The composite monolithic body according to one embodiment of the present invention may be obtained by performing steps I to III. In the step I, a mixture of an oil-soluble monomer that does not include an ion-exchange group, a first crosslinking agent that includes at least two vinyl groups in one molecule, a surfactant, and water is stirred to prepare a water-in-oil emulsion, and the water-in-oil emulsion is polymerized to obtain a monolithic intermediate body that has a continuous macropore structure and has a total pore volume of 5 to 30 ml/g. The step I may be performed in accordance with the method disclosed in JP-A-2002-306976.

Method of Producing Monolithic Intermediate Body

Examples of the oil-soluble monomer that does not include an ion-exchange group include a lipophilic monomer that does not include an ion-exchange group (e.g., carboxylic acid group, sulfonic acid group, or quaternary ammonium group), and has low solubility in water. Examples of a preferable oil-soluble monomer that does not include an ion-exchange group include styrene, α-methylstyrene, vinyltoluene, vinylbenzyl chloride, divinylbenzene, ethylene, propylene, isobutene, butadiene, ethylene glycol dimethacrylate, and the like. These monomers may be used either individually or in combination.

Specific examples of the first crosslinking agent that includes at least two vinyl groups in one molecule include divinylbenzene, divinylnaphthalene, divinylbiphenyl, ethylene glycol dimethacrylate, and the like. These crosslinking agents may be used either individually or in combination. It is preferable to use an aromatic polyvinyl compound (e.g., divinylbenzene, divinylnaphthalene, or divinylbiphenyl) as the first crosslinking agent due to high mechanical strength. The first crosslinking agent is used in an amount of 0.3 to 10 mol %, preferably 0.3 to 5 mol %, and more preferably 0.3 to 3 mol %, based on the total amount of the vinyl monomer and the first crosslinking agent. If the amount of the first crosslinking agent is less than 0.3 mol %, the mechanical strength of the monolithic body may be insufficient. If the amount of the first crosslinking agent exceeds 10 mol %, the monolithic body may become brittle (i.e., flexibility may be lost), or the amount (number) of ion-exchange groups introduced may decrease.

The surfactant may be the same as the surfactant used in the step I according to the first aspect of the present invention.

In the step I, an initiator may optionally be used when producing the water-in-oil emulsion. The compound used as the initiator may be the same as the compound used as the initiator used in the step I according to the second aspect of the present invention.

When mixing the oil-soluble monomer that does not include an ion-exchange group, the first crosslinking agent, the surfactant, water, and the initiator to prepare a water-in-oil emulsion, the components may be mixed all together, or a mixture of the oil-soluble components (i.e., oil-soluble monomer, first crosslinking agent, surfactant, and oil-soluble initiator) and a mixture of the water-soluble components (i.e., water and water-soluble initiator) may be mixed, for example. The emulsion may be produced using an arbitrary apparatus. A mixer, a homogenizer, a high-pressure homogenizer, or the like may be appropriately used so that an emulsion having the desired particle size is obtained. The mixing conditions (e.g., stirring speed and stirring time) may be arbitrarily selected so that an emulsion having the desired particle size is obtained.

The monolithic intermediate body obtained by the step I has a continuous macropore structure. When the monolithic intermediate body is present in the polymerization system, particles or the like are formed on the surface of the skeleton phase of the continuous macropore structure (co-continuous structure) based on the structure of the monolithic intermediate body as a mold. The monolithic intermediate body is formed of an organic polymer material that has a crosslinked structure. The crosslink density of the polymer material is not particularly limited. It is preferable that the polymer material include a crosslinked structural unit in an amount of 0.3 to 10 mol %, and more preferably 0.3 to 5 mol %, based on the total constituent units of the polymer material. If the crosslinked structural unit content is less than 0.3 mol %, the mechanical strength of the monolithic intermediate body may be insufficient. If the crosslinked structural unit content exceeds 10 mol %, the porous body may become brittle (i.e., flexibility may be lost).

The monolithic intermediate body has a total pore volume of 5 to 30 ml/g, and preferably 6 to 28 ml/g. If the total pore volume of the monolithic intermediate body is too small, a monolithic body obtained by polymerizing the vinyl monomer may have a small total pore volume, so that the pressure loss may increase when fluid permeates (passes through) the monolithic body. If the total pore volume of the monolithic intermediate body is too large, a monolithic body obtained by polymerizing the vinyl monomer may have a non-uniform structure (e.g., the structure may break). The total pore volume of the monolithic intermediate body may be adjusted within the above range by adjusting the ratio by weight of the monomer to water to about 1:5 to about 1:35.

If the ratio of the monomer to water is about 1:5 to about 1:20, a monolithic intermediate body that has a total pore volume of 5 to 16 ml/g and has a continuous macropore structure is obtained. In this case, the organic porous body of the composite monolithic body obtained by the step III is the first organic porous body. If the ratio of the monomer to water is about 1:20 to about 1:35, a monolithic intermediate body that has a total pore volume of more than 16 ml/g and 30 ml/g or less and has a continuous macropore structure is obtained. In this case, the organic porous body of the composite monolithic body obtained by the step III is the second organic porous body.

The openings (mesopores) of the monolithic intermediate body formed by the overlapping macropores have an average diameter of 20 to 200 μm. If the average diameter of the openings is less than 20 μm, openings of a composite monolithic body obtained by polymerizing the vinyl monomer may have a small diameter, so that the pressure loss may increase when fluid permeates (passes through) the composite monolithic body. If the average diameter of the openings exceeds 200 μm, fluid may not sufficiently come in contact with the composite monolithic body or the composite monolithic ion exchanger since openings of a composite monolithic body obtained by polymerizing the vinyl monomer may have too large a diameter, so, that the adsorption characteristics or the ion-exchange characteristics may deteriorate. The monolithic intermediate body preferably has a uniform structure in which the macropores and the openings have a uniform diameter (size). Note that some non-uniform macropores that are larger than the uniform macropores may be included in the uniform structure.

Method of Producing Composite Monolithic Body

In the step II, a vinyl monomer, a second crosslinking agent that includes at least two vinyl groups in one molecule, an organic solvent that dissolves the vinyl monomer and the second crosslinking agent, but does not dissolve a polymer produced by polymerizing the vinyl monomer, and an initiator are mixed. Note that the step II may be performed before or after the step I.

The vinyl monomer used in the step II is not particularly limited insofar as the vinyl monomer is a lipophilic vinyl monomer that includes a polymerizable vinyl group in the molecule, and has high solubility in an organic solvent. Specific examples of the vinyl monomer include aromatic vinyl monomers such as styrene, α-methylstyrene, vinyltoluene, vinylbenzyl chloride, vinylbiphenyl, and vinylnaphthalene; α-olefins such as ethylene, propylene, 1-butene, and isobutene; diene monomers such as butadiene, isoprene, and chloroprene; halogenated olefins such as vinyl chloride, vinyl bromide, vinylidene chloride, and tetrafluoroethylene; nitrile monomers such as acrylonitrile and methacrylonitrile; vinyl esters such as vinyl acetate and vinyl propionate; and (meth) acrylic monomers such as methyl acrylate, ethyl acrylate, butyl acrylate, 2-ethylhexyl acrylate, methyl methacrylate, ethyl methacrylate, propyl methacrylate, butyl methacrylate, 2-ethylhexyl methacrylate, cyclohexyl methacrylate, benzyl methacrylate, and glycidyl methacrylate. These monomers may be used either individually or in combination. Among these, aromatic vinyl monomers such as styrene and vinylbenzyl chloride are preferable.

The vinyl monomer is used in an amount 3 to 40 times (by weight), and preferably 4 to 30 times the amount of the monolithic intermediate body used as a mold of polymerization. If the amount of the vinyl monomer is less than 3 times the amount of the monolithic intermediate body, particles may not be formed on the skeleton of the resulting monolithic body. As a result, the adsorption capacity per unit volume or the ion-exchange capacity per unit volume after introducing an ion-exchange group may decrease. If the amount of the vinyl monomer exceeds 40 times the amount of the monolithic intermediate body, the pressure loss may increase when fluid permeates (passes through) the monolithic body due to a decrease in the diameter of the openings.

The second crosslinking agent used in the step II preferably includes at least two polymerizable vinyl groups in the molecule, and has high solubility in an organic solvent. Specific examples of the second crosslinking agent include divinylbenzene, divinylnaphthalene, divinylbiphenyl, ethylene glycol dimethacrylate, trimethylolpropane triacrylate, butanediol diacrylate, and the like. These second crosslinking agents may be used either individually or in combination. It is preferable to use an aromatic polyvinyl compound (e.g., divinylbenzene, divinylnaphthalene, or divinylbiphenyl) as the second crosslinking agent due to high mechanical strength and excellent stability to hydrolysis. The second crosslinking agent is preferably used in an amount of 0.3 to 20 mol %, and particularly preferably 0.3 to 10 mol %, based on the total amount of the vinyl monomer and the second crosslinking agent. If the amount of the second crosslinking agent is less than 0.3 mol %, the mechanical strength of the monolithic body may be insufficient. If the amount of the second crosslinking agent exceeds 20 mol %, the monolithic body may become brittle (i.e., flexibility may be lost), or the amount (number) of ion-exchange groups introduced may decrease.

The organic solvent used in the step II may be the same as the organic solvent used in the step II according to the first aspect of the present invention. The organic solvent is preferably used so that the concentration of the vinyl monomer is 10 to 30 wt %. If the concentration of the vinyl monomer is less than 10 wt %, the polymerization rate may decrease. If the concentration of the vinyl monomer exceeds 30 wt %, protrusions, which are a specific feature of the present invention, may not be formed on the surface of the skeleton phase.

The initiator may be the same as the initiator used in the step II according to the first aspect of the present invention.

In the step III, the mixture obtained by the step II is polymerized in the presence of the monolithic intermediate body obtained by the step I to obtain a composite monolithic body. The monolithic intermediate body used in the step III is important for producing a monolithic body having the novel structure according to the present invention. For example, JP-T-7-501140 discloses that a particle aggregation-type monolithic organic porous body is obtained by polymerizing a vinyl monomer in a specific organic solvent using a second crosslinking agent in the absence of a monolithic intermediate body. On the other hand, when the monolithic intermediate body having a continuous macropore structure is present in the polymerization system, a monolithic body obtained by polymerization has a specific skeletal structure that significantly differs from the particle aggregation-type structure.

The internal volume of the reaction vessel may be the same as described above in connection with the first aspect of the present invention.

In the step III, the monolithic intermediate body is impregnated with (immersed in) the mixture (solution) inside the reaction vessel. The mixing ratio of the mixture obtained by the step II and the monolithic intermediate body is preferably determined so that the vinyl monomer is used in an amount 3 to 40 times (by weight), and preferably 4 to 30 times the amount of the monolithic intermediate body. This makes it possible to obtain a monolithic body that has a specific skeleton and a moderate opening diameter. The vinyl monomer and the crosslinking agent in the mixture are adsorbed on or distributed in the skeleton of the monolithic intermediate body, and polymerization proceeds inside the skeleton of the monolithic intermediate body.

The polymerization conditions may be the same as the polymerization conditions used in the step III according to the first aspect of the present invention, except that the polymerization temperature is set to 20 to 100° C., and at least one of the following conditions (1) to (5) is employed.

When the step II or III is performed while satisfying at least one of the following conditions (1) to (5), a composite monolithic body having a structure in which particles or the like are formed on the surface of the skeleton can be produced.
(1) The mixture is polymerized in the step III at a temperature that is lower than the 10-hour half-life temperature of the initiator by at least 5° C.
(2) The amount (mol %) of the second crosslinking agent used in the step II is equal to or larger than twice the amount (mol %) of the first crosslinking agent used in the step I.
(3) The vinyl monomer used in the step II differs in structure from the oil-soluble monomer used in the step I.
(4) The organic solvent used in the step II is a polyether having a molecular weight of 200 or more.
(5) The concentration of the vinyl monomer in the mixture obtained by the step II is 30 wt % or less.

Regarding the Condition (1)

The 10-hour half-life temperature is a property value of the initiator. An initiator has a known 10-hour half-life temperature. The initiator may be selected depending on the desired 10-hour half-life temperature. In the step III, the polymerization rate decreases as a result of decreasing the polymerization temperature, so that the particles or the like can be formed on the surface of the skeleton phase. It is conjectured that the monomer concentration gradually decreases in the skeleton phase of the monolithic intermediate body as a result of decreasing the polymerization temperature, and the distribution rate of the monomer from the liquid phase to the monolithic intermediate body decreases, so that excess monomer is concentrated and polymerized near the surface of the skeleton layer of the monolithic intermediate body.

The polymerization temperature is preferably lower than the 10-hour half-life temperature of the initiator by at least 10° C. The lower limit of the polymerization temperature is not particularly limited. However, since the polymerization rate decreases as the polymerization temperature decreases so that the polymerization time may increase to an impractical level, it is preferable to set the polymerization temperature to be lower than the 10-hour half-life temperature of the initiator by 5 to 20° C.

Regarding the Condition (2)

The composite monolithic body according to one embodiment of the present invention is obtained by setting the amount (mol %) of the second crosslinking agent used in the step II to be equal to or larger than twice the amount (mol %) of the first crosslinking agent used in the step I. Specifically, since the mutual solubility between the monolithic intermediate body and the polymer produced by impregnation polymerization decreases so that phase separation occurs, the polymer is moved to an area near the surface of the skeleton phase of the monolithic intermediate body, and forms particles, protrusions or the like on the surface of the skeleton phase. The amount (mol %) (crosslink density mol %) of the crosslinking agent refers to the amount (mol %) of the crosslinking agent based on the total amount (mol %) of the vinyl monomer and the crosslinking agent.

The upper limit of the amount (mol %) of the second crosslinking agent used in the step II is not particularly limited. However, if the amount (mol %) of the second crosslinking agent is too large, cracks may occur in the monolithic body after polymerization, the monolithic body may become brittle (i.e., flexibility may be lost), or the amount (number) of ion-exchange groups introduced may decrease. The amount (mol %) of the second crosslinking agent used in the step II is preferably equal to or larger than 2 to 10 times the amount (mol %) of the first crosslinking agent used in the step I. The composite monolithic body according to one embodiment of the present invention was not obtained (i.e., particles or the like were not formed on the surface of the skeleton phase) when setting the amount (mol %) of the first crosslinking agent used in the step I to be equal to or larger than twice the amount (mol %) of the second crosslinking agent used in the step II.

Regarding the Condition (3)

The composite monolithic body according to one embodiment of the present invention is obtained when the vinyl monomer used in the step II differs in structure from the oil-soluble monomer used in the step I. For example, a composite monolithic body in which particles or the like are formed on the surface of the skeleton phase is produced even when the vinyl monomers differ in structure to only a small extent (e.g., styrene and vinylbenzyl chloride). Two homopolymers produced using two monomers that differ in structure normally do not have mutual solubility. Therefore, when the monomer used in the step II differs in structure from the monomer used in the step I for producing the monolithic intermediate body, and the mixture obtained by the step II is polymerized, the monolithic intermediate body is uniformly impregnated with the monomer used in the step II, or the monomer used in the step II is uniformly distributed in the monolithic intermediate body. However, when the monomer is polymerized to produce a polymer, phase separation occurs since the polymer does not have mutual solubility with the monolithic intermediate body, and the polymer is moved to an area near the surface of the skeleton phase of the monolithic intermediate body, and forms particles, protrusions or the like on the surface of the skeleton phase.

Regarding the Condition (4)

The composite monolithic body according to one embodiment of the present invention is obtained when the organic solvent used in the step II is a polyether having a molecular weight of 200 or more. A polyether has relatively high affinity for the monolithic intermediate body. In particular, a low-molecular-weight cyclic polyether is a good solvent for polystyrene. A low-molecular-weight chain polyether is not a good solvent for polystyrene, but has high affinity for polystyrene. However, a polyether exhibits significantly reduced or almost no affinity for the monolithic intermediate body as the molecular weight of the polyether increases. When using a solvent having such low affinity as the organic solvent, diffusion of the monomer to the inside of the skeleton of the monolithic intermediate body is inhibited. As a result, the monomer is polymerized only an area near the surface of the skeleton of the monolithic intermediate body, and forms particles, protrusions or the like on the surface of the skeleton phase.

The upper limit of the molecular weight of the polyether is not particularly limited. However, if the molecular weight of the polyether is too high, the viscosity of the mixture obtained by the step H increases, so that it may be difficult to impregnate the monolithic intermediate body with the mixture. The molecular weight of the polyether is preferably 200 to 100,000, and particularly preferably 200 to 10,000. The end structure of the polyether may be an unmodified hydroxyl group, or may be etherified with an alkyl group such as a methyl group or an ethyl group, or may be esterified with acetic acid, oleic acid, lauric acid, stearic acid, or the like.

Regarding the Condition (5)

The composite monolithic body according to one embodiment of the present invention is obtained when the concentration of the vinyl monomer in the mixture obtained by the step II is 30 wt % or less. Specifically, the polymerization rate decreases by reducing the monomer concentration in the step II, so that the particles, protrusions or the like are formed on the surface of the skeleton phase. The lower limit of the monomer concentration is not particularly limited. However, since the polymerization rate decreases as the monomer concentration decreases so that the polymerization time may increase to an impractical level, it is preferable to set the monomer concentration to 10 to 30 wt %.

Method of Producing Composite Monolithic Ion Exchanger

A method of producing a composite monolithic ion exchanger according to the third aspect of the present invention may be the same as the method of producing the monolithic ion exchanger according to the first aspect of the present invention.

EXAMPLES

The present invention is further described below by way of examples. Note that the present invention is not limited to the following examples.

Examples According to the First Aspect of the Present Invention

Example 1

Step I: Production of Monolithic Intermediate Body 19.2 g of styrene, 1.0 g of divinylbenzene, 1.0 g of sorbitan monooleate (SMO), and 0.26 g of 2,2'-azobis(isobutyronitrile) were mixed to obtain a homogeneous solution. The solution was added to 180 g of purified water containing 1.8 ml of THF, and stirred at 5 to 20° C. under reduced pressure using a vacuum mixing and degassing mixer (planetary stirrer) (manufactured by EME) to obtain a water-in-oil emulsion. The emulsion was immediately put in a reaction vessel. After sealing the reaction vessel, the emulsion was polymerized at 60° C. for 24 hours. After completion of polymerization, the reaction mixture was removed from the reaction vessel, extracted with isopropanol, and dried under reduced pressure to obtain a monolithic intermediate body having a continuous macropore structure. The openings (mesopores) of the monolithic intermediate body formed by the overlapping macropores had an average diameter of 56 µm, and the total pore volume of the monolithic intermediate body was 7.5 ml/g.

Production of Monolithic Body 49.0 g of styrene, 1.0 g of divinylbenzene, 50 g of 1-decanol, and 0.5 g of 2,2'-azobis(2,4-dimethylvaleronitrile) were mixed to obtain a homogeneous solution (step II). The monolithic intermediate body was cut into a disk having an outer diameter of 70 mm and a thickness of about 20 mm (weight: 7.6 g). The monolithic intermediate body was put in a reaction vessel having an inner diameter of 90 mm, and immersed in the solution of styrene/divinylbenzene/1-decanol/2,2'-azobis(2,4-dimethylvaleronitrile). After degassing the mixture in a vacuum chamber, the reaction vessel was sealed. The mixture was then polymerized at 60° C. for 24 hours. After completion of polymerization, the monolithic body having a thickness of about 30 mm was removed, subjected to soxhlet extraction with acetone, and dried at 85° C. overnight under reduced pressure (step III).

The internal structure of the monolithic body (in a dry state) containing 1.3 mol % of the crosslinked component (styrene-divinylbenzene copolymer) was observed using an SEM (see FIG. 1). FIG. 1 shows an SEM image of an arbitrary area of the section of the monolithic body cut at an arbitrary position. As shown in FIG. 1, the monolithic body had a continuous macropore structure. The skeleton of the continuous macropore structure was thicker than that shown in FIG. 5 or 6 (comparative example). The thickness of the wall section forming the skeleton was thick.

The thickness of the wall section and the area of the skeleton observed within the section were then measured using three SEM images of different sections of the monolithic body. The thickness of the wall section was measured at eight points within one SEM image, and averaged. The area of the skeleton was determined by image analysis. The wall section is the same as defined above. The area of the skeleton was measured using the three SEM images, and averaged. The average thickness of the wall section was 30 µm, and the area of the skeleton within the SEM image was 28%. The average diameter of the openings of the monolithic body determined by mercury porosimetry was 31 µm, and the total pore volume was 2.2 ml/g. The results are shown in Tables 1 and 2. In Table 1, the item "vinyl monomer" refers to the vinyl monomer used in the step II, the item "crosslinking agent" refers to the crosslinking agent used in the step H, the item "monolithic intermediate body" refers to the monolithic intermediate body obtained by the step I, and the item "organic solvent" refers to the organic solvent used in the step II.

Production of Monolithic Cation Exchanger

The monolithic body obtained as described above was cut into a disk having an outer diameter of 70 mm and a thickness of about 15 mm. The weight of the monolithic body was 27 g. After the addition of 1500 ml of dichloroethane, the mixture was heated at 35° C. for 1 hour. After cooling the mixture to 10° C. or less, 145 g of chlorosulfinic acid was slowly added. The mixture was then reacted at 35° C. for 24 hours. After the addition of methanol to quench the remaining chlorosulfuric acid, dichloromethane was removed by washing with methanol, followed by washing with purified water to obtain a monolithic cation exchanger having a continuous macropore structure.

The swelling rate of the obtained cation exchanger was 1.7. The ion-exchange capacity per unit volume was 0.67 mg equivalent/ml in water-wet conditions. The average diameter of the openings of the organic porous ion exchanger in water-wet conditions that was calculated from the average diameter of the openings of the organic porous body and the swelling rate of the cation exchanger in water-wet conditions was 54 µm. The average thickness of the wall section (skeleton) determined in the same manner as the monolithic body was 50 µm. The area of the skeleton within the SEM image was 28%, and the total pore volume was 2.2 ml. The differential pressure coefficient (i.e., the pressure loss that occurs when passing water through the porous body) was 0.016 MPa/m·LV (i.e., lower than the practical level). The results are shown in Table 2.

Figure 2:
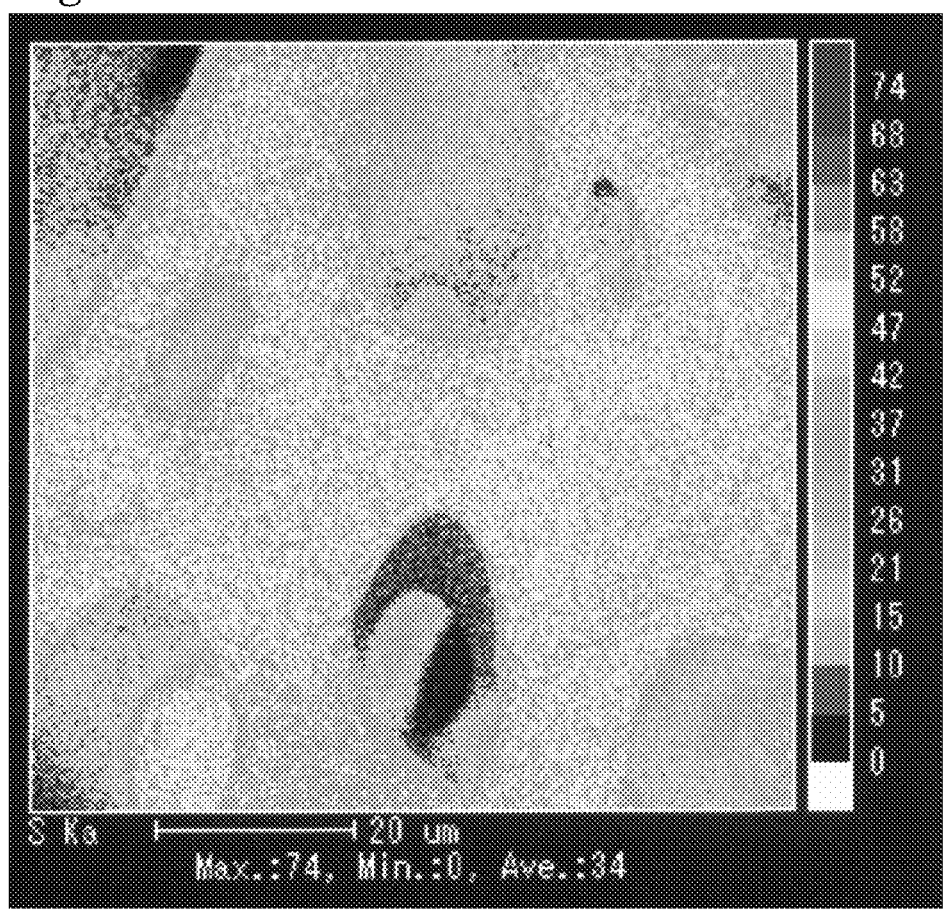
Figure 3:
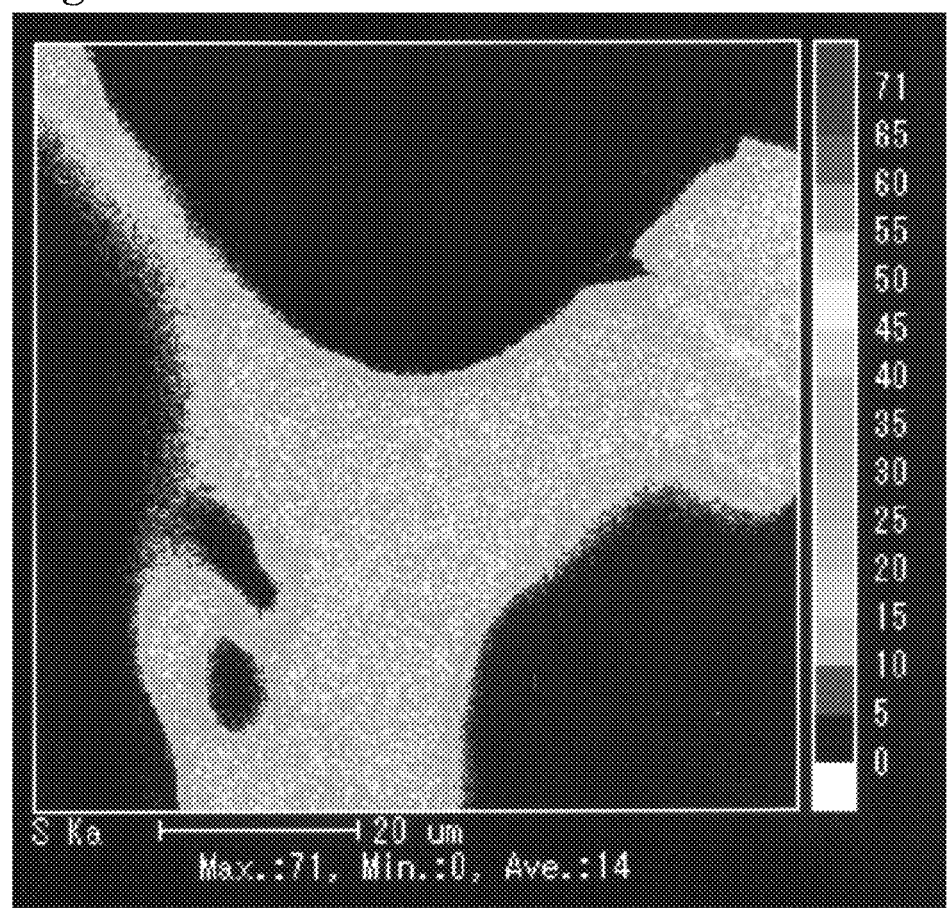
Figure 4:
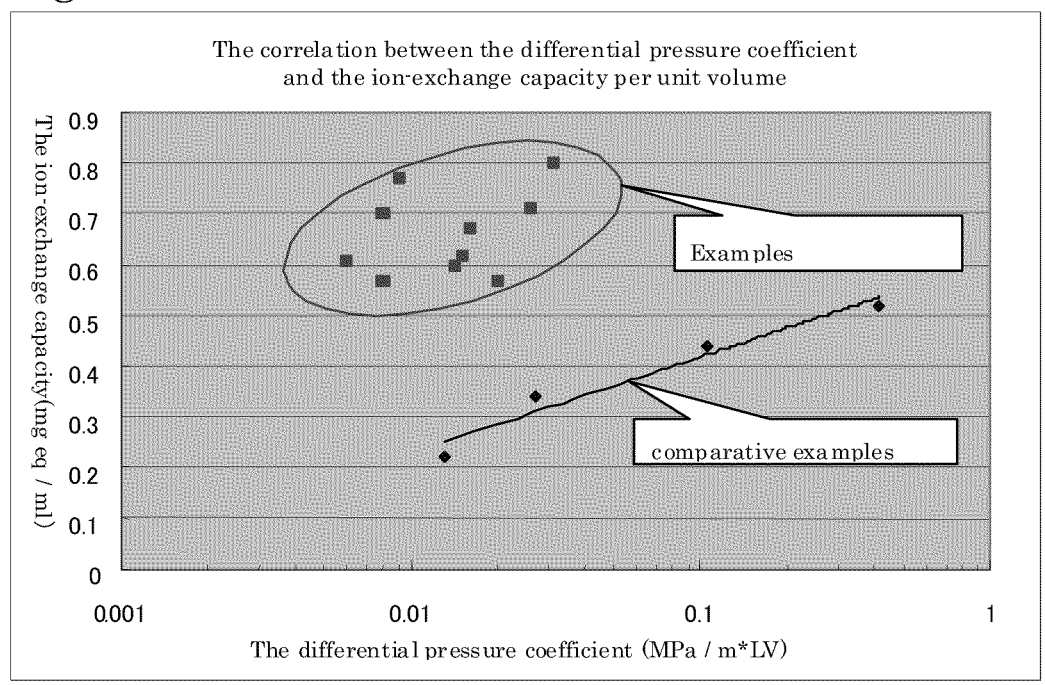

The sulfonic acid group distribution in the monolithic cation exchanger was determined by analyzing the sulfur atom distribution by EPMA. The results are shown in FIGS. 2 and 3. FIG. 3 shows the sulfur atom distribution on the surface of the cation exchanger, and FIG. 4 shows the sulfur atom distribution in the cross-sectional (thickness) direction of the cation exchanger. As shown in FIGS. 3 and 4, sulfonic acid groups were uniformly introduced into the surface and the inside (cross-sectional direction) of the skeleton of the cation exchanger.

Examples 2 to 11

Production of Monolithic Body

A monolithic body was produced in the same manner as in Example 1, except that the amount of styrene, the type and the amount of the crosslinking agent, the type and the amount of the organic solvent, and the porous structure, the crosslink density, and the amount of the monolithic intermediate body used when polymerizing styrene and divinylbenzene were changed as shown in Table 1. The results are shown in Tables 1 and 2. FIGS. 8 to 17 show SEM images of the monolithic bodies obtained in Examples 2 to 11. As shown in Table 2, the average diameter of the openings of the monolithic bodies obtained in Examples 2 to 11 was large (22 to 70 µm). The average thickness of the wall section (skeleton) was also large (25 to 50 µm), and the area of the skeleton within the SEM image was 26 to 44% (i.e., a thick monolithic body was obtained).

Production of Monolithic Cation Exchanger

The monolithic body obtained as described above was reacted with chlorosulfinic acid in the same manner as in Example 1 to obtain a monolithic cation exchanger having a continuous macropore structure. The results are shown in Table 2. The average diameter of the openings of the monolithic cation exchangers obtained in Examples 2 to 11 was 46 to 138 µm. The average thickness of the wall section (skeleton) was 45 to 110 µm, and the area of the skeleton within the SEM image was 26 to 44%. The differential pressure coefficient was 0.006 to 0.031 MPa/m·LV, and the ion-exchange capacity per unit volume was large. The mechanical properties of the monolithic cation exchanger obtained in Example 8 were evaluated as described below.

Evaluation of Mechanical Properties of Monolithic Cation Exchanger

The monolithic cation exchanger obtained in Example 8 was cut into a strip (4×5×10 mm, in water-wet conditions) to obtain a tensile test specimen. The specimen was installed in a tensile testing machine, and subjected to a tensile test in water at a temperature of 25° C., at a head speed of 0.5 mm/min. The tensile strength and the Young's modulus were 45 kPa and 50 kPa, respectively. These values were significantly larger than those of a related-art monolithic cation exchanger. The tensile elongation at break was 25%. This value was also significantly larger than that of a related-art monolithic cation exchanger.

Example 12

Production of Monolithic Body

A monolithic body having the same composition and the same structure as those of Example 4 was produced in the same manner as in Example 1, except that the amount of styrene, the amount of the crosslinking agent, and the amount of the organic solvent were changed as shown in Table 1. The results are shown in Tables 1 and 2. The average diameter of the openings formed by the macropores of the monolithic body obtained in Example 12 was 38 µm. The average thickness of the wall section (skeleton) was 25 µm (i.e., an organic porous body having a thick wall section was obtained).

Production of Monolithic Anion Exchanger

The monolithic body obtained as described above was cut into a disk having an outer diameter of 70 mm and a thickness of about 15 mm. After the addition of 1400 ml of dimethoxymethane and 20 ml of tin tetrachloride, 560 ml of chlorosulfuric acid was added dropwise to the mixture under cooling with ice. The mixture was then heated to 35° C., and reacted for 5 hours to introduce a chloromethyl group. After completion of the reaction, the mother liquor was siphoned, washed with a mixed solvent (THF/water=2/1), and washed with THF. After the addition of 1000 ml of THF and 600 ml of a 30% trimethylamine aqueous solution, the mixture was reacted at 60° C. for 6 hours. After completion of the reaction, the product was washed with a mixed solvent (methanol/water), washed with purified water, and isolated.

The swelling rate of the obtained anion exchanger was 1.6. The ion-exchange capacity per unit volume was 0.56 mg equivalent/ml when the anion exchanger was in water-wet conditions. The average diameter of the openings of the organic porous ion exchanger in water-wet conditions that was calculated from the average diameter of the openings of the organic porous body and the swelling rate of the cation exchanger in water-wet conditions was 61 µm. The average thickness of the wall section (skeleton) determined in the same manner as the monolithic body was 40 µm. The area of the skeleton within the SEM image was 26%, and the total pore volume was 2.9 ml/g. The differential pressure coefficient (i.e., the pressure loss that occurs when passing water through the porous body) was 0.020 MPa/m·LV (i.e., lower than the practical level). The results are shown in Table 2.

The quaternary ammonium group distribution in the porous anion exchanger was determined by treating the anion exchanger with a hydrochloric acid aqueous solution, and analyzing the chlorine atom distribution by EPMA. It was found that chlorine atoms were uniformly distributed on the surface and the inside of the skeleton of the anion exchanger. It was thus confirmed that quaternary ammonium groups were uniformly introduced into the anion exchanger.

Comparative Example 1

Production of Monolithic Organic Porous Body Having Continuous Macropore Structure A monolithic organic porous body having a continuous macropore structure was produced in accordance with the method disclosed in JP-A-2002-306976. Specifically, 19.2 g of styrene, 1.0 g of divinylbenzene, 1.0 g of SMO, and 0.26 g of 2,2'-azobis(isobutyronitrile) were mixed to obtain a homogeneous solution. The solution was added to 180 g of purified water, and stirred at 5 to 20° C. under reduced pressure using a vacuum mixing and degassing mixer (planetary stirrer) (manufactured by EME) to obtain a water-in-oil emulsion. The emulsion was immediately put in a reaction vessel. After sealing the reaction vessel, the emulsion was polymerized at 60° C. for 24 hours. After completion of polymerization, the reaction mixture was removed from the reaction vessel, extracted with isopropanol, and dried under reduced pressure to obtain a monolithic organic porous body having a continuous macropore structure.

Figure 5:
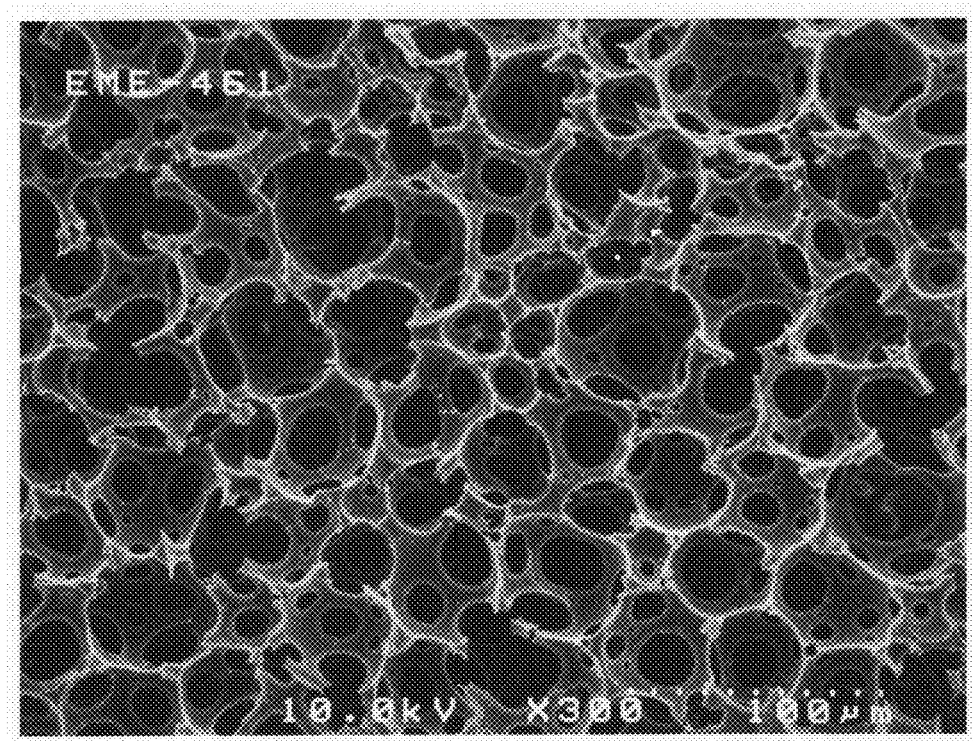

The internal structure of the organic porous body containing 3.3 mol % of the crosslinked component (styrene-divinylbenzene copolymer) was observed using an SEM (see FIG. 5). As shown in FIG. 5, the organic porous body had a continuous macropore structure. However, the thickness of the wall section (skeleton) of the continuous macropore structure was smaller than that of the examples. The average thickness of the wall section was 5 μm, and the area of the skeleton within the SEM image was 10%. The average diameter of the openings of the organic porous body determined by mercury porosimetry was 29 μm, and the total pore volume was 8.6 ml/g. The results are shown in Table 3. In Tables 1 to 3, the mesopore diameter refers to the average diameter of the openings.

Production of Monolithic Organic Porous Cation Exchanger Having Continuous Macropore Structure The organic porous body obtained as described above was cut into a disk having an outer diameter of 70 mm and a thickness of about 15 mm. The weight of the organic porous body was 6 g. After the addition of 1000 ml of dichloroethane, the mixture was heated at 35° C. for 1 hour. After cooling the mixture to 10° C. or less, 30 g of chlorosulfuric acid was slowly added. The mixture was then reacted at 35° C. for 24 hours. After the addition of methanol to quench the remaining chlorosulfuric acid, dichloromethane was removed by washing with methanol, followed by washing with purified water to obtain a monolithic porous cation exchanger having a continuous macropore structure. The swelling rate of the cation exchanger due to the reaction was 1.6. The ion-exchange capacity per unit volume was 0.22 mg equivalent/ml in water-wet conditions (i.e., the ion-exchange capacity per unit volume was smaller than that of the examples). The average diameter of the openings of the organic porous ion exchanger in water-wet conditions was calculated from the average diameter of the openings of the organic porous body and the swelling rate of the cation exchanger in water-wet conditions was 46 μm. The average thickness of the wall section (skeleton) was 8 μm. The area of the skeleton within the SEM image was 10%, and the total pore volume was 8.6 ml/g. The differential pressure coefficient (i.e., the pressure loss that occurs when passing water through the porous body) was 0.013 MPa/m·LV. The results are shown in Table 3. The differential pressure coefficient was comparable to that of the examples, but the ion-exchange capacity per unit volume was significantly smaller than that of the examples. The mechanical properties of the monolithic cation exchanger obtained in Comparative Example 1 were evaluated as described below.

Evaluation of Mechanical Properties of Related-Art Monolithic Cation Exchanger

The monolithic cation exchanger obtained in Comparative Example 1 was subjected to the tensile test in the same manner as in Example 8. The tensile strength and the Young's modulus were 28 kPa and 12 kPa, respectively. These values were smaller than those of the monolithic cation exchanger obtained in Example 8. The tensile elongation at break was 17%. This value was also smaller than that of the monolithic cation exchanger obtained in Example 8.

Comparative Examples 2 to 4

Figure 6:
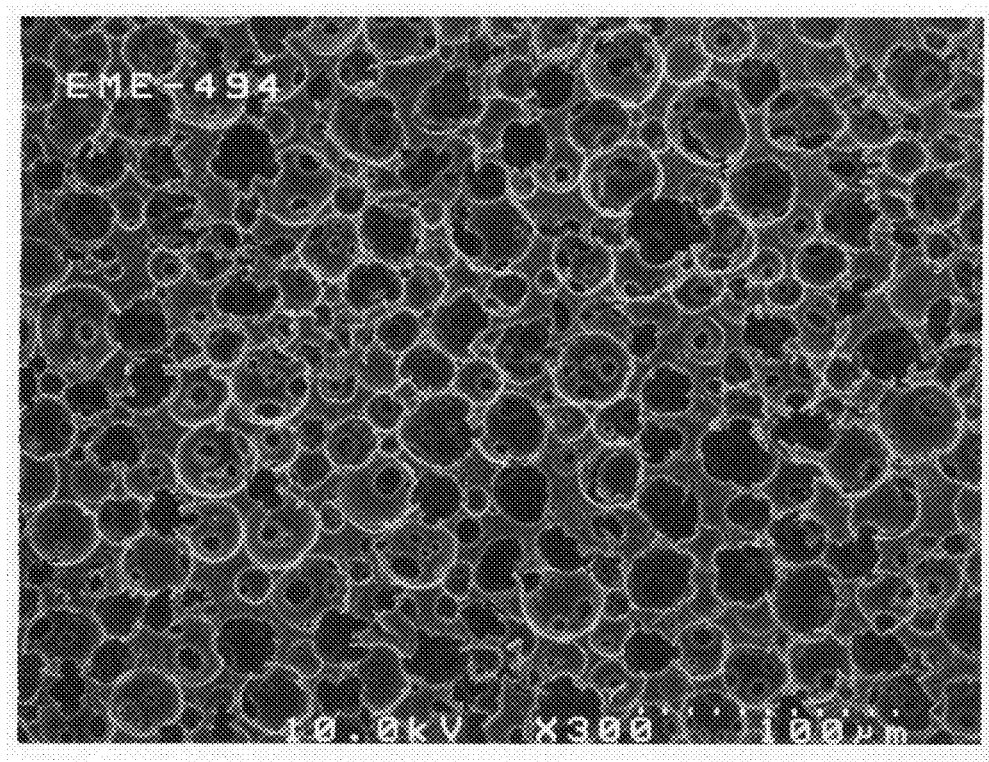

Production of Monolithic Organic Porous Body Having Continuous Macropore Structure A monolithic organic porous body having a continuous macropore structure was produced in the same manner as in Comparative Example 1, except that the amount of styrene, the amount of divinylbenzene, and the amount of SMO were changed as shown in Table 3. The results are shown in Table 3. FIG. 6 shows the internal structure of the monolithic body obtained in Comparative Example 4 observed using an SEM. Comparative Example 4 employed conditions whereby the total pore volume was minimized. Openings cannot be formed when the ratio of water to the oil phase is less than the ratio employed in Comparative Example 4. The diameter of the openings of the monolithic bodies obtained in Comparative Examples 2 to 4 was small (9 to 18 μm). The average thickness of the wall section (skeleton) was also small (15 μm), and the area of the skeleton within the SEM image was 22% or less.

Production of Monolithic Organic Porous Cation Exchanger Having Continuous Macropore Structure The organic porous body obtained as described above was reacted with chlorosulfuric acid in the same manner as in Comparative Example 1 to obtain a monolithic porous cation exchanger having a continuous macropore structure. The results are shown in Table 3. The thickness of the wall section or the skeleton decreased as a result of increasing the diameter of the openings. The diameter of the openings decreased as a result of increasing the thickness of the wall section or the skeleton. Therefore, the ion-exchange capacity per unit volume decreased as a result of decreasing the differential pressure coefficient, and the differential pressure coefficient increased as a result of increasing the ion-exchange capacity per unit volume.

FIG. 4 shows the relationship between the differential pressure coefficient and the ion-exchange capacity per unit volume of the monolithic ion exchangers produced in the examples and the comparative examples. As shown in FIG. 4, the monolithic ion exchangers produced in the comparative examples showed a poor balance between the differential pressure coefficient and the ion-exchange capacity as compared with the monolithic ion exchangers produced in the examples. The monolithic ion exchangers produced in the examples had a large ion-exchange capacity per unit volume and a small differential pressure coefficient.

Comparative Example 5

A monolithic body was produced in the same manner as in Example 1, except for changing the organic solvent used in the step II to dioxane (i.e., a good solvent for polystyrene). However, the isolated product was transparent. This suggests that the porous structure broke or was lost. Only a dense structure was observed using an SEM (i.e., the continuous macropore structure had disappeared).

TABLE 1

| | Component | | | | | | | | | | |
|---|---|---|---|---|---|---|---|---|---|---|---|
| | Vinyl monomer | | Crosslinking agent | | | Monolithic intermediate body | | | | Organic solvent | |
| | Type | Amount g | Type | Amount g | mol % | Copolymer | Amount g | Crosslink density mol % | Mesopore diameter μm | Total pore volume ml/g | Type | Amount g |
| Example 1 | Styrene | 49.0 | Divinylbenzene | 1.0 | 1.3 | Styrene-divinylbenzene copolymer | 7.6 | 1.3 | 56 | 7.5 | 1-Decanol | 50 |
| Example 2 | Styrene | 58.8 | Divinylbenzene | 1.2 | 1.3 | Styrene-divinylbenzene copolymer | 8.2 | 1.3 | 56 | 7.5 | 1-Decanol | 50 |
| Example 3 | Styrene | 68.6 | Divinylbenzene | 1.4 | 1.3 | Styrene-divinylbenzene copolymer | 7.3 | 1.3 | 56 | 7.5 | 1-Decanol | 50 |
| Example 4 | Styrene | 39.2 | Divinylbenzene | 0.8 | 1.3 | Styrene-divinylbenzene copolymer | 7.7 | 1.3 | 56 | 7.5 | 1-Decanol | 60 |
| Example 5 | Styrene | 39.6 | Divinylbenzene | 0.4 | 0.6 | Styrene-divinylbenzene copolymer | 8.4 | 0.6 | 70 | 7.6 | 1-Decanol | 60 |
| Example 6 | Styrene | 39.4 | Divinylbenzene | 0.6 | 1.0 | Styrene-divinylbenzene copolymer | 7.4 | 1.0 | 34 | 7.1 | 1-Decanol | 60 |
| Example 7 | Styrene | 58.8 | Divinylbenzene | 1.2 | 1.3 | Styrene-divinylbenzene copolymer | 7.9 | 1.3 | 56 | 7.5 | 1-Decanol | 100 |
| Example 8 | Styrene | 49.0 | Divinylbenzene | 1.0 | 1.3 | Styrene-divinylbenzene copolymer | 3.4 | 3.3 | 31 | 15.8 | 1-Decanol | 50 |
| Example 9 | Styrene | 39.2 | Divinylbenzene | 0.8 | 1.3 | Styrene-divinylbenzene copolymer | 3.5 | 3.3 | 31 | 15.8 | n-Heptane | 60 |
| Example 10 | Styrene | 49.0 | Divinylbenzene | 1.0 | 1.3 | Styrene-divinylbenzene copolymer | 4.2 | 3.3 | 31 | 15.8 | 1-Butanol | 50 |
| Example 11 | Styrene | 37.7 | Divinylbiphenyl | 2.3 | 1.3 | Styrene-divinylbenzene copolymer | 8.1 | 1.3 | 56 | 7.5 | 1-Decanol | 60 |
| Example 12 | Styrene | 39.2 | Divinylbenzene | 0.8 | 1.3 | Styrene-divinylbenzene copolymer | 7.9 | 1.3 | 56 | 7.5 | 1-Decanol | 60 |

TABLE 2

| | Monolithic body | | | | Monolithic ion exchanger | | | | | | Ion-exchange capacity per unit volume mg equivalent/ml |
|---|---|---|---|---|---|---|---|---|---|---|---|
| | Mesopore diameter μm | Wall thickness μm | Area of skeleton % | Total pore volume ml/g | Mesopore diameter μm | Wall thickness μm | Area of skeleton % | Total pore volume ml/g | Differential pressure coefficient MPa/m · LV | Functional group introduced | |
| Example 1 | 31 | 30 | 28 | 2.2 | 54 | 50 | 28 | 2.2 | 0.016 | Sulfonic acid group | 0.67 |
| Example 2 | 26 | 40 | 33 | 1.5 | 46 | 70 | 33 | 1.5 | 0.026 | Sulfonic acid group | 0.71 |
| Example 3 | 22 | 50 | 44 | 1.0 | 50 | 110 | 44 | 1.0 | 0.031 | Sulfonic acid group | 0.80 |
| Example 4 | 38 | 25 | 26 | 2.9 | 66 | 45 | 26 | 2.9 | 0.014 | Sulfonic acid group | 0.60 |
| Example 5 | 70 | 40 | 35 | 2.4 | 138 | 80 | 35 | 2.4 | 0.006 | Sulfonic acid group | 0.61 |
| Example 6 | 36 | 45 | 29 | 2.8 | 76 | 80 | 29 | 2.8 | 0.009 | Sulfonic acid group | 0.77 |
| Example 7 | 29 | 45 | 30 | 2.6 | 50 | 80 | 30 | 2.6 | 0.008 | Sulfonic acid group | 0.57 |
| Example 8 | 38 | 25 | 37 | 1.9 | 68 | 45 | 37 | 1.9 | 0.008 | Sulfonic acid group | 0.70 |
| Example 9 | 36 | 30 | 26 | 2.9 | 71 | 60 | 26 | 2.9 | 0.008 | Sulfonic acid group | 0.52 |
| Example 10 | 36 | 30 | 28 | 1.9 | 64 | 50 | 28 | 1.9 | 0.019 | Sulfonic acid group | 0.59 |

TABLE 2-continued

| | Monolithic ion exchanger | | | | | | | | | |
|---|---|---|---|---|---|---|---|---|---|---|
| | Monolithic body | | | | | | | | | Ion-exchange |
| | Mesopore diameter μm | Wall thickness μm | Area of skeleton % | Total pore volume ml/g | Mesopore diameter μm | Wall thickness μm | Area of skeleton % | Total pore volume ml/g | Differential pressure coefficient MPa/m · LV | Functional group introduced | capacity per unit volume mg equivalent/ml |
| Example 11 | 40 | 25 | 28 | 2.8 | 70 | 45 | 28 | 2.8 | 0.015 | Sulfonic acid group | 0.62 |
| Example 12 | 38 | 25 | 26 | 2.9 | 61 | 40 | 26 | 2.9 | 0.020 | Quaternary ammonium group | 0.56 |

TABLE 3

| | Component | | | | Organic porous body | | | Organic porous cation exchanger | | | | | |
|---|---|---|---|---|---|---|---|---|---|---|---|---|---|
| | Styrene | Divinylbenzene | SMO | Purified water | Mesopore diameter | Wall thickness | Total pore volume | Mesopore diameter | Wall thickness | Area of skeleton | Total pore volume | Differential pressure coefficient | Ion-exchange capacity per unit volume mg equivalent/ml |
| | g | g | mol % | g | g | μm | μm | ml/g | μm | μm | % | ml/g | MPa/m · LV | ml |
| Comparative Example 1 | 19.2 | 1.0 | 3.3 | 1.0 | 180 | 29 | 5 | 8.6 | 46 | 8 | 10 | 8.6 | 0.013 | 0.22 |
| Comparative Example 2 | 28.7 | 1.5 | 3.3 | 1.5 | 180 | 18 | 15 | 5.5 | 29 | 24 | 13 | 5.5 | 0.027 | 0.34 |
| Comparative Example 3 | 41.5 | 2.2 | 3.3 | 1.4 | 180 | 17 | 15 | 2.6 | 27 | 25 | 17 | 2.6 | 0.105 | 0.44 |
| Comparative Example 4 | 60.1 | 3.2 | 3.3 | 2.6 | 180 | 9 | 15 | 2.1 | 15 | 26 | 22 | 2.1 | 0.418 | 0.52 |

Examples According to the Second Aspect of the Present Invention

Example 13

Figure 19:
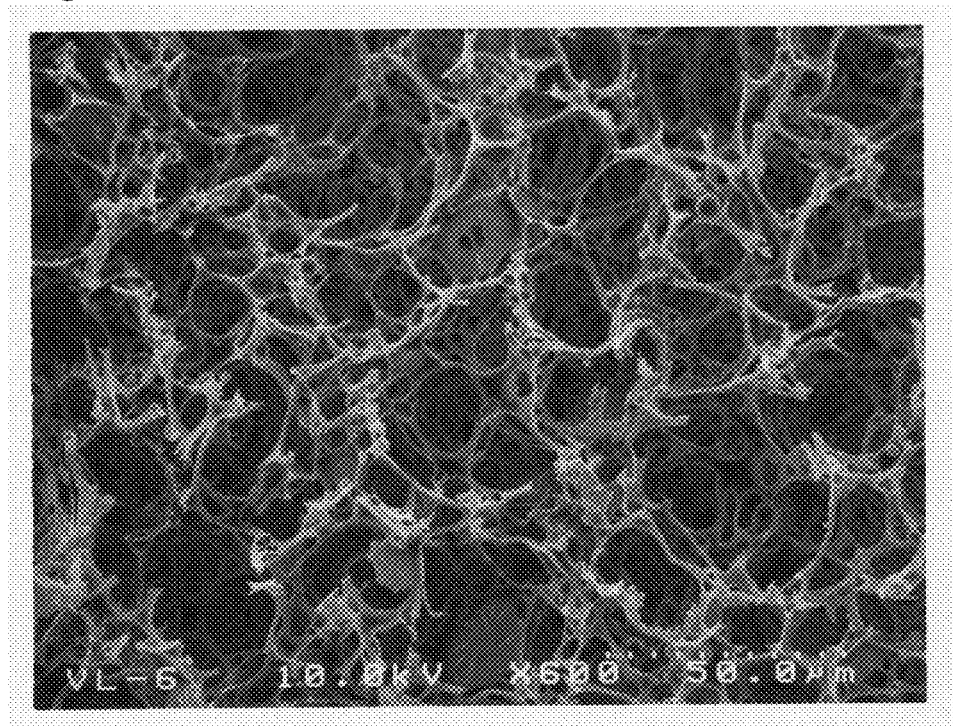
FIG. 19 shows an SEM image of the monolithic intermediate body obtained in Example 20.

Step I: Production of Monolithic Intermediate Body 5.4 g of styrene, 0.17 g of divinylbenzene, 1.4 g of sorbitan monooleate (SMO), and 0.26 g of 2,2'-azobis(isobutyronitrile) were mixed to obtain a homogeneous solution. The solution was added to 180 g of purified water, and stirred at 5 to 20° C. under reduced pressure using a vacuum mixing and degassing mixer (planetary stirrer) (manufactured by EME) to obtain a water-in-oil emulsion. The emulsion was immediately put in a reaction vessel. After sealing the reaction vessel, the emulsion was polymerized at 60° C. for 24 hours. After completion of polymerization, the reaction mixture was removed from the reaction vessel, extracted with methanol, and dried under reduced pressure to obtain a monolithic intermediate body having a continuous macropore structure. The internal structure of the resulting monolithic intermediate body (in a dry state) was observed using an SEM (see FIG. 19). The wall section that defined two adjacent macropores was thin and rod-like, but the monolithic intermediate body had an open-cell structure. The average diameter of the openings (mesopores) formed by the macropores determined by mercury porosimetry was 70 μm, and the total pore volume was 21.0 ml/g.

Production of Monolithic Body Having Co-Continuous Structure 76.0 g of styrene, 4.0 g of divinylbenzene, 120 g of 1-decanol, and 0.8 g of 2,2'-azobis(2,4-dimethylvaleronitrile) were mixed to obtain a homogeneous solution (step II). The monolithic intermediate body was cut into a disk having an outer diameter of 70 mm and a thickness of about 40 mm (weight: 4.1 g). The monolithic intermediate body was put in a reaction vessel having an inner diameter of 75 mm, and immersed in the solution of styrene/divinylbenzene/1-decanol/2,2'-azobis(2,4-dimethylvaleronitrile). After degassing the mixture in a vacuum chamber, the reaction vessel was sealed. The mixture was then polymerized at 60° C. for 24 hours. After completion of polymerization, the monolithic body having a thickness of about 60 mm was removed, subjected to soxhlet extraction with acetone, and dried at 85° C. overnight under reduced pressure (step III).

The internal structure of the monolithic body (in a dry state) containing 3.2 mol % of the crosslinked component (styrene-divinylbenzene copolymer) was observed using an SEM. It was found that the monolithic body had a co-continuous structure including a three-dimensional continuous skeleton and a three-dimensional continuous hole. The thickness of the skeleton measured using the SEM image was 10 μm. The diameter of the three-dimensional continuous pore of the monolithic body determined by mercury porosimetry was 17 μm, and the total pore volume was 2.9 ml/g. The results are shown in Tables 4 and 5. In Table 5, the thickness of the skeleton is indicated by the diameter of the skeleton.

Production of Monolithic Cation Exchanger Having Co-Continuous Structure

The monolithic body obtained as described above was cut into a disk having an outer diameter of 75 mm and a thickness of about 15 mm. The weight of the monolithic body was 18 g.

After the addition of 1500 ml of dichloroethane, the mixture was heated at 35° C. for 1 hour. After cooling the mixture to 10° C. or less, 99 g of chlorosulfuric acid was slowly added. The mixture was then reacted at 35° C. for 24 hours. After the addition of methanol to quench the remaining chlorosulfuric acid, dichloromethane was removed by washing with methanol, followed by washing with purified water to obtain a monolithic cation exchanger having a co-continuous structure.

Figure 20:
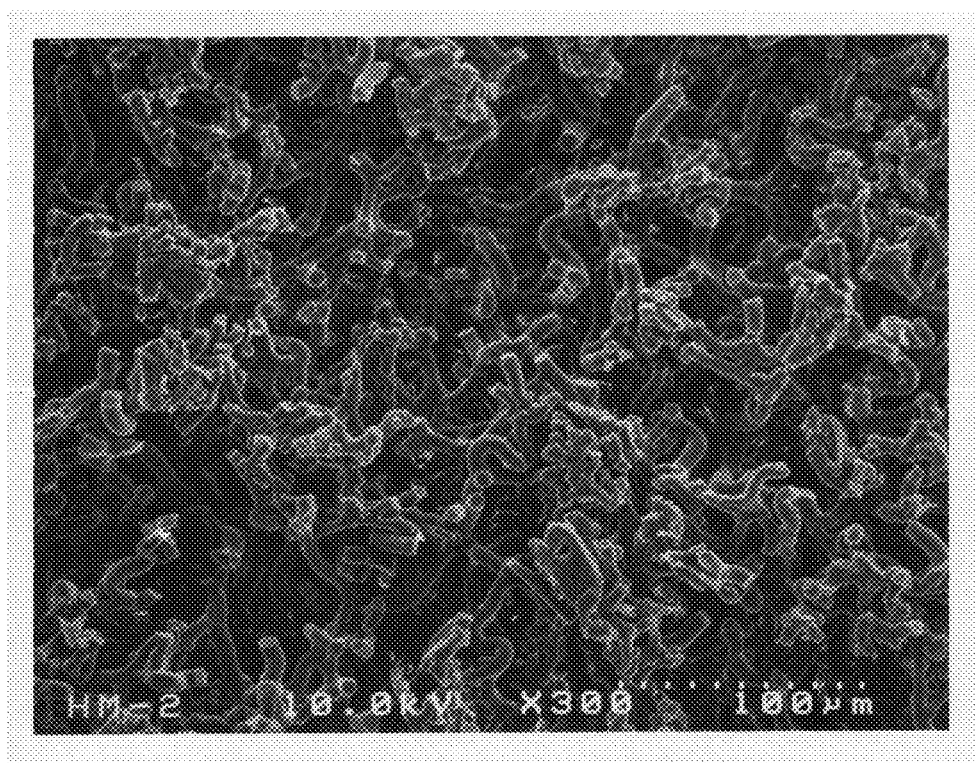
FIG. 20 shows an SEM image of the monolithic cation exchanger having a co-continuous structure obtained in Example 20.

The resulting monolithic cation exchanger was cut, dried, and the internal structure thereof was observed using an SEM. It was confirmed that the monolithic cation exchanger had a co-continuous structure. FIG. 20 shows the SEM image. The swelling rate of the cation exchanger before and after the reaction was 1.4. The ion-exchange capacity per unit volume of the cation exchanger in water-wet condition was 0.74 mg equivalent/ml. The diameter of the continuous pore of the monolithic cation exchanger in water-wet conditions was calculated from the diameter of the continuous pore of the monolithic body and the swelling rate of the cation exchanger in water-wet conditions, and the calculated diameter was 24 μm. The thickness (diameter) of the skeleton was 14 μm, and the total pore volume was 2.9 ml/g.

The differential pressure coefficient (i.e., the pressure loss that occurs when passing water through the porous body) was 0.052 MPa/m·LV (practical level). The length of the ion-exchange band (sodium ion) of the monolithic cation exchanger was measured. The length of the ion-exchange band at LV=20 m/h was 16 mm. This value was significantly smaller than that (320 mm) of Amberlite IR120B (manufactured by Rohm and Haas) (commercially available strong acid cation exchange resin), and was smaller than that of a monolithic porous cation exchanger having an open-cell structure. The results are shown in Table 5.

Figure 21:
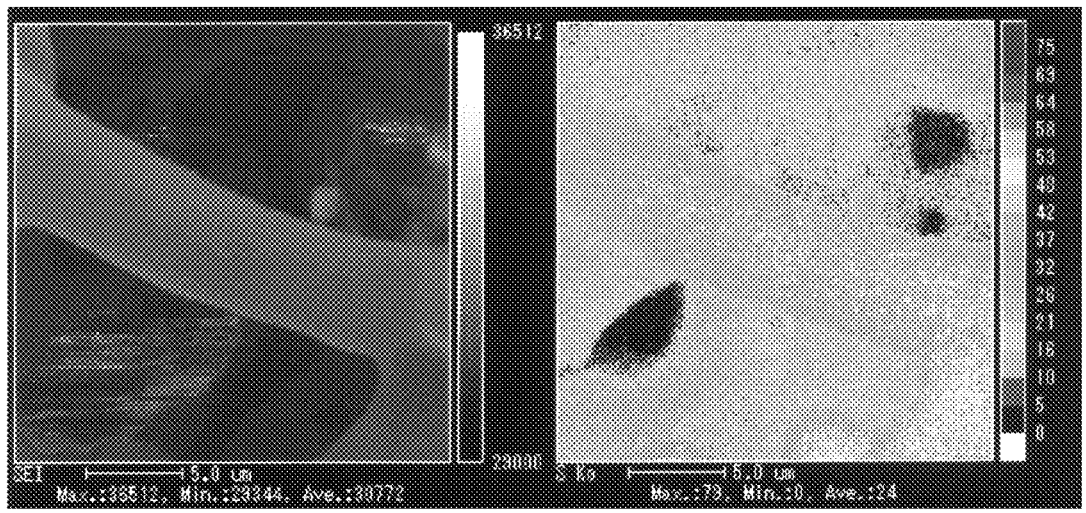
FIG. 21 shows an EPMA image of the sulfur atom distribution on the surface of the monolithic cation exchanger having a co-continuous structure obtained in Example 20.
Figure 22:
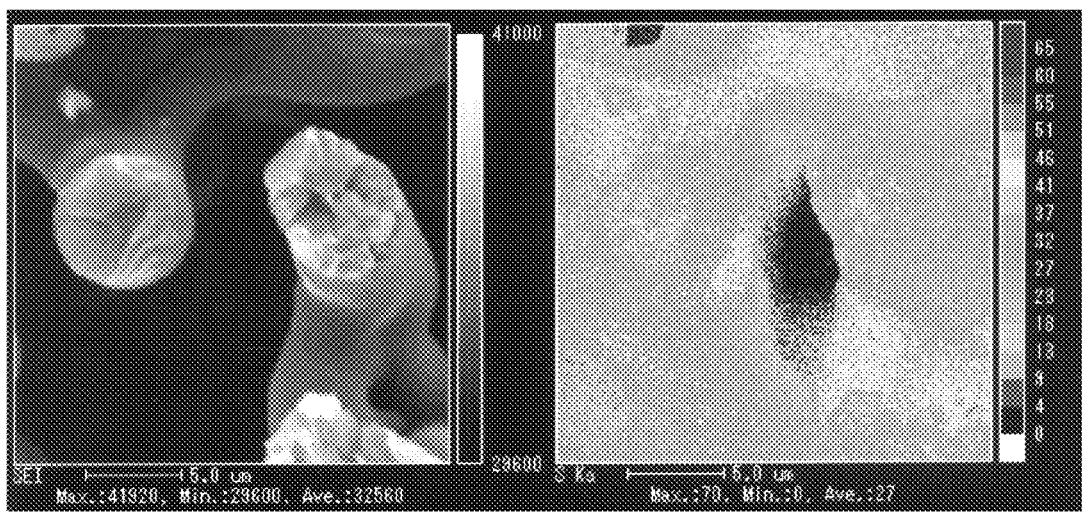
FIG. 22 shows an EPMA image of the sulfur atom distribution of the monolithic cation exchanger having a co-continuous structure obtained in Example 20 in the cross-sectional (thickness) direction.

The sulfonic acid group distribution in the monolithic cation exchanger was determined by analyzing the sulfur atom distribution by EPMA. The results are shown in FIGS. 21 and 22. In FIGS. 21 and 22, the right and left photographs correspond to each other. FIG. 21 shows the sulfur atom distribution on the surface of the cation exchanger, and FIG. 22 shows the sulfur atom distribution in the cross-sectional (thickness) direction of the cation exchanger. In the left photograph shown in FIG. 21, the skeleton extends in a sloping state. In the left photograph shown in FIG. 22, two circles indicate the sections of the skeleton. As shown in FIGS. 21 and 22, sulfonic acid groups were uniformly introduced into the surface and the inside (cross-sectional direction) of the skeleton of the cation exchanger.

Examples 14 and 15

Production of Monolithic Body Having Co-Continuous Structure

A monolithic body having a co-continuous structure was produced in the same manner as in Example 13, except that the amount of styrene, the amount of the crosslinking agent, the amount of the organic solvent, and the porous structure, the crosslink density, and the amount of the monolithic intermediate body used in the impregnated polymerization of styrene and divinylbenzene were changed as shown in Table 4. The results are shown in Tables 4 and 5.

Production of Monolithic Cation Exchanger Having Co-Continuous Structure

Figure 23:
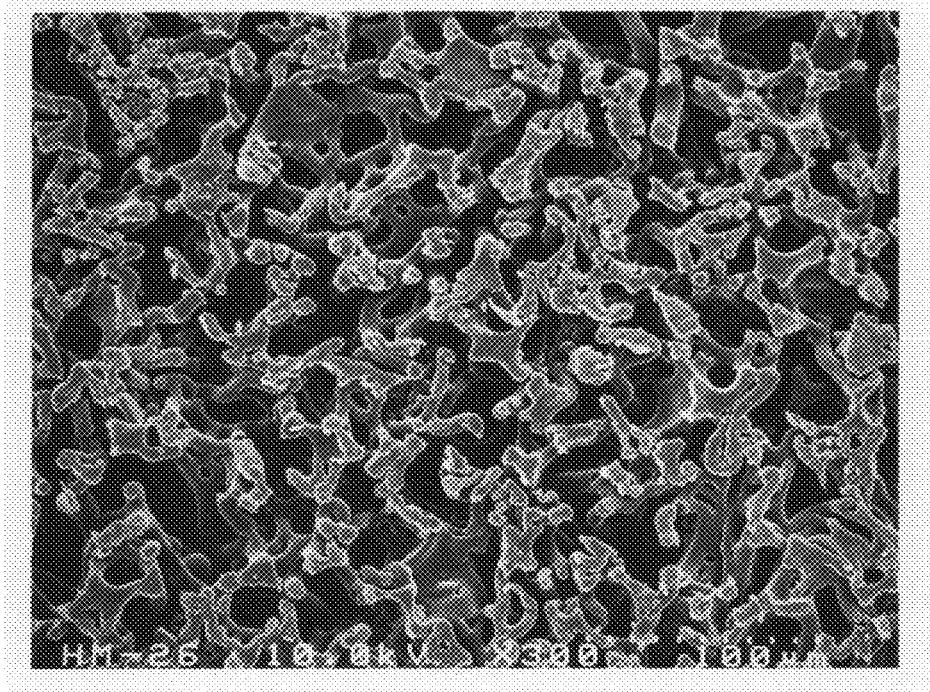
FIG. 23 shows an SEM image of the monolithic cation exchanger having a co-continuous structure obtained in Example 21.
Figure 24:
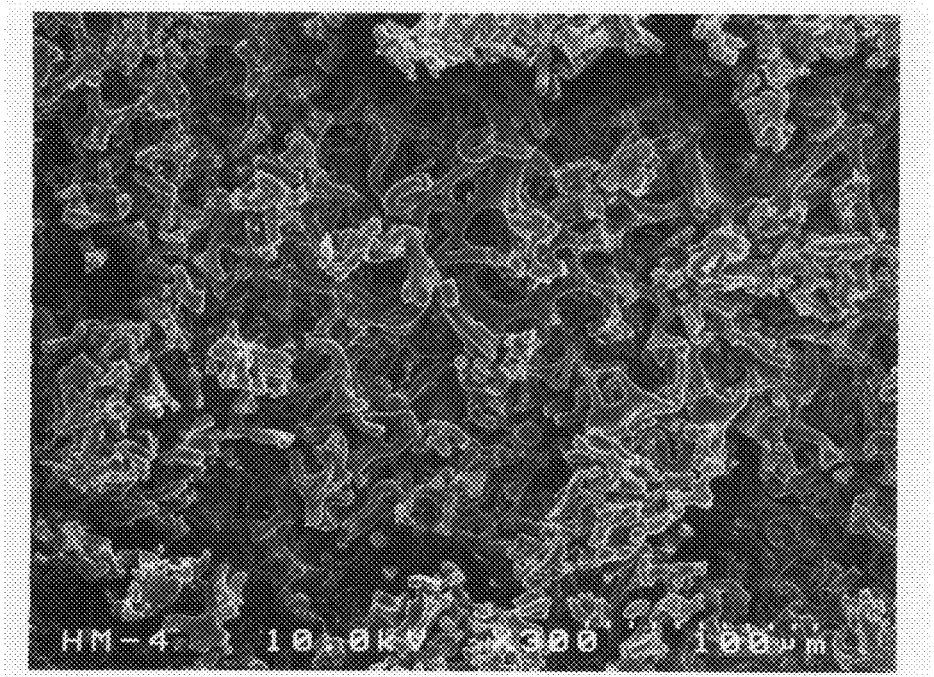
FIG. 24 shows an SEM image of the monolithic cation exchanger having a co-continuous structure obtained in Example 22.

The monolithic body obtained as described above was reacted with chlorosulfuric acid in the same manner as in Example 13 to obtain a monolithic cation exchanger having a co-continuous structure. The results are shown in Table 5. The internal structure of the monolithic cation exchanger was observed using an SEM (see FIGS. 23 and 24). As shown in Table 5, the monolithic cation exchangers obtained in Examples 14 and 15 had a small differential pressure coefficient, a large ion-exchange capacity per unit volume, and a small length of the ion-exchange band. The mechanical properties of the monolithic cation exchanger obtained in Example 14 were evaluated as described below.

Evaluation of Mechanical Properties of Monolithic Cation Exchanger

The monolithic cation exchanger obtained in Example 14 was cut into a strip (4×5×10 mm, wetted with water) to obtain a tensile strength test specimen. The specimen was installed in a tensile testing machine, and subjected to the tensile test in water at a temperature of 25° C. at a head speed of 0.5 mm/min. The tensile strength and the Young's modulus were 23 kPa and 15 kPa, respectively. These values were significantly larger than those of a related-art monolithic cation exchanger. The tensile elongation at break was 50%. This value was also significantly larger than that of a related-art monolithic cation exchanger.

Example 16

Production of Monolithic Body Having Co-Continuous Structure

A monolithic body having a co-continuous structure was produced in the same manner as in Example 13, except that the amount of styrene, the amount of the crosslinking agent, the amount of the organic solvent, and the porous structure, the crosslink density, and the amount of the monolithic intermediate body used in the impregnated polymerization of styrene and divinylbenzene were changed as shown in Table 4. The results are shown in Tables 4 and 5.

Production of Monolithic Anion Exchanger Having Co-Continuous Structure

The monolithic body obtained as described above was cut into a disk having a diameter of 70 mm and a thickness of about 15 mm. After the addition of 1400 ml of dimethoxymethane and 20 ml of tin tetrachloride, 560 ml of chlorosulfuric acid was added dropwise to the mixture under cooling with ice. The mixture was then heated to 35° C., and reacted for 5 hours to introduce a chloromethyl group. After completion of the reaction, the mother liquor was siphoned, washed with a mixed solvent (THF/water=2/1), and washed with THF. After the addition of 1000 ml of THF and 600 ml of a 30% trimethylamine aqueous solution, the mixture was reacted at 60° C. for 6 hours. After completion of the reaction, the product was washed with a mixed solvent (methanol/water), washed with purified water, and isolated.

The swelling rate of the anion exchanger before and after the reaction was 1.6. The ion-exchange capacity per unit volume was 0.44 mg equivalent/ml in water-wet conditions. The diameter of the continuous pore of the monolithic anion exchanger in water-wet conditions was calculated from the diameter of the continuous hole of the monolithic body and the swelling rate of the anion exchanger wetted with water, and the calculated diameter was 29 μm. The thickness of the skeleton was 13 μm, and the total pore volume was 2.0 ml/g.

Figure 25:
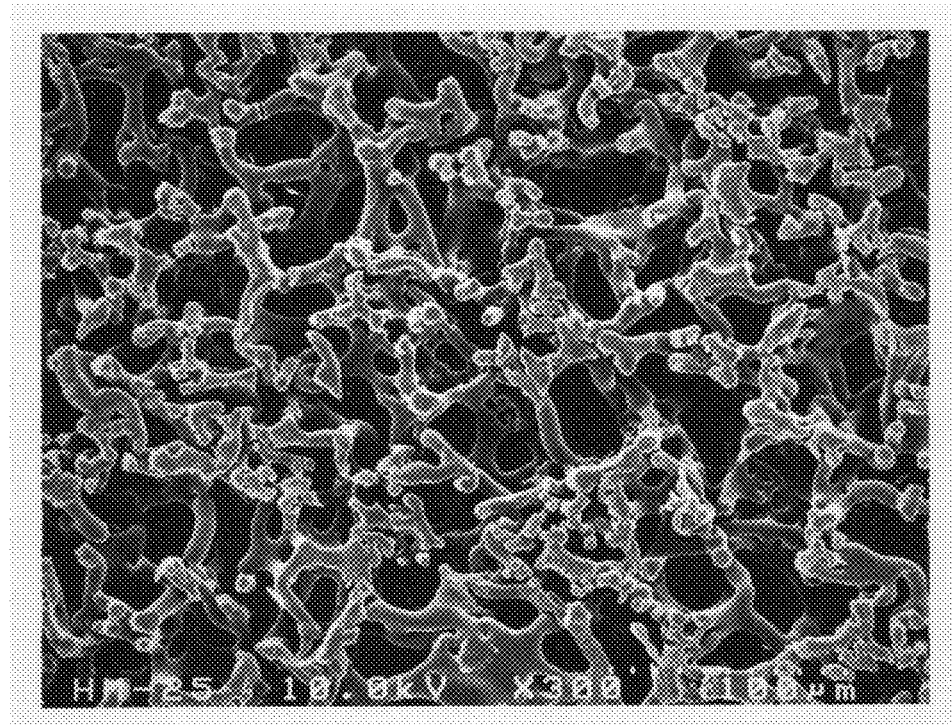
FIG. 25 shows an SEM image of the monolithic cation exchanger having a co-continuous structure obtained in Example 23.

The differential pressure coefficient (i.e., the pressure loss that occurs when passing water through the porous body) was 0.020 MPa/m·LV (practical level). The length of the ion-exchange band (fluoride ion) of the monolithic anion exchanger was measured. The length of the ion-exchange band at LV=20 m/h was 22 mm. This value was significantly smaller than that (165 mm) of Amberlite IRA402BL (manufactured by Rohm and Haas) (commercially available strong basic anion exchange resin), and was smaller than that of a monolithic porous anion exchanger having an open-cell structure. The results are shown in Table 5. The internal structure of the monolithic anion exchanger was observed using an SEM (see FIG. 25).

The quaternary ammonium group distribution in the monolithic anion exchanger was determined by treating the anion exchanger with a hydrochloric acid aqueous solution, and analyzing the chlorine atom distribution by EPMA. It was found that chlorine atoms were uniformly distributed on the surface and the inside of the anion exchanger. It was thus confirmed that quaternary ammonium groups were uniformly introduced into the anion exchanger.

Comparative Example 6

Figure 26:
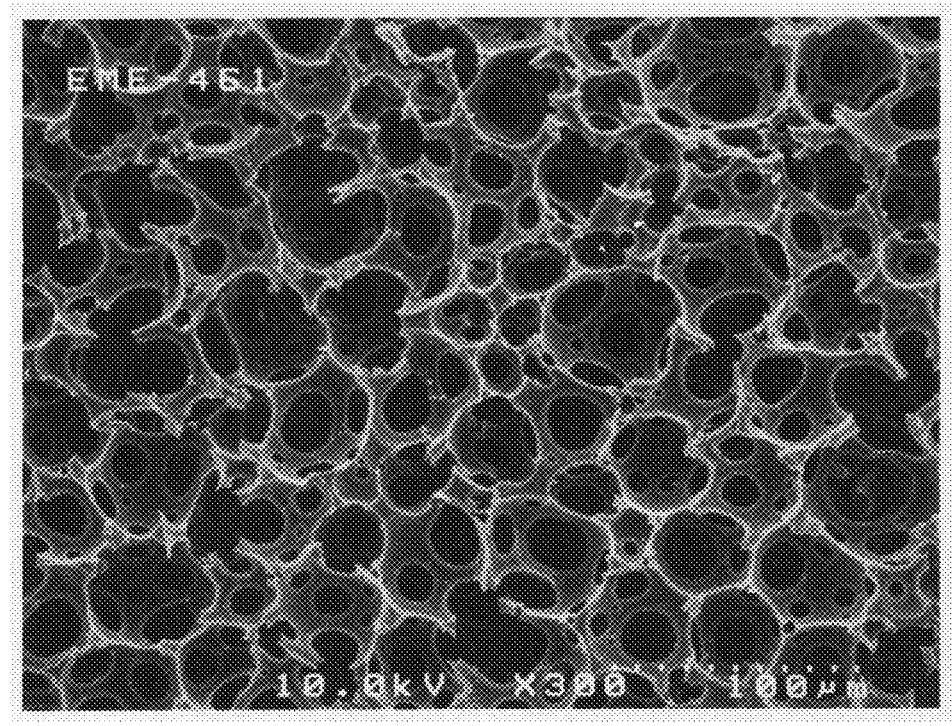
FIG. 26 shows an SEM image of the monolithic body obtained in Comparative Example 11.

Production of Monolithic Organic Porous Body Having Continuous Macropore Structure A monolithic organic porous body was produced in the same manner as in Comparative Example 1. The internal structure of the organic porous body containing 3.3 mol % of the crosslinked component (styrene-divinylbenzene copolymer) was observed using an SEM (see FIG. 26). As shown in FIG. 26, the organic porous body had a continuous macropore structure. The average thickness of the wall section determined from the SEM image was 5 μm. The average diameter of the openings (formed by the macropores) of the organic porous body determined by mercury porosimetry was 29 μm, and the total pore volume was 8.6 ml/g. The results are shown in Tables 4 and 5. In Tables 4 and 5, the mesopore diameter refers to the average diameter of the openings.

Production of Monolithic Cation Exchanger Having Continuous Macropore Structure

A monolithic cation exchanger was produced in the same manner as in Comparative Example 1 using the organic porous body produced in Comparative Example 6. The results are shown in Table 6. The differential pressure coefficient was comparable to that of the examples, but the ion-exchange capacity per unit volume was significantly smaller than that of the examples. The length of the ion-exchange band was about three times that of the examples.

Comparative Example 7

Production of Monolithic Organic Porous Body Having Open-Cell Structure

A monolithic organic porous body having a continuous macropore structure (open-cell structure) was produced in the same manner as in Comparative Example 6, except that the amount of styrene, the amount of divinylbenzene, and the amount of SMO were changed as shown in Table 4. The results are shown in Tables 4 and 5.

Production of Monolithic Anion Exchanger Having Open-Cell Structure

A chloromethyl group was introduced into the organic porous body obtained as described above in the same manner as in Example 16. The organic porous body was reacted with trimethylamine to obtain a monolithic anion exchanger having an open-cell structure. The results are shown in Table 5. The differential pressure coefficient was comparable to that of the examples, but the ion-exchange capacity per unit volume was smaller than that of the examples. The length of the ion-exchange band was about four times that of the examples.

Comparative Example 8

A monolithic body having a co-continuous structure was produced in the same manner as in Example 13, except for changing the organic solvent used in the step II to dioxane (i.e., a good solvent for polystyrene). However, the isolated product was transparent. This suggests that the porous structure broke or was lost. Only a dense structure was observed using an SEM (i.e., the open-cell structure had disappeared).

TABLE 4

| | Component | | | | | | | | | | |
|---|---|---|---|---|---|---|---|---|---|---|---|
| | Vinyl monomer | | Crosslinking agent | | | Organic porous body | | | | Organic solvent | |
| | | Amount | | Amount | | | | Crosslink density | Mesopore diameter | Total pore volume | | Amount |
| | Type | g | Type | g | mol % | Copolymer | Amount g | mol % | μm | ml/g | Type | g |
| Example 13 | Styrene | 76.0 | Divinylbenzene | 4.0 | 3.2 | Styrene-divinylbenzene copolymer | 4.1 | 1.9 | 70 | 21.0 | 1-Decanol | 120 |
| Example 14 | Styrene | 39.2 | Divinylbenzene | 0.8 | 1.3 | Styrene-divinylbenzene copolymer | 2.2 | 1.3 | 70 | 17.8 | 1-Decanol | 60 |
| Example 15 | Styrene | 38.0 | Divinylbenzene | 2.0 | 3.2 | Styrene-divinylbenzene copolymer | 2.7 | 3.2 | 22 | 27.1 | 1-Decanol | 60 |
| Example 16 | Styrene | 39.2 | Divinylbenzene | 0.8 | 1.3 | Styrene-divinylbenzene copolymer | 2.4 | 3.2 | 70 | 17.8 | 1-Decanol | 60 |
| Comparative Example 6 | Styrene | 19.2 | Divinylbenzene | 1.0 | 3.3 | — | — | — | — | — | — | — |
| Comparative Example 7 | Styrene | 19.2 | Divinylbenzene | 1.0 | 3.3 | — | — | — | — | — | — | — |

TABLE 5

| | Organic porous body having co-continuous structure | | | Organic porous ion exchanger having co-continuous structure | | | | | | |
|---|---|---|---|---|---|---|---|---|---|---|
| | Diameter of skeleton μm | Continuous pore μm | Total pore volume ml/g | Diameter of skeleton μm | Continuous pore μm | Total pore volume ml/g | Differential pressure coefficient MPa/m · LV | Functional group introduced | Ion-exchange capacity per unit volume mg equivalent/ml | Length of ion-exchange zone mm |
| Example 13 | 10 | 17 | 2.9 | 14 | 24 | 2.9 | 0.052 | Sulfonic acid group | 0.74 | 16*[1] |
| Example 14 | 8 | 17 | 2.0 | 14 | 30 | 2.0 | 0.016 | Sulfonic acid group | 0.46 | 18*[1] |
| Example 15 | 10 | 11 | 2.2 | 15 | 16 | 2.2 | 0.089 | Sulfonic acid group | 0.80 | 14*[1] |
| Example 16 | 8 | 18 | 2.0 | 13 | 29 | 2.0 | 0.020 | Quaternary ammonium group | 0.44 | 22*[2] |
| Comparative Example 6 | 5*[3] | 29*[4] | 8.6 | 8*[3] | 46*[4] | 8.6 | 0.013 | Sulfonic acid group | 0.22 | 49*[1] |
| Comparative Example 7 | 5*[3] | 29*[4] | 8.6 | 8*[3] | 45*[4] | 8.6 | 0.014 | Quaternary ammonium group | 0.19 | 84*[2] |

*[1]Sodium ion (LV = 20 m/h)
*[2]Fluoride ion (LV = 20 m/h)
*[3]Wall thickness
*[4]Mesopore diameter Examples According to the Third Aspect of the Present Invention Example 17

Step I: Production of Monolithic Intermediate Body 9.28 g of styrene, 0.19 g of divinylbenzene, 0.50 g of sorbitan monooleate (SMO), and 0.26 g of 2,2'-azobis(isobutyronitrile) were mixed to obtain a homogeneous solution. The solution was added to 180 g of purified water, and stirred at 5 to 20° C. under reduced pressure using a vacuum mixing and degassing mixer (planetary stirrer) (manufactured by EME) to obtain a water-in-oil emulsion. The emulsion was immediately put in a reaction vessel. After sealing the reaction vessel, the emulsion was polymerized at 60° C. for 24 hours. After completion of polymerization, the reaction mixture was removed from the reaction vessel, extracted with isopropanol, and dried under reduced pressure to obtain a monolithic intermediate body having a continuous macropore structure. The openings (mesopores) of the monolithic intermediate body formed by the overlapping macropores had an average diameter of 40 μm, and the total pore volume of the monolithic intermediate body was 15.8 ml/g.

Production of Composite Monolithic Body 36.0 g of styrene, 4.0 g of divinylbenzene, 60 g of 1-decanol, and 0.4 g of 2,2'-azobis(2,4-dimethylvaleronitrile) were mixed to obtain a homogeneous solution (step II). The 10-hour half-life temperature of 2,2'-azobis(2,4-dimethylvaleronitrile) (initiator) is 51° C. The crosslink density of the monolithic intermediate body was 1.3 mol %. The amount of divinylbenzene used in the step II was 6.6 mol % based on the total amount of styrene and divinylbenzene. Therefore, the crosslink density ratio was 5.1. The monolithic intermediate body was cut into a disk having an outer diameter of 70 mm and a thickness of about 20 mm (weight: 3.2 g). The monolithic intermediate body was put in a reaction vessel having an inner diameter of 73 mm, and immersed in the solution of styrene/divinylbenzene/1-decanol/2,2'-azobis(2,4-dimethylvaleronitrile). After degassing the mixture in a vacuum chamber, the reaction vessel was sealed. The mixture was then polymerized at 60° C. for 24 hours. After completion of polymerization, the monolithic body having a thickness of about 30 mm was removed, subjected to soxhlet extraction with acetone, and dried at 85° C. overnight under reduced pressure (step III).

Figure 27:
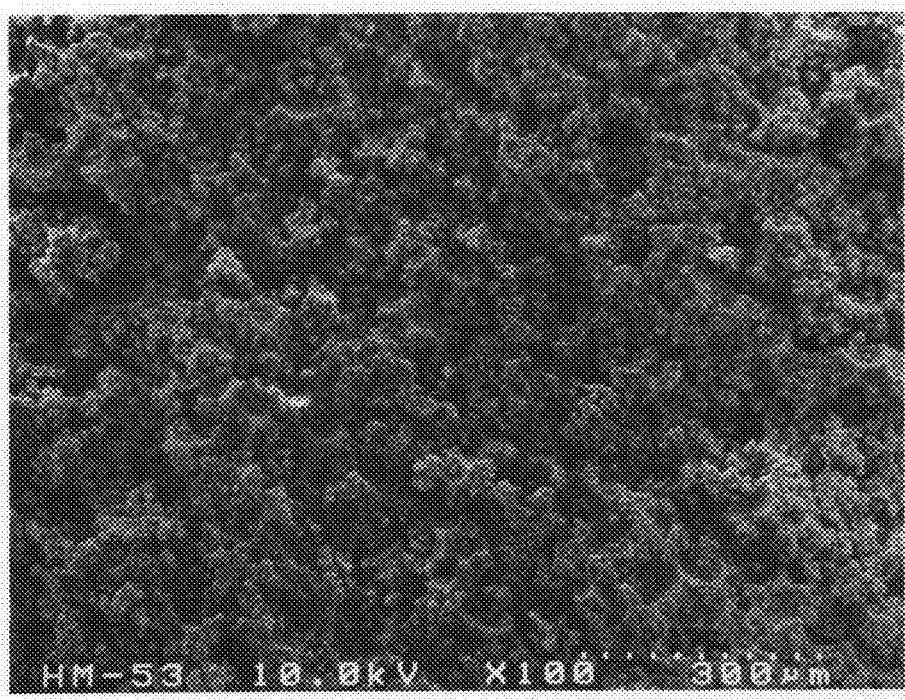
FIG. 27 shows an SEM image (magnification: 100) of the monolithic body obtained in Example 31.
Figure 28:
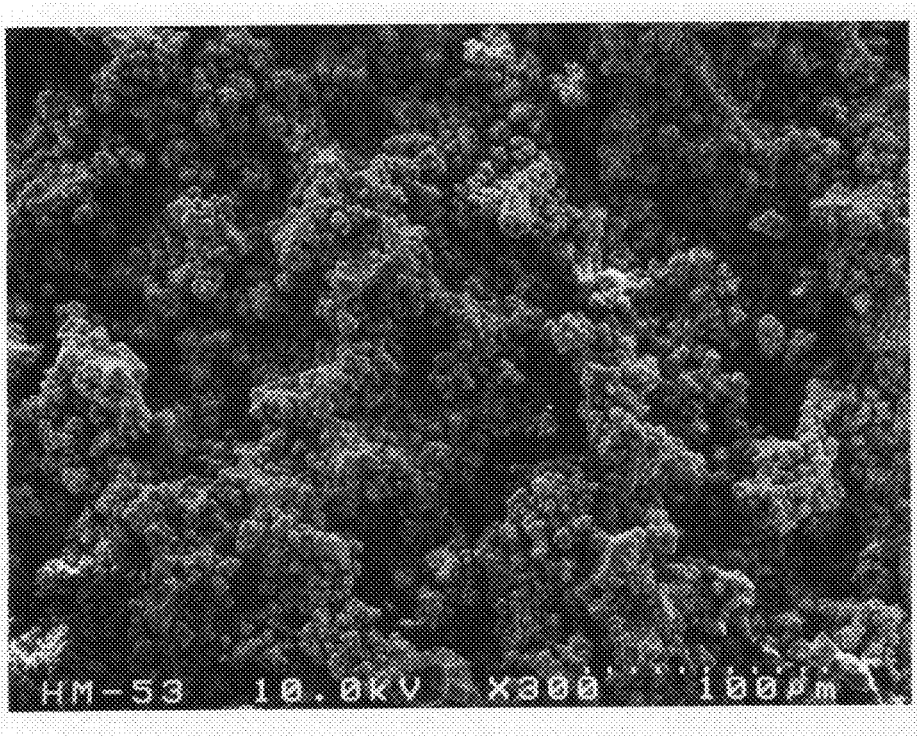
FIG. 28 shows an SEM image (magnification: 300) of the monolithic body obtained in Example 31.
Figure 29:
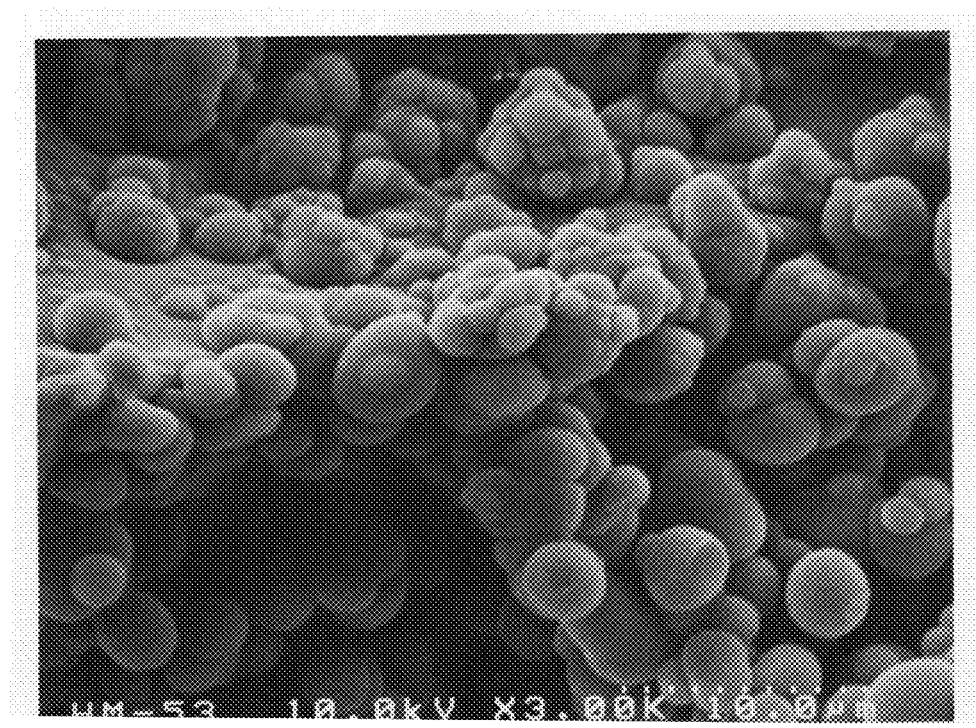
FIG. 29 shows an SEM image (magnification: 3000) of the monolithic body obtained in Example 31.

The internal structure of the composite monolithic body (in a dry state) containing a styrene-divinylbenzene copolymer was observed using an SEM (see FIGS. 27 to 29). FIGS. 27 to 29 show SEM images of an arbitrary area of the section of the monolithic body cut at an arbitrary position (at a different magnification). As shown in FIGS. 27 to 29, the composite monolithic body had a continuous macropore structure. The surface of the skeleton phase of the continuous macropore structure was covered with particles having an average diameter of 4 μm. (80% of the surface of the skeleton phase was covered with the particles). 90% of the particles had a diameter of 2 to 5 μm.

The average diameter of the openings of the composite monolithic body determined by mercury porosimetry was 16 and the total pore volume was 2.3 ml/g. The results are shown in Tables 6 and 7. In Table 7, the item "vinyl monomer" refers to the vinyl monomer used in the step II, the item "crosslinking agent" refers to the crosslinking agent used in the step II, the item "organic solvent" refers to the organic solvent used in the step II, and the item "monolithic intermediate body" refers to the monolithic intermediate body obtained by the step I. The particles or the like are indicated by "particles".

Production of Composite Monolithic Cation Exchanger

The composite monolithic body obtained as described above was cut into a disk having an outer diameter of 70 mm and a thickness of about 15 mm. The weight of the monolithic body was 19.6 g. After the addition of 1500 ml of dichloroethane, the mixture was heated at 35° C. for 1 hour. After cooling the mixture to 10° C. or less, 98.9 g of chlorosulfuric acid was slowly added. The mixture was then reacted at 35° C. for 24 hours. After the addition of methanol to quench the remaining chlorosulfuric acid, dichloromethane was removed by washing with methanol, followed by washing with purified water to obtain a composite monolithic cation exchanger.

The swelling rate of the cation exchanger before and after the reaction was 1.3. The ion-exchange capacity per unit volume of the cation exchanger was 1.11 mg equivalent/ml in water-wet conditions. The average diameter of the openings of the organic porous ion exchanger in water-wet conditions was calculated from the average diameter of the openings of the organic porous body and the swelling rate of the cation exchanger in water-wet conditions, and the calculated diameter was 21 μm, and 80% of the surface of the skeleton was covered with the particles. The average diameter of the particles was 5 μm, and the total pore volume was 2.3 ml/g. 90% of the particles had a diameter of 3 to 7 μm. The differential pressure coefficient (i.e., the pressure loss that occurs when passing water through the porous body) was 0.057 MPa/m·LV (i.e., lower than the practical level). The length of the ion-exchange band was as small as 9 mm. The results are shown in Table 7.

Figure 30:
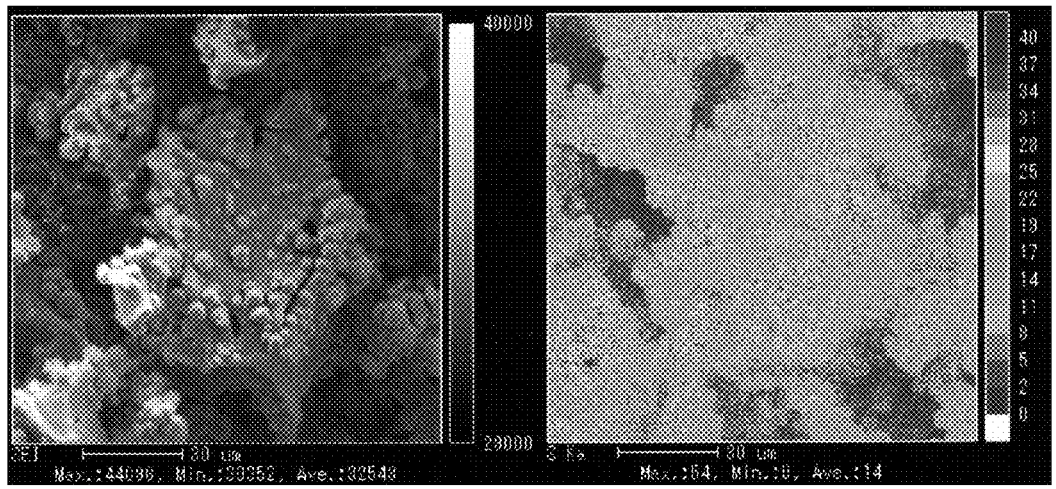
FIG. 30 shows an EPMA image of the sulfur atom distribution on the surface of the monolithic cation exchanger obtained in Example 31.
Figure 31:
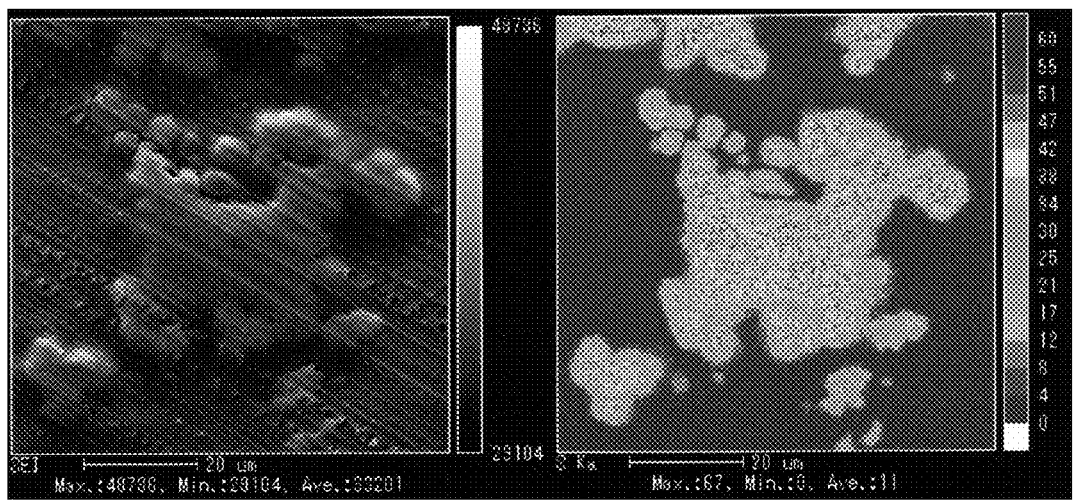
FIG. 31 shows an EPMA image of the sulfur atom distribution of the monolithic cation exchanger obtained in Example 31 in the cross-sectional (thickness) direction.

The sulfonic acid group distribution in the composite monolithic cation exchanger was determined by analyzing the sulfur atom distribution by EPMA. The results are shown in FIGS. 30 and 31. In FIGS. 30 and 31, the right and left photographs correspond to each other. FIG. 30 shows the sulfur atom distribution on the surface of the cation exchanger, and FIG. 31 shows the sulfur atom distribution in the cross-sectional (thickness) direction of the cation exchanger. As shown in FIGS. 30 and 31, sulfonic acid groups were uniformly introduced into the surface and the inside (cross-sectional direction) of the skeleton of the cation exchanger.

Examples 18 to 21

Production of Composite Monolithic Body

Figure 32:
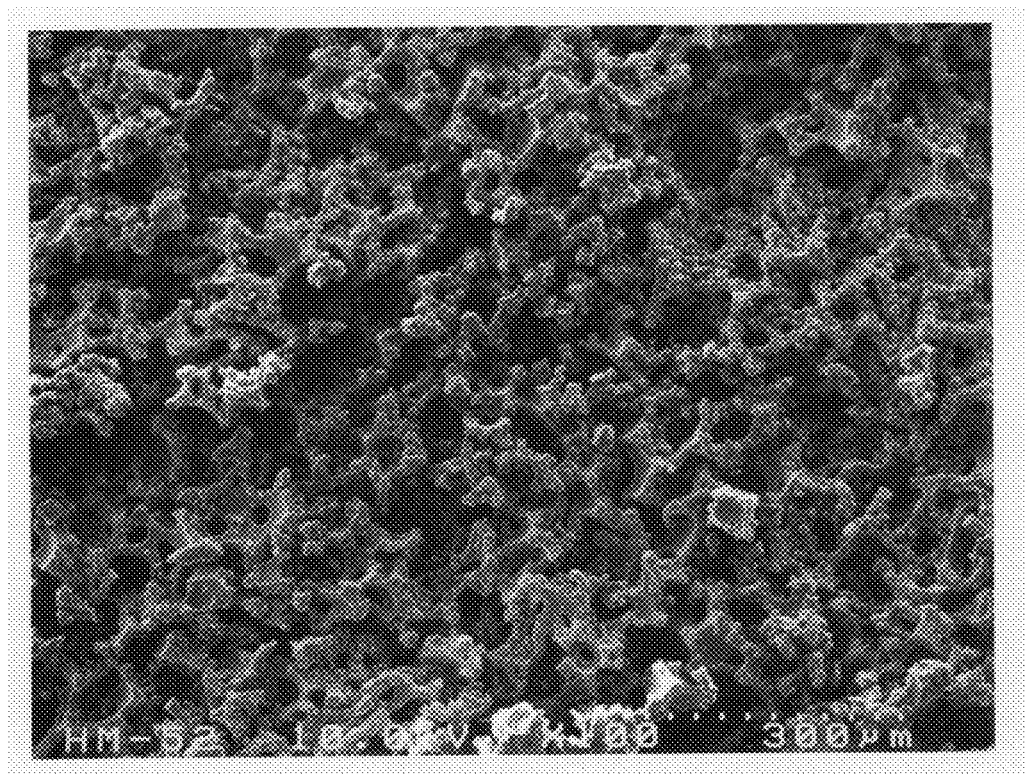
FIG. 32 shows an SEM image (magnification: 100) of the monolithic body obtained in Example 32.
Figure 33:
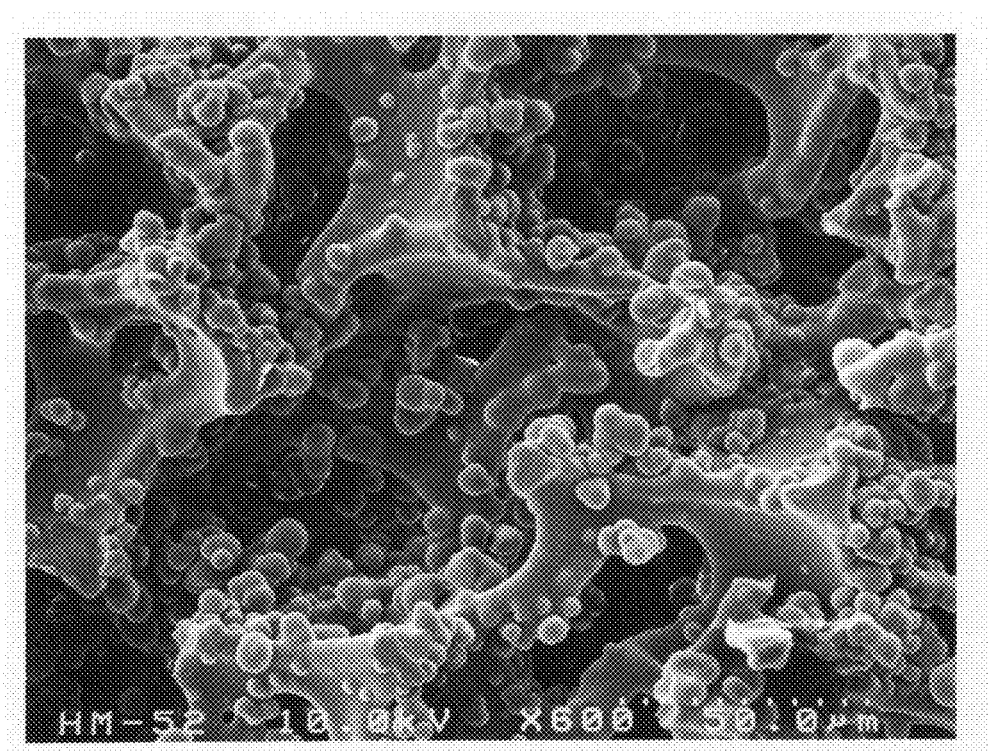
FIG. 33 shows an SEM image (magnification: 600) of the monolithic body obtained in Example 32.
Figure 34:
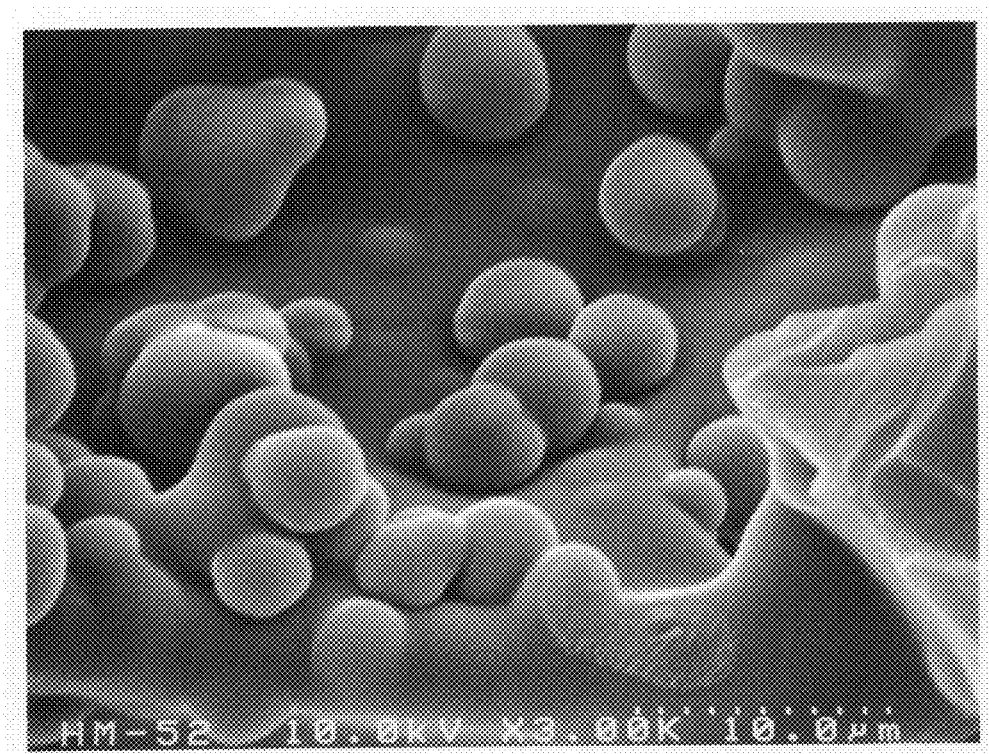
FIG. 34 shows an SEM image (magnification: 3000) of the monolithic body obtained in Example 32.
Figure 35:
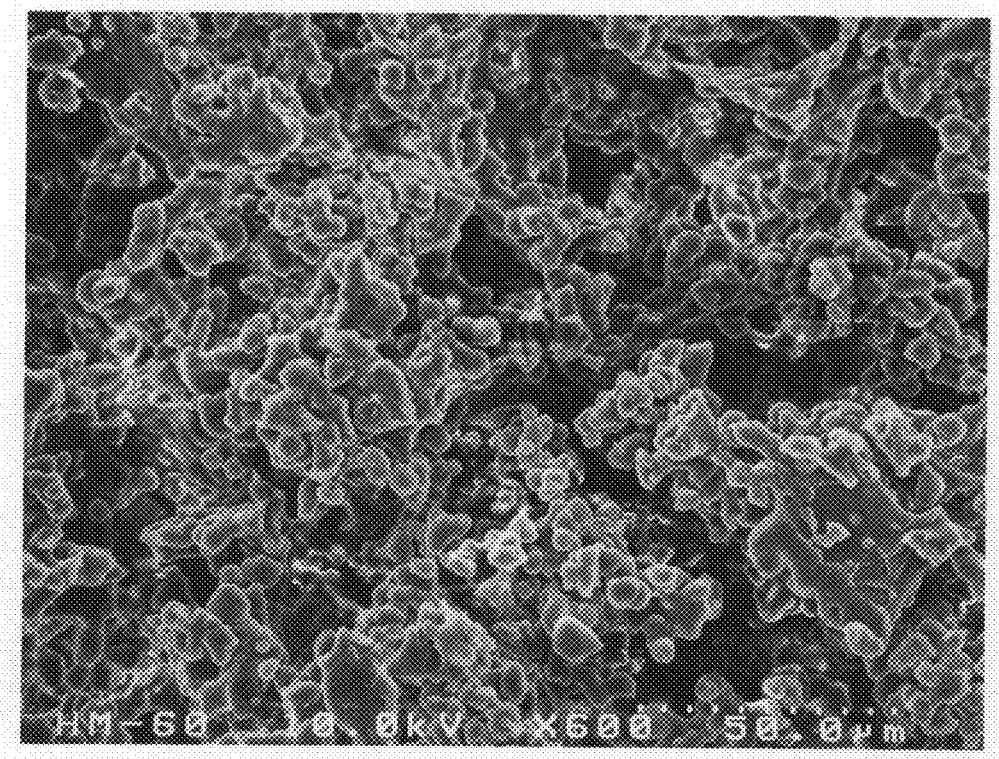
FIG. 35 shows an SEM image (magnification: 600) of the monolithic body obtained in Example 33.
Figure 36:
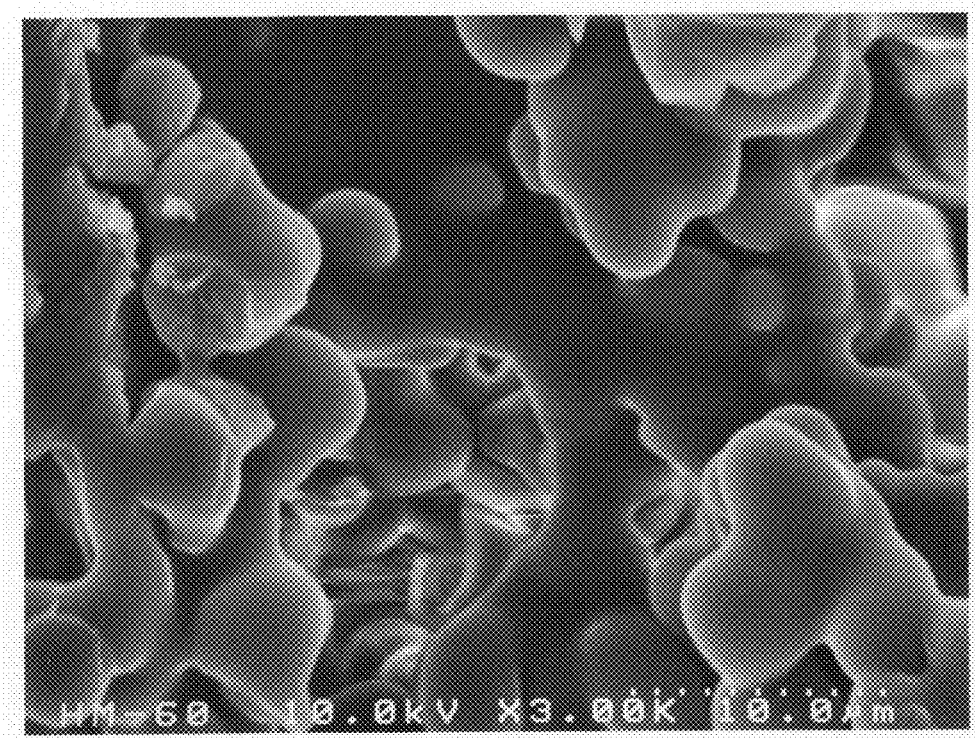
FIG. 36 shows an SEM image (magnification: 3000) of the monolithic body obtained in Example 33.
Figure 37:
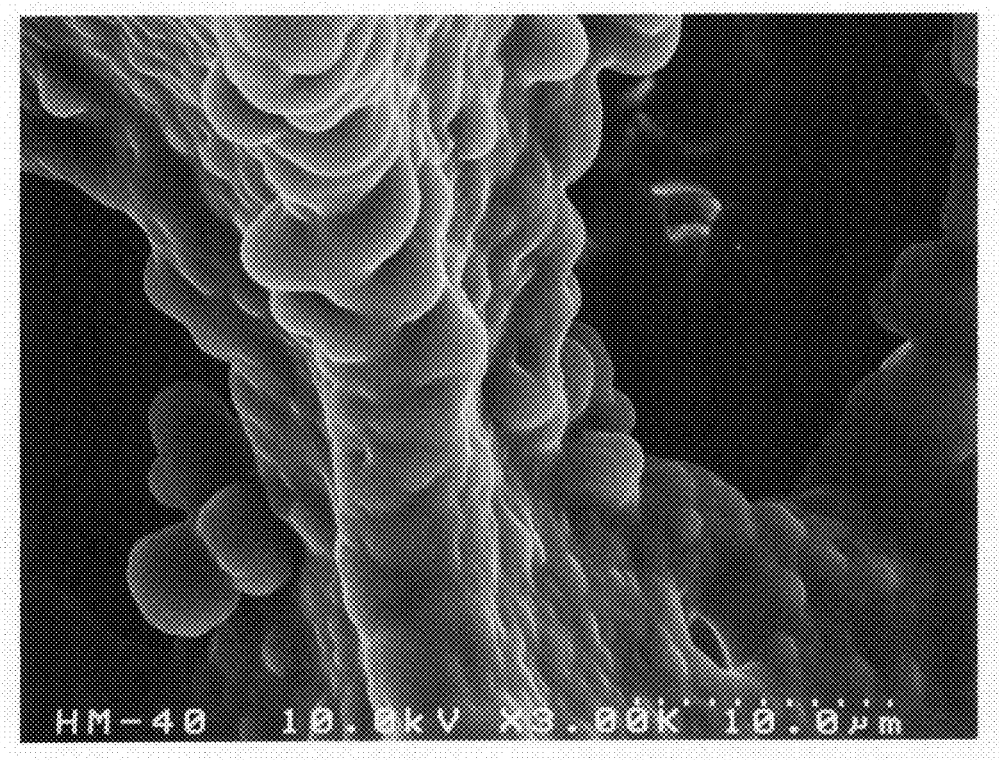
FIG. 37 shows an SEM image (magnification: 3000) of the monolithic body obtained in Example 34.
Figure 38:
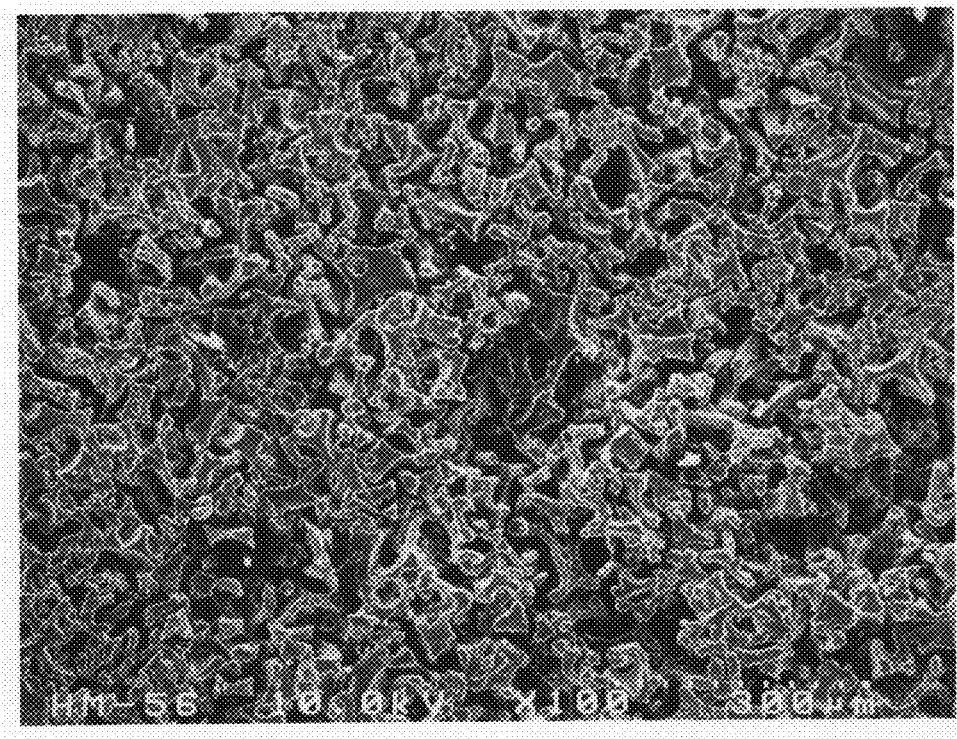
FIG. 38 shows an SEM image (magnification: 100) of the monolithic body obtained in Example 35.
Figure 39:
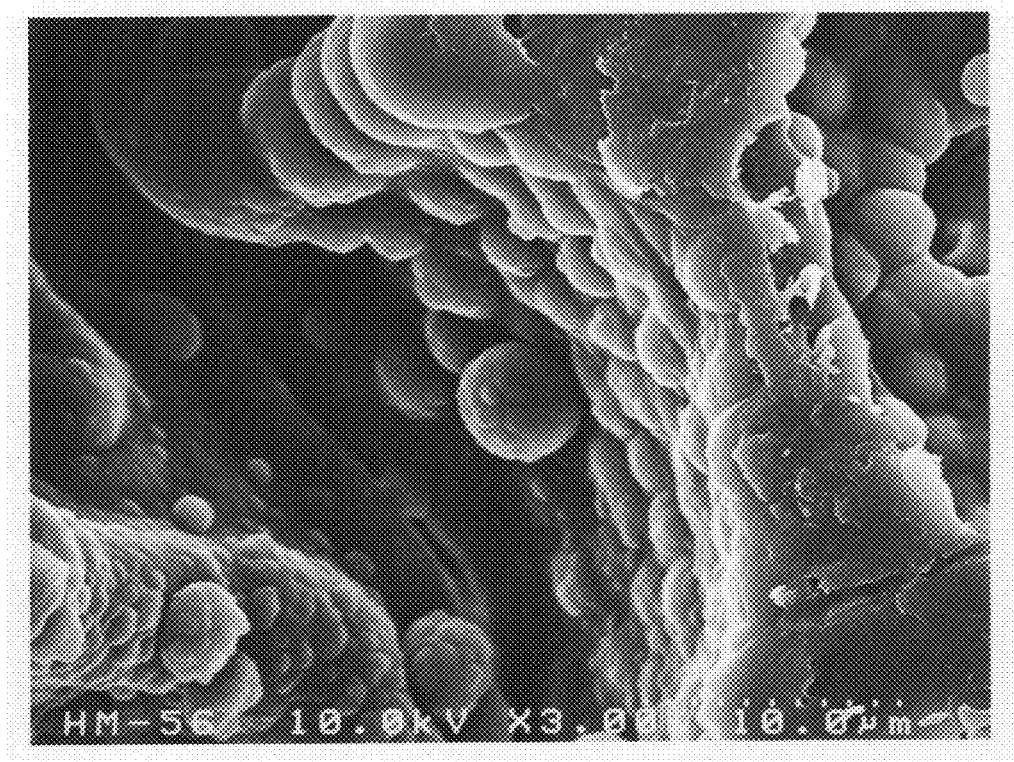
FIG. 39 shows an SEM image (magnification: 3000) of the monolithic body obtained in Example 35.

A monolithic body was produced in the same manner as in Example 17, except that the amount of the vinyl monomer, the amount of the crosslinking agent, the type and the amount of the organic solvent, and the porous structure, the crosslink density, and the amount of the monolithic intermediate body used in the step III, and the polymerization temperature were changed as shown in Table 6. The results are shown in Tables 6 and 7. The internal structure of the composite monolithic body (in a dry state) was observed using an SEM (see FIGS. 32 to 39). FIGS. 32 to 34 show the internal structure of the composite monolithic body obtained in Example 18, FIGS. 35 and 36 show the internal structure of the composite monolithic body obtained in Example 19, FIG. 37 shows the internal structure of the composite monolithic body obtained in Example 20, and FIGS. 38 and 39 show the internal structure of the composite monolithic body obtained in Example 21. Note that Example 18 satisfied the condition regarding the crosslink density ratio (2.5) according to the present invention, Example 19 satisfied the condition regarding the type of organic solvent (PEG molecular weight: 400) according to the present invention, Example 20 satisfied the condition regarding the vinyl monomer concentration (28.0%) according to the present invention, and Example 21 satisfied the condition regarding the polymerization temperature (40° C. (lower than the 10-hour half-life temperature of the initiator by 11° C.)) according to the present invention. As shown in FIGS. 32 to 39, protrusions adhered to the surface of the skeleton of the composite monolithic bodies of Examples 19 to 21. The average particle diameter of the protrusions refers to the average value of the maximum diameters of the protrusions. As shown in FIGS. 32 to 39 and Table 7, the average diameter of the particles adhering to the surface of the skeleton of the monolithic bodies of Examples 18 to 21 was 3 to 8 μm, and the coverage was 50 to 95%. In Example 18, 80% of the particles had a diameter of 3 to 6 μm. In Example 19, 80% of the protrusions had a diameter of 3 to 10 μm. In Example 20, 90% of the particles had a diameter of 2 to 5 μm. In Example 21, 90% of the particles had a diameter of 3 to 7 μm.

Production of Composite Monolithic Cation Exchanger

The monolithic body obtained as described above was reacted with chlorosulfuric acid in the same manner as in Example 17 to obtain a composite monolithic cation exchanger. The results are shown in Table 7. The average diameter of the continuous hole (pore) of the composite monolithic cation exchangers of Examples 18 to 21 was 21 to 52 μm. The average diameter of the particles or the like adhering to the surface of the skeleton was 5 to 17 μm, the coverage was 50 to 95%, the differential pressure coefficient was 0.010 to 0.057 MPa/m·LV, and the length of the ion-exchange band was 8 to 12 mm. 90% of the particles had a diameter of 5 to 10 μm.

Example 22

Production of Composite Monolithic Body

Figure 40:
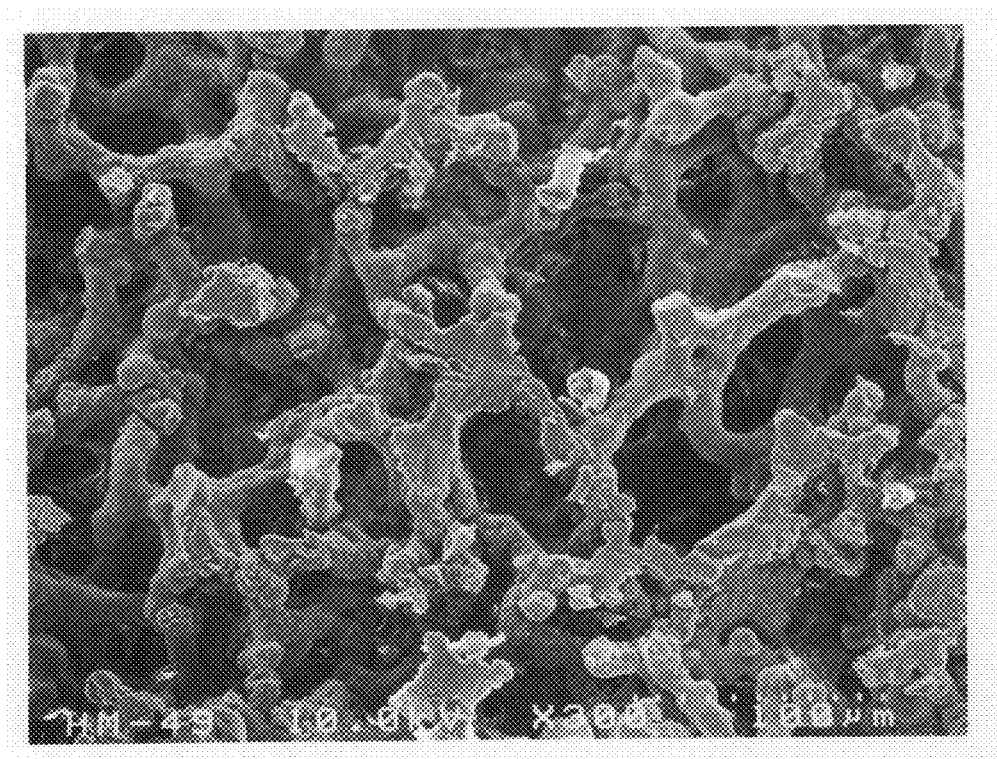
FIG. 40 shows an SEM image (magnification: 100) of the monolithic body obtained in Example 36.
Figure 41:
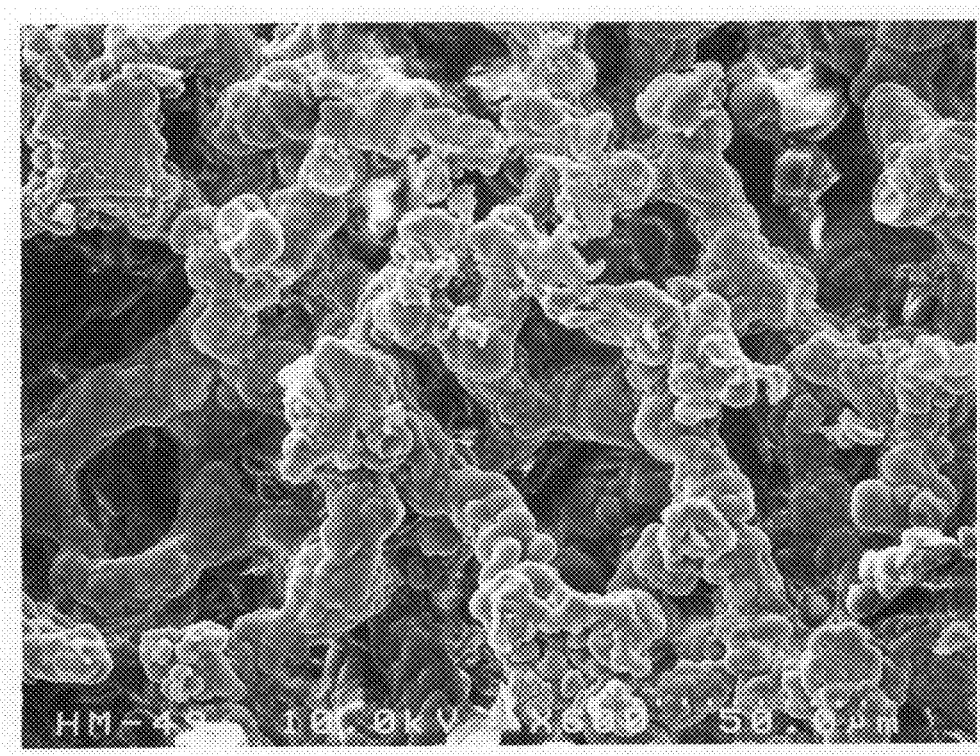
FIG. 41 shows an SEM image (magnification: 600) of the monolithic body obtained in Example 36.
Figure 42:
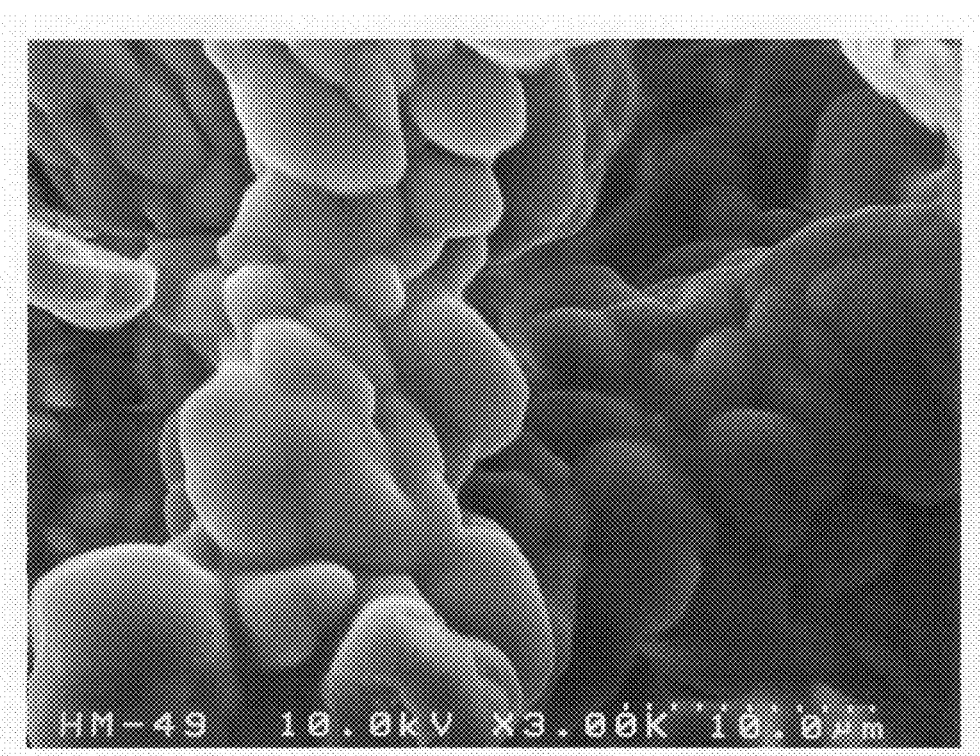
FIG. 42 shows an SEM image (magnification: 3000) of the monolithic body obtained in Example 36.

A monolithic body was produced in the same manner as in Example 17, except that the type and the amount of the vinyl monomer, the amount of the crosslinking agent, the type and the amount of the organic solvent, and the porous structure, the crosslink density, and the amount of the monolithic intermediate body used in the step III were changed as shown in Table 6. The results are shown in Tables 6 and 7. The internal structure of the composite monolithic body (in a dry state) was observed using an SEM (see FIGS. 40 to 42). Protrusions adhered to the surface of the skeleton of the composite monolithic body of Example 22. The average value of the maximum diameters of the protrusions formed on the surface of the monolithic body of Example 22 was 10 μm, and the coverage was 100%. 80% of the particles had a diameter of 6 to 12 μm.

Production of Composite Monolithic Anion Exchanger

The composite monolithic body obtained as described above was cut into a disk having an outer diameter of 70 mm and a thickness of about 15 mm. The weight of the composite monolithic body was 17.9 g. After the addition of 1500 ml of tetrahydrofuran, the mixture was heated at 40° C. for 1 hour. After cooling the mixture to 10° C. or less, 114.5 g of a 30% trimethylamine aqueous solution was slowly added. The mixture was then reacted at 40° C. for 24 hours. After completion of the reaction, tetrahydrofuran was removed by washing with methanol, followed by washing with purified water to obtain a monolithic anion exchanger.

The swelling rate of the anion exchanger before and after the reaction was 2.0. The ion-exchange capacity per unit volume of the anion exchanger was 0.32 mg equivalent/ml in water-wet conditions. The average diameter of the continuous hole (pore) of the organic porous ion exchanger in water-wet conditions was calculated from the average diameter of the continuous hole (pore) of the organic porous body and the swelling rate of the monolithic anion exchanger in water-wet conditions, and the calculated average diameter was 58 μm. The average diameter of the protrusions was 20 μm, the coverage was 100%, and the total pore volume was 2.1 ml/g. The length of the ion-exchange band was very small (16 mm). The differential pressure coefficient (i.e., the pressure loss that occurs when passing water through the porous body) was 0.041 MPa/m·LV (i.e., lower than the practical level). 80% of the particles had a diameter of 12 to 24 μm. The results are shown in Table 7.

The quaternary ammonium group distribution in the porous anion exchanger was determined by treating the anion exchanger with a hydrochloric acid aqueous solution, and analyzing the chlorine atom distribution by EPMA. It was found that chlorine atoms were uniformly distributed on the surface and the inside of the skeleton of the anion exchanger.

It was thus confirmed that quaternary ammonium groups were uniformly introduced into the anion exchanger.

Comparative Example 9

Production of Monolithic Body

A monolithic body was produced in the same manner as in Example 17, except that the amount of the vinyl monomer, the amount of the crosslinking agent, the type and the amount of the organic solvent, and the amount of the monolithic intermediate body used in the step III were changed as shown in Table 6. The results are shown in Tables 6 and 7. No particles and protrusions were observed on the surface of the skeleton (the SEM photograph is omitted). As shown in Tables 6 and 7, particles were not formed on the surface of the skeleton of the monolithic body when producing the monolithic body without satisfying the conditions (1) to (5).

Production of Monolithic Cation Exchanger

The monolithic body obtained as described above was reacted with chlorosulfuric acid in the same manner as in Example 17 to obtain a monolithic cation exchanger. The results are shown in Table 7. The length (26 mm) of the ion-exchange band of the monolithic cation exchanger was larger than that of the examples.

Comparative Examples 10 to 12

Production of Monolithic Body

A monolithic body was produced in the same manner as in Example 17, except that the amount of the vinyl monomer, the amount of the crosslinking agent, the type and the amount of the organic solvent, and the porous structure, the crosslink density, and the amount of the monolithic intermediate body used in the step III were changed as shown in Table 6. The results are shown in Tables 6 and 7. Note that Comparative Example 10 did not satisfy the condition regarding the crosslink density ratio according to the present invention (0.2), Comparative Example 11 did not satisfy the condition regarding the type of organic solvent according to the present invention (2-(2-methoxyethoxy)ethanol, molecular weight: 120), and Comparative Example 12 did not satisfy the condition regarding the polymerization temperature according to the present invention (50° C. (lower than the 10-hour half-life temperature of the initiator by 1° C.). The results are shown in Table 7. Particles were not formed on the surface of the skeleton of the monolithic bodies of Comparative Examples 10 and 12. In Comparative Example 11, the isolated product was transparent (i.e., the porous structure was decomposed (disappeared)).

Production of Monolithic Cation Exchanger

The organic porous body obtained as described above was reacted with chlorosulfuric acid in the same manner as in Comparative Example 9 to obtain a monolithic cation exchanger (excepting Comparative Example 11). The results are shown in Table 7. The length (23 to 26 mm) of the ion-exchange band of the monolithic cation exchanger was larger than that of the examples.

Comparative Example 13

Production of Monolithic Body

A monolithic body was produced in the same manner as in Comparative Example 9, except that the amount of the vinyl monomer, the amount of the crosslinking agent, the amount of the organic solvent, and the porous structure and the amount of the monolithic intermediate body used in the step III were changed as shown in Table 6. The results are shown in Tables 6 and 7. It was thus confirmed that particles are not formed on the surface of the skeleton of the monolithic body when the monolithic body is produced without satisfying the specific production conditions according to the present invention.

Production of Monolithic Anion Exchanger

The monolithic body obtained as described above was cut into a disk having a diameter of 70 mm and a thickness of about 15 mm. After the addition of 1400 ml of dimethoxymethane and 20 ml of tin tetrachloride, 560 ml of chlorosulfuric acid was added dropwise to the mixture under cooling with ice. The mixture was then heated to 35° C., and reacted for 5 hours to introduce a chloromethyl group. After completion of the reaction, the mother liquor was siphoned, washed with a mixed solvent (THF/water=2/1), and washed with THF. After the addition of 1000 ml of THF and 600 ml of a 30% trimethylamine aqueous solution, the mixture was reacted at 60° C. for 6 hours. After completion of the reaction, the product was washed with a mixed solvent (methanol/water), washed with purified water, and isolated. The results are shown in Table 7. The length (47 mm) of the ion-exchange band of the monolithic anion exchanger was larger than that of the examples.

TABLE 6

| | Component | | | | | | | | |
|---|---|---|---|---|---|---|---|---|---|
| | Vinyl monomer | | | Crosslinking agent | | | Crosslink density ratio | Organic solvent | |
| | Type | Amount g | Concentration wt % | Type | Amount g | mol %[*1] | [*1]/[*2] | Type | Amount g |
| Example 17 | Styrene | 36.0 | 36.0 | Divinylbenzene | 4.0 | 6.6 | 5.1 | 1-Decanol | 60 |
| Example 18 | Styrene | 38.0 | 38.0 | Divinylbenzene | 2.0 | 3.3 | 2.5 | 1-Decanol | 60 |
| Example 19 | Styrene | 39.2 | 39.2 | Divinylbenzene | 0.8 | 1.3 | 1.0 | PEG[*3] | 60 |
| Example 20 | Styrene | 58.8 | 28.0 | Divinylbenzene | 1.2 | 1.3 | 1.0 | 1-Decanol | 150 |
| Example 21 | Styrene | 49.0 | 49.0 | Divinylbenzene | 1.0 | 1.3 | 1.0 | 1-Decanol | 50 |
| Example 22 | VBC[*4] | 39.4 | 39.4 | Divinylbenzene | 0.6 | 1.4 | 1.4 | 1-Butanol | 60 |
| Comparative Example 9 | Styrene | 49.0 | 49.0 | Divinylbenzene | 1.0 | 1.3 | 1.0 | 1-Octanol | 50 |
| Comparative Example 10 | Styrene | 39.2 | 39.2 | Divinylbenzene | 0.8 | 1.3 | 0.2 | 1-Octanol | 60 |
| Comparative Example 11 | Styrene | 49.0 | 49.0 | Divinylbenzene | 1.0 | 1.3 | 1.0 | MEE[*5] | 50 |

TABLE 6-continued

| | | | | | | | | | |
|---|---|---|---|---|---|---|---|---|---|
| Comparative Example 12 | Styrene | 49.0 | 49.0 | Divinylbenzene | 1.0 | 1.3 | 1.0 | 1-Decanol | 50 |
| Comparative Example 13 | Styrene | 39.2 | 39.2 | Divinylbenzene | 0.8 | 1.3 | 1.0 | 1-Decanol | 60 |

| | Component Monolithic intermediate body | | | | | |
|---|---|---|---|---|---|---|
| | Copolymer | Amount g | Crosslink density mol %*2 | Mesopore diameter μm | Total pore volume ml/g | Polymerization temperature °C |
| Example 17 | Styrene-divinylbenzene copolymer | 3.2 | 1.3 | 40 | 15.8 | 60 |
| Example 18 | Styrene-divinylbenzene copolymer | 3.3 | 1.3 | 40 | 15.8 | 60 |
| Example 19 | Styrene-divinylbenzene copolymer | 3.1 | 1.3 | 40 | 15.8 | 60 |
| Example 20 | Styrene-divinylbenzene copolymer | 8.1 | 1.3 | 56 | 7.5 | 60 |
| Example 21 | Styrene-divinylbenzene copolymer | 3.3 | 1.3 | 40 | 15.8 | 40 |
| Example 22 | Styrene-divinylbenzene copolymer | 2.9 | 1.0 | 28 | 17.2 | 60 |
| Comparative Example 9 | Styrene-divinylbenzene copolymer | 3.0 | 1.3 | 40 | 15.8 | 60 |
| Comparative Example 10 | Styrene-divinylbenzene copolymer | 4.1 | 6.6 | 31 | 15.9 | 60 |
| Comparative Example 11 | Styrene-divinylbenzene copolymer | 3.3 | 1.3 | 40 | 15.8 | 60 |
| Comparative Example 12 | Styrene-divinylbenzene copolymer | 3.0 | 1.3 | 40 | 15.8 | 50 |
| Comparative Example 13 | Styrene-divinylbenzene copolymer | 7.9 | 1.3 | 56 | 7.5 | 60 |

*[1]Amount (mol %) of divinylbenzene based on total amount of styrene and divinylbenzene
*[2]Amount (mol %) of divinylbenzene based on total amount of styrene and divinylbenzene
*[3]Polyethylene glycol (molecular weight; 400)
*[4]Vinylbenzyl chloride
*[5]2-(2-Methoxyethoxy)ethanol (molecule weight: 120)

TABLE 7

| | Composite monolithic body | | | | | Composite monolithic ion exchanger | |
|---|---|---|---|---|---|---|---|
| | Continuous pore μm | Total pore volume ml/g | Average diameter of particles μm | Coverage % | Structure of skeleton | Continuous pore μm | Total pore volume ml/g |
| Example 17 | 16 | 2.3 | 4 | 80 | Continuous macropore structure | 21 | 2.3 |
| Example 18 | 35 | 3.8 | 5 | 50 | Continuous macropore structure | 52 | 3.8 |
| Example 19 | 19 | 1.9 | 8 | 95 | Continuous macropore structure | 32 | 1.9 |
| Example 20 | 27 | 3.1 | 3 | 70 | Continuous macropore structure | 48 | 3.1 |
| Example 21 | 27 | 2.4 | 5 | 60 | Co-continuous structure | 43 | 2.4 |
| Example 22 | 29 | 2.1 | 10 | 100 | Co-continuous structure | 58 | 2.1 |
| Comparative Example 9 | 36 | 2.3 | — | 0 | Continuous macropore structure | 65 | 2.3 |
| Comparative Example 10 | 31 | 2.7 | — | 0 | Continuous macropore structure | 47 | 2.7 |
| Comparative Example 12 | 38 | 2.8 | — | 0 | Continuous macropore structure | 65 | 2.8 |
| Comparative Example 13 | 38 | 2.9 | — | 0 | Continuous macropore structure | 61 | 2.9 |

TABLE 7-continued

| | Composite monolithic ion exchanger | | | | | | |
|---|---|---|---|---|---|---|---|
| | Average diameter of particles μm | Coverage % | Structure of skeleton | Differential pressure coefficient MPa/m · LV | Functional group introduced | Ion-exchange capacity per unit volume mg equivalent/ml | Length of ion-exchange band mm |
| Example 17 | 5 | 80 | Continuous macropore structure | 0.057 | Sulfonic acid group | 1.11 | 9*[1] |
| Example 18 | 7 | 50 | Continuous macropore structure | 0.015 | Sulfonic acid group | 0.78 | 12*[1] |
| Example 19 | 13 | 95 | Continuous macropore structure | 0.041 | Sulfonic acid group | 0.56 | 8*[1] |
| Example 20 | 5 | 70 | Continuous macropore structure | 0.010 | Sulfonic acid group | 0.48 | 10*[1] |
| Example 21 | 8 | 60 | Co-continuous structure | 0.032 | Sulfonic acid group | 0.68 | 10*[1] |
| Example 22 | 20 | 100 | Co-continuous structure | 0.041 | Quaternary ammonium group | 0.32 | 16*[2] |
| Comparative Example 9 | — | 0 | Continuous macropore structure | 0.016 | Sulfonic acid group | 0.64 | 26*[1] |
| Comparative Example 10 | — | 0 | Continuous macropore structure | 0.028 | Sulfonic acid group | 0.73 | 23*[1] |
| Comparative Example 12 | — | 0 | Continuous macropore structure | 0.014 | Sulfonic acid group | 0.65 | 24*[1] |
| Comparative Example 13 | — | 0 | Continuous macropore structure | 0.020 | Quaternary ammonium group | 0.56 | 47*[2] |

*[1]Sodium ion (LV = 20 m/h)
*[2]Fluoride ion (LV = 20 m/h)

INDUSTRIAL APPLICABILITY

The monolithic body and the monolithic ion exchanger according to the first aspect of the present invention are chemically stable, have high mechanical strength and a large ion-exchange capacity per unit volume, and ensure a low pressure loss when fluid (e.g., water or gas) passes through due to a large continuous pore. The monolithic body and the monolithic ion exchanger according to the second aspect of the present invention are hydrophobic and chemically stable, have a thick three-dimensional continuous skeleton, high mechanical strength, and a large ion-exchange capacity per unit volume, ensure a low pressure loss when fluid (e.g., water or gas) passes through due to a large continuous pore of the co-continuous structure, and achieve a significantly small length of the ion-exchange band. The monolithic body and the monolithic ion exchanger according to the third aspect of the present invention are chemically stable, have high mechanical strength, and ensure a high contact efficiency with fluid and a low pressure loss when fluid passes through. Therefore, the monolithic bodies and the monolithic ion exchangers according to the first to third aspects of the present invention are useful as a chemical filter, an adsorbent, an ion exchanger used for a two-bed three-tower water deionizing apparatus or an electric water deionizing apparatus, a chromatography packing material, or a solid acid/base catalyst, and may be applied to various fields.

The invention claimed is:
1. A monolithic organic porous body comprising:
a monolithic organic porous intermediate body which comprises a skeleton comprising a first polymer material, and which has a continuous macropore structure comprising cellular macropores that overlap to form openings having an average diameter of 20 to 200 μm, and
a second polymer material which adheres to portions of a surface of the skeleton throughout the monolithic organic porous intermediate body, so as to thicken the skeleton throughout the monolithic organic porous intermediate body,
wherein the monolithic organic porous body has a thickness of 1 mm or more and a total pore volume of 0.5 to 5 ml/g, and
wherein in an SEM image of a cross-section of the continuous macropore structure in a dry state, a cross-sectional area of a skeleton is 25 to 50% of a total area of the SEM image,
the monolithic organic porous body being produced by performing:
a first step comprising stirring a mixture of an oil-soluble monomer that does not include an ion-exchange group, a surfactant, and water to prepare a water-in-oil emulsion, and polymerizing the water-in-oil emulsion, so as to obtain the monolithic organic porous intermediate body that has a total pore volume of 5 to 16 ml/g,
a second step comprising mixing a vinyl monomer, a crosslinking agent that includes at least two vinyl groups in one molecule, an organic solvent that dissolves the vinyl monomer and the crosslinking agent, but does not dissolve a polymer produced by polymerizing the vinyl monomer, and an initiator, and
a third step comprising polymerizing the mixture obtained by the second step in a stationary state in a presence of the monolithic organic porous intermediate body, so as to obtain the monolithic organic porous body having a skeleton thicker than the skeleton of the monolithic organic porous intermediate body.

2. A monolithic organic porous body comprising:
a monolithic organic porous intermediate body which comprises a skeleton comprising a first polymer material, and
a second polymer material which adheres to portions of a surface of the skeleton throughout the monolithic organic porous intermediate body, so as to thicken the skeleton throughout the monolithic organic porous intermediate body,
wherein the first polymer material comprises oil-soluble monomers that do not include an ion exchange group, the oil-soluble monomers being polymerized in a water-in-oil emulsion with a surfactant and water,
wherein the second polymer material comprises a vinyl monomer and a crosslinking agent that includes at least two vinyl groups in one molecule,
wherein the monolithic organic porous intermediate body has a continuous macropore structure comprising cellular macropores that overlap to form openings having an average diameter of 20 to 200 μm,
wherein the monolithic organic porous intermediate body has a total pore volume of 5 to 16 ml/g, and
wherein the monolithic organic porous body has a thickness of 1 mm or more and a total pore volume of 0.5 to 5 ml/g,
the monolithic organic porous body being produced by performing:
a first step comprising stirring a mixture of the oil-soluble monomers, the surfactant, and the water to prepare the water-in-oil emulsion, and polymerizing the water-in-oil emulsion, so as to obtain the monolithic organic porous intermediate body,
a second step comprising mixing the vinyl monomer, the crosslinking agent, an organic solvent that dissolves the vinyl monomer and the crosslinking agent, but does not dissolve a polymer produced by polymerizing the vinyl monomer, and an initiator, and
a third step comprising polymerizing the mixture obtained by the second step in a stationary state in a presence of the monolithic organic porous intermediate body, so as to obtain the monolithic organic porous body having a skeleton thicker than the skeleton of the monolithic organic porous intermediate body.

3. A monolithic organic porous ion exchanger comprising a continuous macropore structure, the continuous macropore structure including cellular macropores that overlap to form openings having an average diameter of 30 to 300 μm in water-wet conditions, the monolithic organic porous ion exchanger having a thickness of 1 mm or more, a total pore volume of 0.5 to 5 ml/g, and an ion-exchange capacity per unit volume of 0.4 mg equivalent/ml or more when in water-wet conditions, ion-exchange groups being uniformly distributed in the monolithic organic porous ion exchanger, and an area of a skeleton observed within an SEM image of a section of the continuous macropore structure (in a dry state) being 25 to 50%,
the monolithic organic porous ion exchanger being produced by performing:
a first step comprising stirring a mixture of an oil-soluble monomer that does not include an ion-exchange group, a surfactant, and water to prepare a water-in-oil emulsion, and polymerizing the water-in-oil emulsion, so as to obtain a monolithic organic porous intermediate body that has a total pore volume of 5 to 16 ml/g,
a second step comprising mixing a vinyl monomer, a crosslinking agent that includes at least two vinyl groups in one molecule, an organic solvent that dissolves the vinyl monomer and the crosslinking agent, but does not dissolve a polymer produced by polymerizing the vinyl monomer, and an initiator,
a third step comprising polymerizing the mixture obtained by the second step in a stationary state in a presence of the monolithic organic porous intermediate body, so as to obtain a monolithic organic porous body having a skeleton thicker than the skeleton of the monolithic organic porous intermediate body, and
a fourth step comprising introducing an ion-exchange group into the monolithic organic porous body.

4. A monolithic organic porous ion exchanger comprising the monolithic organic porous body according to claim 2, and ion-exchange groups introduced into the monolithic organic porous body, the monolithic organic porous ion exchanger having an ion-exchange capacity per unit volume of 0.4 mg equivalent/ml or more in water-wet conditions, the ion-exchange groups being uniformly distributed in the monolithic organic porous ion exchanger.

5. A method of producing a monolithic organic porous body comprising a step I that includes stirring a mixture of an oil-soluble monomer that does not include an ion-exchange group, a surfactant, and water to prepare a water-in-oil emulsion, and polymerizing the water-in-oil emulsion to obtain a monolithic organic porous intermediate body that has a continuous macropore structure and has a total pore volume of 5 to 16 ml/g, a step II that includes mixing a vinyl monomer, a crosslinking agent that includes at least two vinyl groups in one molecule, an organic solvent that dissolves the vinyl monomer and the crosslinking agent, but does not dissolve a polymer produced by polymerizing the vinyl monomer, and an initiator, and a step III that includes polymerizing the mixture obtained by the step II in a stationary state in the presence of the monolithic organic porous intermediate body obtained by the step I to obtain a monolithic organic porous body having a skeleton thicker than that of the monolithic organic porous intermediate body.

6. The method according to claim 5, wherein the monolithic organic porous intermediate body obtained by the step I includes a continuous macropore structure that includes cellular macropores that overlap to form openings having an average diameter of 20 to 200 μm, and has a total pore volume of 5 to 16 ml/g.

7. A method of producing a monolithic organic porous ion exchanger comprising a step I that includes stirring a mixture of an oil-soluble monomer that does not include an ion-exchange group, a surfactant, and water to prepare a water-in-oil emulsion, and polymerizing the water-in-oil emulsion to obtain a monolithic organic porous intermediate body that has a continuous macropore structure and has a total pore volume of 5 to 16 ml/g, a step II that includes mixing a vinyl monomer, a crosslinking agent that includes at least two vinyl groups in one molecule, an organic solvent that dissolves the vinyl monomer and the crosslinking agent, but does not dissolve a polymer produced by polymerizing the vinyl monomer, and an initiator, a step III that includes polymerizing the mixture obtained by the step II in a stationary state in the presence of the monolithic organic porous intermediate body obtained by the step I to obtain a monolithic organic porous body having a skeleton thicker than that of the monolithic organic porous intermediate body, and a step IV that includes introducing an ion-exchange group into the organic porous body obtained by the step III.

8. A monolithic organic porous body comprising:
a co-continuous structure that comprises a three-dimensional continuous skeleton and a three-dimensional continuous pore defined by the three-dimensional continuous skeleton,
wherein the three-dimensional continuous skeleton has a rod shape,
wherein the three-dimensional continuous skeleton has a thickness of 0.8 to 40 μm,
wherein the three-dimensional continuous pore has a diameter of 8 to 80 μm,
wherein the three-dimensional continuous skeleton comprises an aromatic vinyl polymer that has a crosslinking unit content of 0.3 to 5.0 mol %, and
wherein the monolithic organic porous body has a total pore volume of 0.5 to 5 ml/g,
the monolithic organic porous body being produced by performing:
a first step comprising stirring a mixture of an oil-soluble monomer that does not include an ion-exchange group, a surfactant, and water to prepare a water-in-oil emulsion, and polymerizing the water-in-oil emulsion, so as to obtain a monolithic organic porous intermediate body that has a total pore volume of more than 16 ml/g and 30 ml/g or less,
a second step comprising mixing a vinyl monomer, a crosslinking agent that includes at least two vinyl groups in one molecule, an organic solvent that dissolves the vinyl monomer and the crosslinking agent, but does not dissolve a polymer produced by polymerizing the vinyl monomer, and an initiator, and
a third step comprising polymerizing the mixture obtained by the second step in a stationary state in a presence of the monolithic organic porous intermediate body,
so as to obtain the monolithic organic porous body having a skeleton thicker than a skeleton of the monolithic organic porous intermediate body.

9. A monolithic organic porous body comprising:
a co-continuous structure that comprises a three-dimensional continuous skeleton and a three-dimensional continuous pore defined by the three-dimensional continuous skeleton,
wherein the three-dimensional continuous skeleton has a rod shape,
wherein the three-dimensional continuous skeleton has a thickness of 0.8 to 40 μm,
wherein the three-dimensional continuous pore has a diameter of 8 to 80 μm,
wherein the three-dimensional continuous skeleton comprises an aromatic vinyl polymer that has a crosslinking unit content of 0.3 to 5.0 mol %,
wherein the monolithic organic porous body has a total pore volume of 0.5 to 5 ml/g, and
wherein the monolithic organic porous body comprises:
a monolithic organic porous intermediate body which comprises a skeleton comprising a first polymer material, and
a second polymer material which adheres to portions of a surface of the skeleton throughout the monolithic organic porous intermediate body, so as to thicken the skeleton throughout the monolithic organic porous intermediate body,
wherein the first polymer material comprises oil-soluble monomers that do not include an ion exchange group, the oil-soluble monomers being polymerized in a water-in-oil emulsion with a surfactant and water,
wherein the second polymer material comprises aromatic vinyl monomers and a crosslinking agent that includes at least two vinyl groups in one molecule, and
wherein the monolithic organic porous intermediate body has a continuous macropore structure and has a total pore volume of more than 16 ml/g and 30 ml/g or less,
the monolithic organic porous body being produced by performing:
a first step comprising stirring a mixture of the oil-soluble monomers, the surfactant, and the water to prepare the water-in-oil emulsion, and polymerizing the water-in-oil emulsion, so as to obtain the monolithic organic porous intermediate body,
a second step comprising mixing the vinyl monomer, the crosslinking agent, an organic solvent that dissolves the vinyl monomer and the crosslinking agent, but does not dissolve a polymer produced by polymerizing the vinyl monomer, and an initiator, and
a third step comprising polymerizing the mixture obtained by the second step in a stationary state in a presence of the monolithic organic porous intermediate body,
so as to obtain the monolithic organic porous body having a skeleton thicker than the skeleton of the monolithic organic porous intermediate body.

10. A monolithic organic porous ion exchanger comprising a co-continuous structure that includes a three-dimensional continuous skeleton having a thickness of 1 to 60 μm, and a three-dimensional continuous pore defined by the skeleton having a diameter of 10 to 100 μm, the skeleton being formed of an aromatic vinyl polymer that has a crosslinking unit content of 0.3 to 5.0 mol %, the monolithic organic porous ion exchanger having a total pore volume of 0.5 to 5 ml/g, and an ion-exchange capacity per unit volume of 0.3 mg equivalent/ml or more in water-wet conditions, ion-exchange groups being uniformly distributed in the monolithic organic porous ion exchanger,
the monolithic organic porous ion exchanger being produced by performing:
a first step comprising stirring a mixture of an oil-soluble monomer that does not include an ion-exchange group, a surfactant, and water to prepare a water-in-oil emulsion, and polymerizing the water-in-oil emulsion, so as to obtain a monolithic organic porous intermediate body that has a total pore volume of 5 to 16 ml/g,
a second step comprising mixing a vinyl monomer, a crosslinking agent that includes at least two vinyl groups in one molecule, an organic solvent that dissolves the vinyl monomer and the crosslinking agent, but does not dissolve a polymer produced by polymerizing the vinyl monomer, and an initiator,
a third step comprising polymerizing the mixture obtained by the second step in a stationary state in a presence of the monolithic organic porous intermediate body, so as to obtain a monolithic organic porous body having a skeleton thicker than the skeleton of the monolithic organic porous intermediate body, and
a fourth step comprising introducing an ion-exchange group into the monolithic organic porous body.

11. A monolithic organic porous ion exchanger comprising the monolithic organic porous body according to claim 9, and ion-exchange groups introduced into the monolithic organic porous body, the monolithic organic porous ion exchanger having an ion-exchange capacity per unit volume of 0.3 mg equivalent/ml or more in water-wet conditions, the ion-exchange groups being uniformly distributed in the monolithic organic porous ion exchanger.

12. A method of producing a monolithic organic porous body comprising a step I that includes stirring a mixture of an oil-soluble monomer that does not include an ion-exchange group, a surfactant, and water to prepare a water-in-oil emulsion, and polymerizing the water-in-oil emulsion to obtain a monolithic organic porous intermediate body that has a continuous macropore structure and has a total pore volume of more than 16 ml/g and 30 ml/g or less, a step II that includes mixing an aromatic vinyl monomer, 0.3 to 5 mol % of a crosslinking agent that includes at least two vinyl groups in one molecule, an organic solvent that dissolves the aromatic vinyl monomer and the crosslinking agent, but does not dissolve a polymer produced by polymerizing the aromatic vinyl monomer, and an initiator, and a step III that includes polymerizing the mixture obtained by the step II in a stationary state in the presence of the monolithic organic porous intermediate body obtained by the step I to obtain a co-continuous structure.

13. The method according to claim 12, wherein the monolithic organic porous intermediate body obtained by the step I includes a continuous macropore structure that includes cellular macropores that overlap to form openings having an average diameter of 5 to 100 µm.

14. A method of producing a monolithic organic porous ion exchanger comprising a step I that includes stirring a mixture of an oil-soluble monomer that does not include an ion-exchange group, a surfactant, and water to prepare a water-in-oil emulsion, and polymerizing the water-in-oil emulsion to obtain a monolithic organic porous intermediate body that has a continuous macropore structure and has a total pore volume of more than 16 ml/g and 30 ml/g or less, a step II that includes mixing an aromatic vinyl monomer, 0.3 to 5 mol % of a crosslinking agent that includes at least two vinyl groups in one molecule, an organic solvent that dissolves the aromatic vinyl monomer and the crosslinking agent, but does not dissolve a polymer produced by polymerizing the aromatic vinyl monomer, and an initiator, a step III that includes polymerizing the mixture obtained by the step II in a stationary state in the presence of the monolithic organic porous intermediate body obtained by the step I to obtain a body having a co-continuous structure, and a step IV that includes introducing an ion-exchange group into the body obtained by the step III.

15. A monolithic organic porous body comprising a composite structure that comprises:
an organic porous body that comprises a continuous skeleton phase and a continuous pore phase, and
a plurality of particles having a diameter of 2 to 20 µm which adhere to a surface of the continuous skeleton phase, or a plurality of protrusions having a maximum diameter of 2 to 20 µm which are formed on the surface of the continuous skeleton phase, or both,
wherein the continuous skeleton phrase comprises a skeleton that comprises a first polymer material, and a second polymer material that adheres to portions of a surface of the skeleton throughout the monolithic organic porous intermediate body, so as to thicken the skeleton throughout the monolithic organic porous intermediate body,
wherein 40% or more of the surface of the continuous skeleton phase is covered with the plurality of particles or the plurality of protrusions, or both, and
wherein the monolithic organic porous body has a thickness of 1 mm or more, an average pore diameter of 8 to 100 µm, and a total pore volume of 0.5 to 5 ml/g, the monolithic organic porous body being produced by performing:
a first step comprising stirring a mixture of an oil-soluble monomer that does not include an ion-exchange group, a surfactant, and water to prepare a water-in-oil emulsion, and polymerizing the water-in-oil emulsion, so as to obtain a monolithic organic porous intermediate body,
a second step comprising mixing a vinyl monomer, a crosslinking agent that includes at least two vinyl groups in one molecule, an organic solvent that dissolves the vinyl monomer and the crosslinking agent, but does not dissolve a polymer produced by polymerizing the vinyl monomer, and an initiator, and
a third step comprising polymerizing the mixture obtained by the second step in a stationary state in a presence of the monolithic organic porous intermediate body,
so as to obtain the monolithic organic porous body having a skeleton thicker than a skeleton of the monolithic organic porous intermediate body.

16. The monolithic organic porous body according to claim 15,
wherein the organic porous body comprises a continuous macropore structure comprising cellular macropores that overlap to form openings having an average diameter of 20 to 200 µm.

17. The monolithic organic porous body according to claim 15,
wherein the organic porous body comprises a co-continuous structure that comprises a three-dimensional continuous skeleton and a three-dimensional continuous pore defined by the three-dimensional continuous skeleton,
wherein the three-dimensional continuous skeleton has a thickness of 0.8 to 40 µm, and
wherein the three-dimensional continuous pore has a diameter of 8 to 80 µm.

18. A monolithic organic porous body, comprising:
a monolithic organic porous intermediate body which comprises a skeleton comprising a first polymer material, and
a second polymer material which adheres to portions of a surface of the skeleton throughout the monolithic organic porous intermediate body, so as to thicken the skeleton throughout the monolithic organic porous intermediate body,
wherein the first polymer material comprises oil-soluble monomers that do not include an ion exchange group, and a first crosslinking agent that includes at least two vinyl groups in one molecule, the oil-soluble monomers being polymerized with the first crosslinking agent in a water-in-oil emulsion with a surfactant and water,
wherein the second polymer material comprises vinyl monomers and a second crosslinking agent that includes at least two vinyl groups in one molecule,
wherein a plurality of particles or a plurality of protrusions, or both, are formed on a surface of the polymer skeleton,
wherein the monolithic organic porous intermediate body has a continuous macropore structure and has a total pore volume of 5 to 30 ml/g, and
wherein the plurality of particles or the plurality of protrusions, or both, on the surface of the polymer skeleton are formed by polymerizing the vinyl monomers and the second crosslinking agent in a presence of the monolithic organic porous intermediate body at a temperature that is lower than a 10-hour half-life temperature of the initiator by at least 5° C.

19. A monolithic organic porous ion exchanger comprising a composite structure that includes a monolithic organic porous body that includes a continuous skeleton phase and a continuous pore phase, and a number of particles having a diameter of 4 to 40 μm that adhere to a surface of the skeleton of the monolithic organic porous body, or a number of protrusions having a maximum diameter of 4 to 40 μm that are formed on the surface of the skeleton of the monolithic organic porous body, the monolithic organic porous ion exchanger having a thickness of 1 mm or more, an average pore diameter of 10 to 150 μm, a total pore volume of 0.5 to 5 ml/g, and an ion-exchange capacity per unit volume of 0.2 mg equivalent/ml or more in water-wet conditions, ion-exchange groups being uniformly distributed in the composite structure, the monolithic organic porous body being produced by performing:

a first step comprising stirring a mixture of an oil-soluble monomer that does not include an ion-exchange group, a surfactant, and water to prepare a water-in-oil emulsion, and polymerizing the water-in-oil emulsion, so as to obtain a monolithic organic porous intermediate body that has a total pore volume of 5 to 16 ml/g, a second step comprising mixing a vinyl monomer, a crosslinking agent that includes at least two vinyl groups in one molecule, an organic solvent that dissolves the vinyl monomer and the crosslinking agent, but does not dissolve a polymer produced by polymerizing the vinyl monomer, and an initiator, a third step comprising polymerizing the mixture obtained by the second step in a stationary state in a presence of the monolithic organic porous intermediate body, so as to obtain a monolithic organic porous body having a skeleton thicker than the skeleton of the monolithic organic porous intermediate body.

20. The monolithic organic porous ion exchanger according to claim 19, wherein the monolithic organic porous body includes a continuous macropore structure that includes cellular macropores that overlap to form openings having an average diameter of 30 to 300 μm when wetted with water.

21. The monolithic organic porous ion exchanger according to claim 19, wherein the monolithic organic porous body includes a co-continuous structure that includes a three-dimensional continuous skeleton having a thickness of 1 to 60 μm, and a three-dimensional continuous pore defined by the skeleton having a diameter of 10 to 100 μm.

22. A method of producing a monolithic organic porous body comprising:

a step I that includes stirring a mixture of an oil-soluble monomer that does not include an ion-exchange group, a first crosslinking agent that includes at least two vinyl groups in one molecule, a surfactant, and water to prepare a water-in-oil emulsion, and polymerizing the water-in- oil emulsion to obtain a monolithic intermediate body that has a continuous macropore structure and has a total pore volume of 5 to 30 ml/g, a step II that includes mixing a vinyl monomer, a second crosslinking agent that includes at least two vinyl groups in one molecule, an organic solvent that dissolves the vinyl monomer and the second crosslinking agent, but does not dissolve a polymer produced by polymerizing the vinyl monomer, and an initiator, and a step III that includes polymerizing the mixture obtained by the step II in a stationary state in the presence of the monolithic organic porous intermediate body obtained by the step I, so as to obtain the monolithic organic porous body, the step II or III being performed while satisfying at least one of the following conditions (1) to (5), (1) the mixture is polymerized in the step III at a temperature that is lower than a 10-hour half-life temperature of the initiator by at least 5° C.;

(2) the amount (mol %) of the second crosslinking agent used in the step II is equal to or larger than twice the amount (mol %) of the first crosslinking agent used in the step I;

(3) the vinyl monomer used in the step II differs in structure from the oil-soluble monomer used in the step I;

(4) the organic solvent used in the step II is a polyether having a molecular weight of 200 or more;

(5) the concentration of the vinyl monomer in the mixture obtained by the step II is 17 30 wt % or less.

23. The method of producing a monolithic organic porous body according to claim 22, comprising a step IV that includes introducing an ion-exchange group into the monolithic organic porous body.

* * * * *